US012647861B2

(12) United States Patent
Li et al.

(10) Patent No.: US 12,647,861 B2
(45) Date of Patent: Jun. 2, 2026

(54) USER EQUIPMENT MACHINE LEARNING SERVICE CONTINUITY

(71) Applicant: QUALCOMM Incorporated, San Diego, CA (US)

(72) Inventors: Qing Li, Princeton Junction, NJ (US); Hong Cheng, Basking Ridge, NJ (US); Kapil Gulati, Belle Mead, NJ (US); Kyle Chi Guan, New York, NY (US); Himaja Kesavareddigari, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 655 days.

(21) Appl. No.: 17/806,164

(22) Filed: Jun. 9, 2022

(65) Prior Publication Data

US 2023/0422117 A1 Dec. 28, 2023

(51) Int. Cl.
H04W 36/08 (2009.01)
H04W 36/00 (2009.01)
H04W 74/0833 (2024.01)

(52) U.S. Cl.
CPC ....... H04W 36/08 (2013.01); H04W 36/0058 (2018.08); H04W 74/0833 (2013.01)

(58) Field of Classification Search
CPC ............. H04W 36/08; H04W 36/0058; H04W 74/0833
See application file for complete search history.

(56) References Cited

U.S. PATENT DOCUMENTS

| 11,051,223 B2 | 6/2021 | Mysore et al. | |
| 2023/0292198 A1* | 9/2023 | Veijalainen | ....... H04W 36/0016 |
| 2024/0422629 A1* | 12/2024 | Song | ..................... H04W 24/02 |

FOREIGN PATENT DOCUMENTS

| CN | 118985143 A | * 11/2024 | ............. G06N 20/00 |
| EP | 4202791 A1 | 6/2023 | |

(Continued)

OTHER PUBLICATIONS

Yan L., et al., "Machine Learning-Based Handovers for Sub-6 GHz and mmWave Integrated Vehicular Networks", IEEE Transactions on Wireless Communications, vol. 18, No. 10, Oct. 2019, pp. 4873-4885.

(Continued)

*Primary Examiner* — Saad A. Waqas
(74) *Attorney, Agent, or Firm* — Harrity & Harrity, LLP \ Qualcomm

(57) ABSTRACT

Various aspects of the present disclosure generally relate to wireless communication. In some aspects, a user equipment (UE) may transmit, to first network node for use by a first inference host associated with a first network node, first machine learning data associated with a machine learning service. The UE may receive, from the first network node, a handover command communication indicating that the UE is to perform a handover from the first network node to a second network node, wherein the handover command communication indicates machine learning inference information associated with a second inference host that is associated with the second network node. The UE may transmit, to the second network node for use by the second inference host associated with the second network node, second machine learning data for the machine learning service based at least in part on receiving the handover command communication. Numerous other aspects are described.

30 Claims, 18 Drawing Sheets

(56)    References Cited

FOREIGN PATENT DOCUMENTS

| | | | | | |
|---|---|---|---|---|---|
| EP | 4436259 | A1 * | 9/2024 | ............... | G06F 9/48 |
| JP | 2024509670 | A * | 3/2024 | ............. | G06N 3/096 |
| WO | WO-2020254859 | A1 * | 12/2020 | .......... | H04W 36/305 |
| WO | WO-2021064275 | A1 * | 4/2021 | .......... | H04W 36/304 |
| WO | WO-2021091439 | A1 * | 5/2021 | ........ | H04W 36/0011 |
| WO | 2022002410 | A1 | 1/2022 | | |
| WO | 2022034114 | A1 | 2/2022 | | |
| WO | WO-2022057510 | A1 * | 3/2022 | ............ | G06N 20/00 |
| WO | WO-2022234807 | A1 * | 11/2022 | ............ | H04W 24/02 |
| WO | WO-2023165447 | A1 * | 9/2023 | ............ | H04W 24/02 |

OTHER PUBLICATIONS

International Search Report and Written Opinion—PCT/US2023/022003—ISA/EPO—Oct. 17, 2023.

* cited by examiner

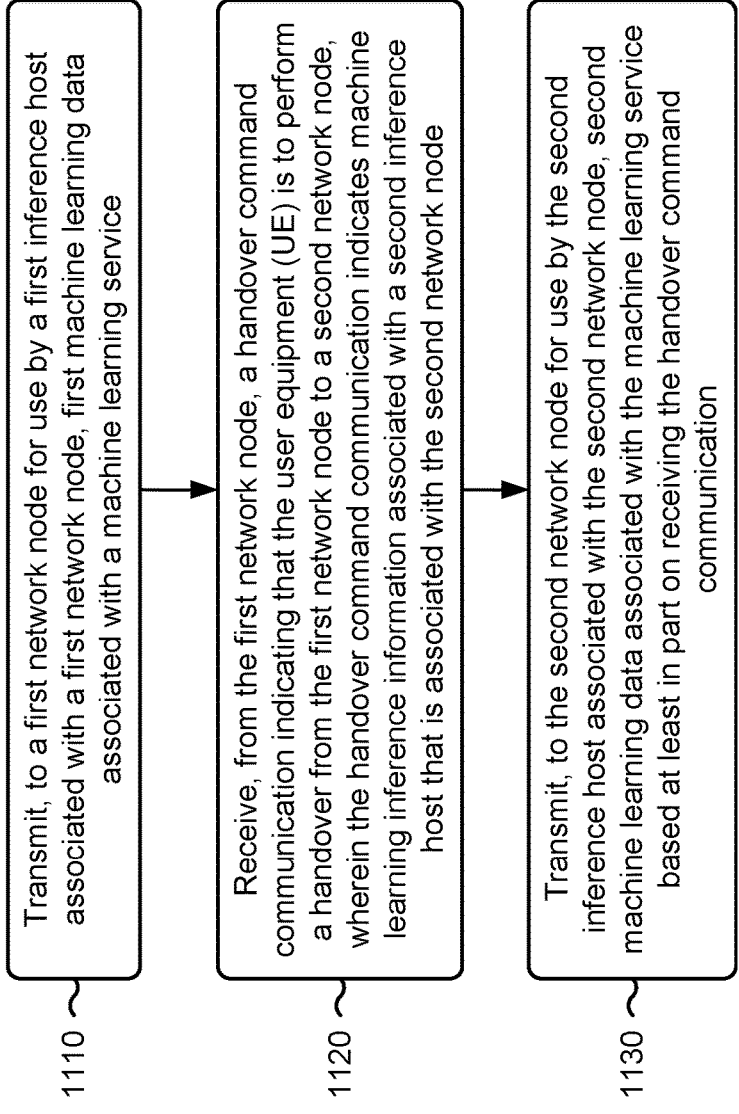

Transmit, to a first network node for use by a first inference host associated with a first network node, first machine learning data associated with a machine learning service

1110

Receive, from the first network node, a handover command communication indicating that the user equipment (UE) is to perform a handover from the first network node to a second network node, wherein the handover command communication indicates machine learning inference information associated with a second inference host that is associated with the second network node

1120

Transmit, to the second network node for use by the second inference host associated with the second network node, second machine learning data associated with the machine learning service based at least in part on receiving the handover command communication

1130

1100

FIG. 11

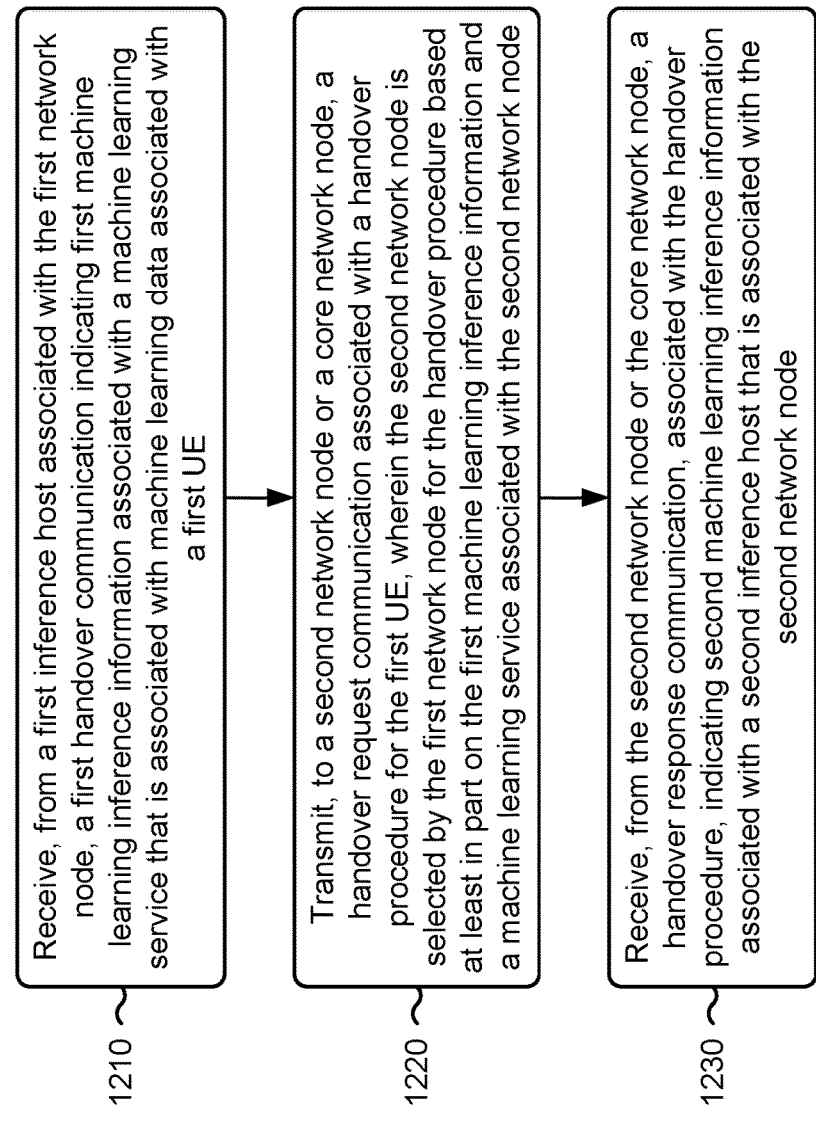

1210 Receive, from a first inference host associated with the first network node, a first handover communication indicating first machine learning inference information associated with a machine learning service that is associated with machine learning data associated with a first UE 1220 Transmit, to a second network node or a core network node, a handover request communication associated with a handover procedure for the first UE, wherein the second network node is selected by the first network node for the handover procedure based at least in part on the first machine learning inference information and a machine learning service associated with the second network node 1230 Receive, from the second network node or the core network node, a handover response communication, associated with the handover procedure, indicating second machine learning inference information associated with a second inference host that is associated with the second network node

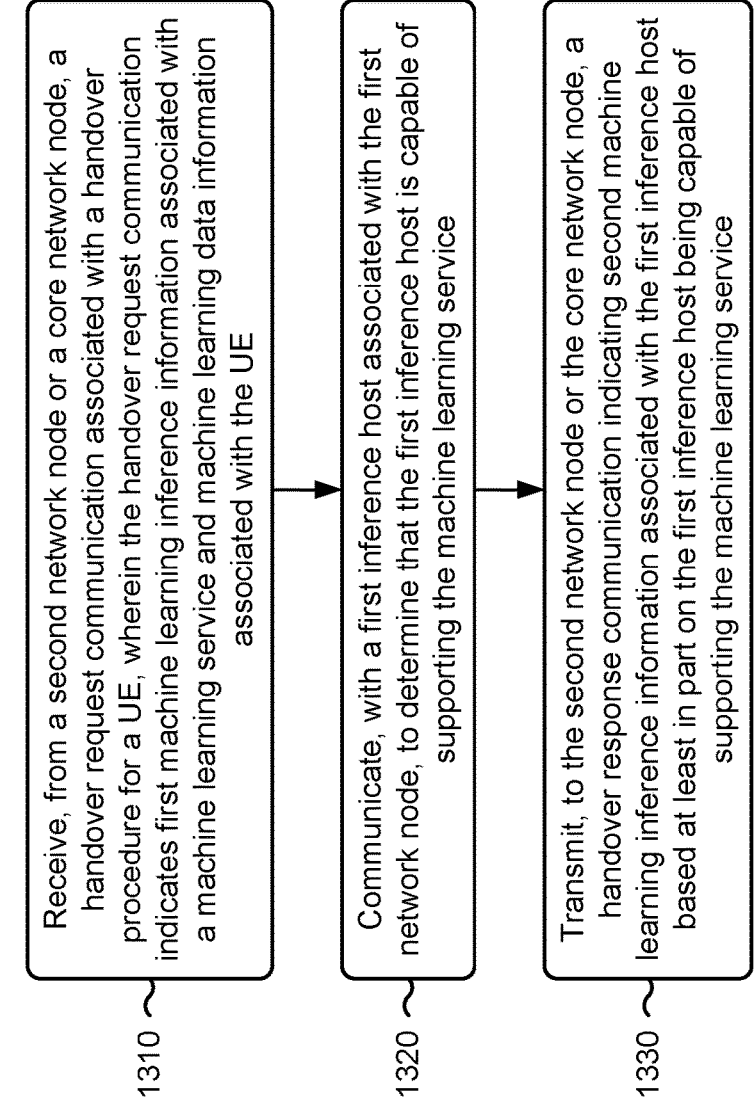

1310 — Receive, from a second network node or a core network node, a handover request communication associated with a handover procedure for a UE, wherein the handover request communication indicates first machine learning inference information associated with a machine learning service and machine learning data information associated with the UE 1320 — Communicate, with a first inference host associated with the first network node, to determine that the first inference host is capable of supporting the machine learning service 1330 — Transmit, to the second network node or the core network node, a handover response communication indicating second machine learning inference information associated with the first inference host based at least in part on the first inference host being capable of supporting the machine learning service

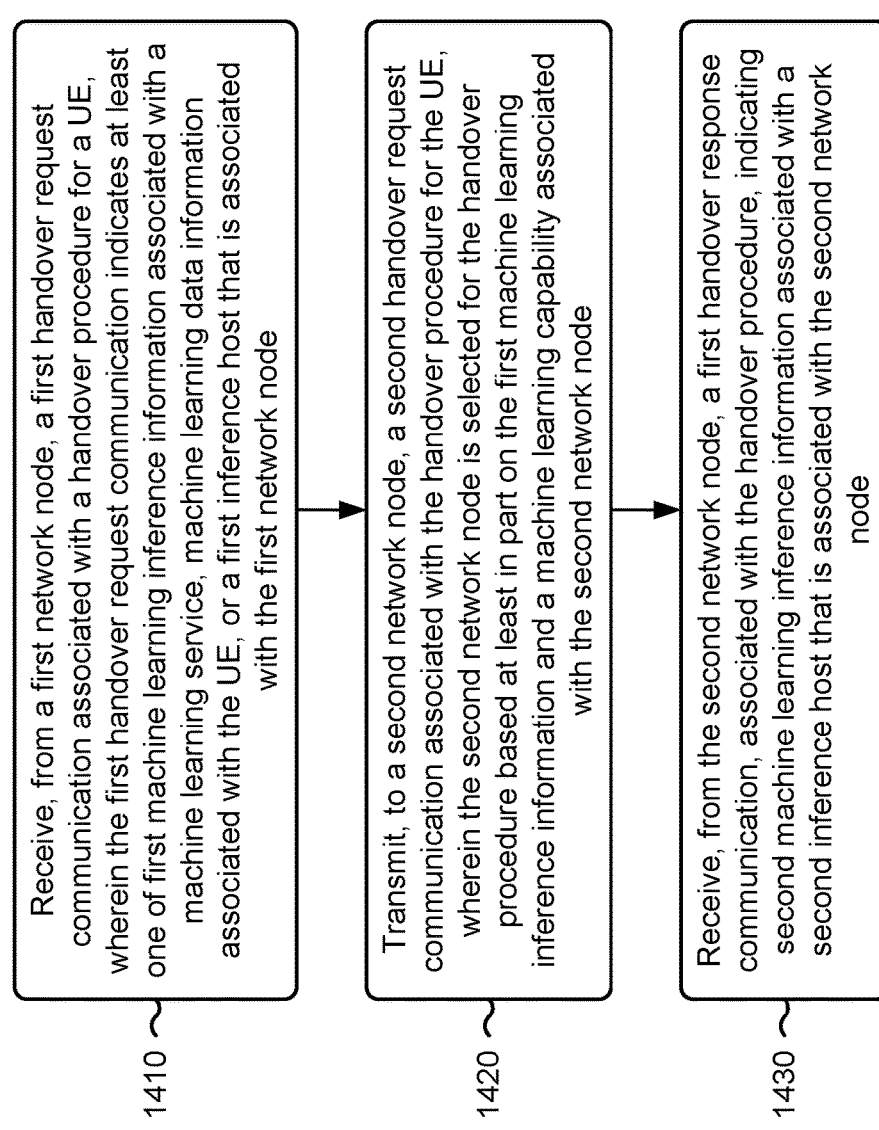

Receive, from a first network node, a first handover request communication associated with a handover procedure for a UE, wherein the first handover request communication indicates at least one of first machine learning inference information associated with a machine learning service, machine learning data information associated with the UE, or a first inference host that is associated with the first network node

1410

Transmit, to a second network node, a second handover request communication associated with the handover procedure for the UE, wherein the second network node is selected for the handover procedure based at least in part on the first machine learning inference information and a machine learning capability associated with the second network node

1420

Receive, from the second network node, a first handover response communication, associated with the handover procedure, indicating second machine learning inference information associated with a second inference host that is associated with the second network node

USER EQUIPMENT MACHINE LEARNING SERVICE CONTINUITY

FIELD OF THE DISCLOSURE

Aspects of the present disclosure generally relate to wireless communication and to techniques and apparatuses for user equipment (UE) machine learning service continuity.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The UE may include a memory and one or more processors coupled to the memory. The one or more processors may be configured to transmit, to a first network node for use by a first inference host associated with a first network node, first machine learning data associated with a machine learning service. The one or more processors may be configured to receive, from the first network node, a handover command communication indicating that the UE is to perform a handover from the first network node to a second network node, wherein the handover command communication indicates machine learning inference information associated with a second inference host that is associated with the second network node. The one or more processors may be configured to transmit, to the second network node for use by the second inference host associated with the second network node, second machine learning data associated with the machine learning service based at least in part on receiving the handover command communication.

Some aspects described herein relate to a first network node for wireless communication. The first network node may include a memory and one or more processors coupled to the memory. The one or more processors may be configured to receive, from a first inference host associated with the first network node, a first handover communication indicating first machine learning inference information associated with a machine learning service that is associated with machine learning data associated with a first UE. The one or more processors may be configured to transmit, to a second network node or a core network node, a handover request communication associated with a handover procedure for the first UE, wherein the second network node is selected by the first network node for the handover procedure based at least in part on the first machine learning inference information and a machine learning service associated with the second network node. The one or more processors may be configured to receive, from the second network node or the core network node, a handover response communication, associated with the handover procedure, indicating second machine learning inference information associated with a second inference host that is associated with the second network node.

Some aspects described herein relate to a first network node for wireless communication. The first network node may include a memory and one or more processors coupled to the memory. The one or more processors may be configured to receive, from a second network node or a core network node, a handover request communication associated with a handover procedure for a UE, wherein the handover request communication indicates first machine learning inference information associated with a machine learning service and machine learning data associated with the UE. The one or more processors may be configured to communicate, with a first inference host associated with the first network node, to determine that the first inference host is capable of supporting the machine learning service. The one or more processors may be configured to transmit, to the second network node or the core network node, a handover response communication indicating second machine learning inference information associated with the first inference host based at least in part on the first inference host being capable of supporting the machine learning service.

Some aspects described herein relate to a core network node for wireless communication. The core network node may include a memory and one or more processors coupled to the memory. The one or more processors may be configured to receive, from a first network node, a first handover request communication associated with a handover procedure for a UE, wherein the first handover request communication indicates at least one of first machine learning inference information associated with a machine learning service, machine learning data associated with the UE, or a first inference host that is associated with the first network node. The one or more processors may be configured to transmit, to a second network node, a second handover request communication associated with the handover procedure for the UE, wherein the second network node is selected for the handover procedure based at least in part on the first machine learning inference information and a machine learning capability associated with the second network node. The one or more processors may be configured to receive, from the second network node, a first handover response communication, associated with the handover procedure, indicating second machine learning inference information associated with a second inference host that is associated with the second network node.

Some aspects described herein relate to a method of wireless communication performed by a UE. The method may include transmitting, to a first network node for use by a first inference host associated with a first network node, first machine learning data associated with a machine learning service. The method may include receiving, from the first network node, a handover command communication indicating that the UE is to perform a handover from the first network node to a second network node, wherein the handover command communication indicates machine learning inference information associated with a second inference host that is associated with the second network node. The method may include transmitting, to the second network node for use by the second inference host associated with the second network node, second machine learning data associated with the machine learning service based at least in part on receiving the handover command communication.

Some aspects described herein relate to a method of wireless communication performed by a first network node. The method may include receiving, from a first inference host associated with the first network node, a first handover communication indicating first machine learning inference information associated with a machine learning service that is associated with machine learning data associated with a first UE. The method may include transmitting, to a second network node or a core network node, a handover request communication associated with a handover procedure for the first UE, wherein the second network node is selected by the first network node for the handover procedure based at least in part on the first machine learning inference information and a machine learning service associated with the second network node. The method may include receiving, from the second network node or the core network node, a handover response communication, associated with the handover procedure, indicating second machine learning inference information associated with a second inference host that is associated with the second network node.

Some aspects described herein relate to a method of wireless communication performed by a first network node. The method may include receiving, from a second network node or a core network node, a handover request communication associated with a handover procedure for a UE, wherein the handover request communication indicates first machine learning inference information associated with a machine learning service and machine learning data associated with the UE. The method may include communicating, with a first inference host associated with the first network node, to determine that the first inference host is capable of supporting the machine learning service. The method may include transmitting, to the second network node or the core network node, a handover response communication indicating second machine learning inference information associated with the first inference host based at least in part on the first inference host being capable of supporting the machine learning service.

Some aspects described herein relate to a method of wireless communication performed by a core network node. The method may include receiving, from a first network node, a first handover request communication associated with a handover procedure for a UE, wherein the first handover request communication indicates at least one of first machine learning inference information associated with a machine learning service, machine learning data associated with the UE, or a first inference host that is associated with the first network node. The method may include transmitting, to a second network node, a second handover request communication associated with the handover procedure for the UE, wherein the second network node is selected for the handover procedure based at least in part on the first machine learning inference information and a machine learning capability associated with the second network node. The method may include receiving, from the second network node, a first handover response communication, associated with the handover procedure, indicating second machine learning inference information associated with a second inference host that is associated with the second network node.

Some aspects described herein relate to a non-transitory computer-readable medium that stores a set of instructions for wireless communication by a UE. The set of instructions, when executed by one or more processors of the UE, may cause the UE to transmit, to a first network node for use by a first inference host associated with a first network node, first machine learning data associated with a machine learning service. The set of instructions, when executed by one or more processors of the UE, may cause the UE to receive, from the first network node, a handover command communication indicating that the UE is to perform a handover from the first network node to a second network node, wherein the handover command communication indicates machine learning inference information associated with a second inference host that is associated with the second network node. The set of instructions, when executed by one or more processors of the UE, may cause the UE to transmit, to the second network node for use by the second inference host associated with the second network node, second machine learning data associated with the machine learning service based at least in part on receiving the handover command communication.

Some aspects described herein relate to a non-transitory computer-readable medium that stores a set of instructions for wireless communication by a first network node. The set of instructions, when executed by one or more processors of the first network node, may cause the first network node to receive, from a first inference host associated with the first network node, a first handover communication indicating first machine learning inference information associated with a machine learning service that is associated with machine learning data associated with a first UE. The set of instructions, when executed by one or more processors of the first network node, may cause the first network node to transmit, to a second network node or a core network node, a handover request communication associated with a handover procedure for the first UE, wherein the second network node is selected by the first network node for the handover procedure based at least in part on the first machine learning inference information and a machine learning service associated with the second network node. The set of instructions, when executed by one or more processors of the first network node, may cause the first network node to receive, from the second network node or the core network node, a handover response communication, associated with the handover procedure, indicating second machine learning inference information associated with a second inference host that is associated with the second network node.

Some aspects described herein relate to a non-transitory computer-readable medium that stores a set of instructions for wireless communication by a first network node. The set of instructions, when executed by one or more processors of the first network node, may cause the first network node to receive, from a second network node or a core network node, a handover request communication associated with a handover procedure for a UE, wherein the handover request communication indicates first machine learning inference information associated with a machine learning service and machine learning data associated with the UE. The set of instructions, when executed by one or more processors of the first network node, may cause the first network node to communicate, with a first inference host associated with the first network node, to determine that the first inference host is capable of supporting the machine learning service. The set of instructions, when executed by one or more processors of the first network node, may cause the first network node to transmit, to the second network node or the core network node, a handover response communication indicating second machine learning inference information associated with the first inference host based at least in part on the first inference host being capable of supporting the machine learning service.

Some aspects described herein relate to a non-transitory computer-readable medium that stores a set of instructions for wireless communication by a core network node. The set of instructions, when executed by one or more processors of the core network node, may cause the core network node to receive, from a first network node, a first handover request communication associated with a handover procedure for a UE, wherein the first handover request communication indicates at least one of first machine learning inference information associated with a machine learning service, machine learning data associated with the UE, or a first inference host that is associated with the first network node. The set of instructions, when executed by one or more processors of the core network node, may cause the core network node to transmit, to a second network node, a second handover request communication associated with the handover procedure for the UE, wherein the second network node is selected for the handover procedure based at least in part on the first machine learning inference information and a machine learning capability associated with the second network node. The set of instructions, when executed by one or more processors of the core network node, may cause the core network node to receive, from the second network node, a first handover response communication, associated with the handover procedure, indicating second machine learning inference information associated with a second inference host that is associated with the second network node.

Some aspects described herein relate to an apparatus for wireless communication. The apparatus may include means for transmitting, to a first network node for use by a first inference host associated with a first network node, first machine learning data associated with a machine learning service. The apparatus may include means for receiving, from the first network node, a handover command communication indicating that the UE is to perform a handover from the first network node to a second network node, wherein the handover command communication indicates machine learning inference information associated with a second inference host that is associated with the second network node. The apparatus may include means for transmitting, to the second network node for use by the second inference host associated with the second network node, second machine learning data associated with the machine learning service based at least in part on receiving the handover command communication.

Some aspects described herein relate to a first apparatus for wireless communication. The first apparatus may include means for receiving, from a first inference host associated with the first network node, a first handover communication indicating first machine learning inference information associated with a machine learning service that is associated with machine learning data associated with a first UE. The first apparatus may include means for transmitting, to a second network node or a core network node, a handover request communication associated with a handover procedure for the first UE, wherein the second network node is selected by the first network node for the handover procedure based at least in part on the first machine learning inference information and a machine learning service associated with the second network node. The first apparatus may include means for receiving, from the second apparatus or the core network node, a handover response communication, associated with the handover procedure, indicating second machine learning inference information associated with a second inference host that is associated with the second network node.

Some aspects described herein relate to a first apparatus for wireless communication. The first apparatus may include means for receiving, from a second apparatus or a core network node, a handover request communication associated with a handover procedure for a UE, wherein the handover request communication indicates first machine learning inference information associated with a machine learning service and machine learning data associated with the UE. The first apparatus may include means for communicating, with a first inference host associated with the first network node, to determine that the first inference host is capable of supporting the machine learning service. The first apparatus may include means for transmitting, to the second apparatus or the core network node, a handover response communication indicating second machine learning inference information associated with the first inference host based at least in part on the first inference host being capable of supporting the machine learning service.

Some aspects described herein relate to an apparatus for wireless communication. The apparatus may include means for receiving, from a first network node, a first handover request communication associated with a handover procedure for a UE, wherein the first handover request communication indicates at least one of first machine learning inference information associated with a machine learning service, machine learning data associated with the UE, or a first inference host that is associated with the first network node. The apparatus may include means for transmitting, to a second network node, a second handover request communication associated with the handover procedure for the UE, wherein the second network node is selected for the handover procedure based at least in part on the first machine learning inference information and a machine learning capability associated with the second network node. The apparatus may include means for receiving, from the second network node, a first handover response communication, associated with the handover procedure, indicating second machine learning inference information associated with a second inference host that is associated with the second network node.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 11 is a diagram illustrating an example process performed, for example, by a UE, in accordance with the present disclosure.

FIG. 12 is a diagram illustrating an example process performed, for example, by a first network node, in accordance with the present disclosure.

FIG. 13 is a diagram illustrating an example process performed, for example, by a first network node, in accordance with the present disclosure.

FIG. 14 is a diagram illustrating an example process performed, for example, by a core network node, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
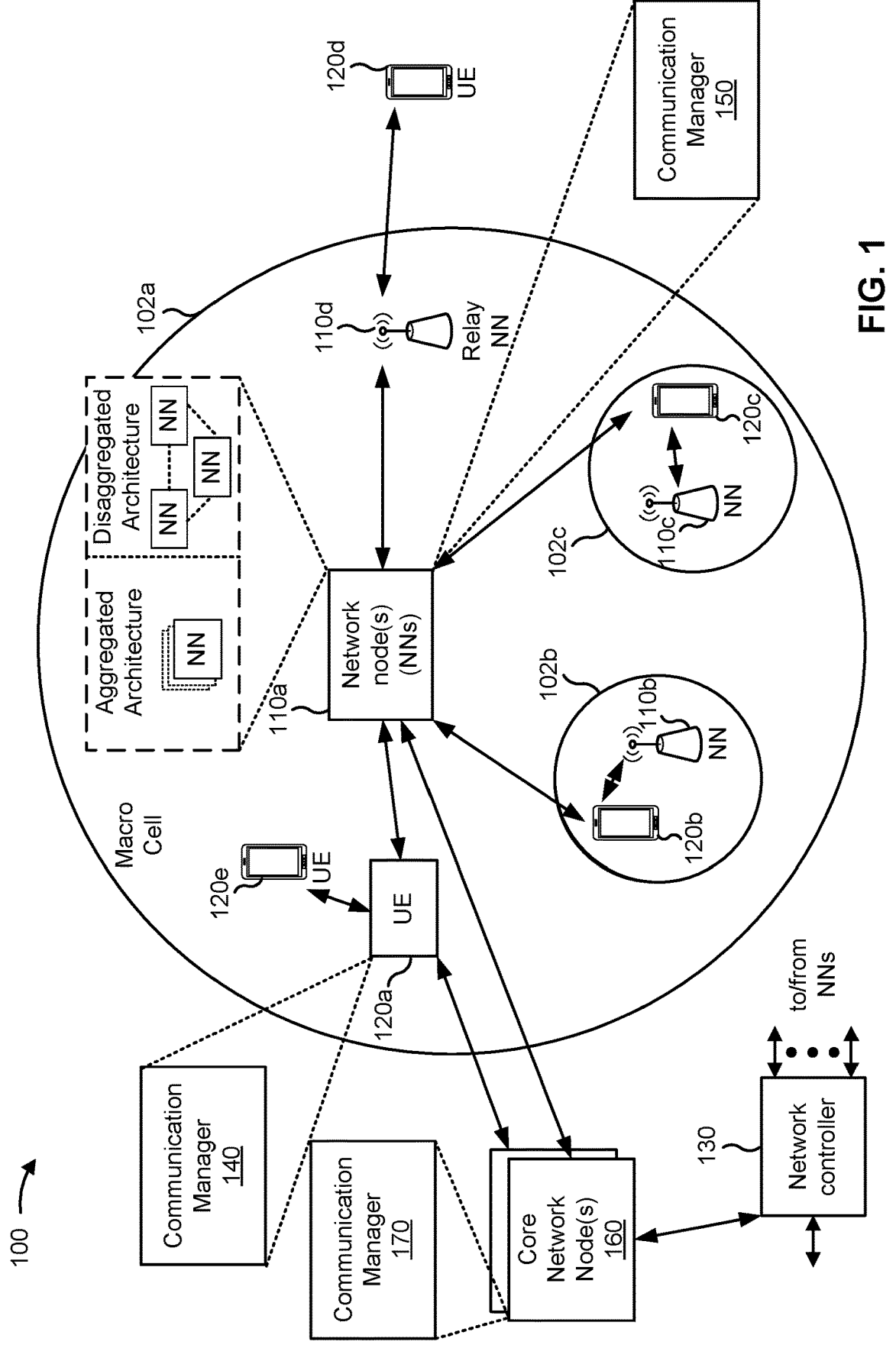
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network node 160 via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node 160, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network node 160, or may include a CU or a core network node 160.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may transmit, to a first network node for use by a first inference host associated with a first network node, first machine learning data associated with a machine learning service; receive, from the first network node, a handover command communication indicating that the UE is to perform a handover from the first network node to a second network node, wherein the handover command communication indicates machine learning inference information associated with a second inference host that is associated with the second network node; and transmit, to the second network node for use by the second inference host associated with the second network node, second machine learning data associated with the machine learning service based at least in part on receiving the handover command communication. Additionally, or alternatively, the communication manager 140 may perform one or more other operations described herein.

In some aspects, a first network node 110 may include a communication manager 150. As described in more detail elsewhere herein, the communication manager 150 may receive, from a first inference host associated with the first network node, a first handover communication indicating first machine learning inference information associated with a machine learning service that is associated with machine learning data associated with a first UE; transmit, to a second network node or a core network node, a handover request communication associated with a handover procedure for the first UE, wherein the second network node is selected by the first network node for the handover procedure based at least in part on the first machine learning inference information and a machine learning service associated with the second network node; and receive, from the second network node or the core network node, a handover response communication, associated with the handover procedure, indicating second machine learning inference information associated with a second inference host that is associated with the second network node. As another example, the communication manager 150 may receive, from a second network node or a core network node, a handover request communication associated with a handover procedure for a UE, wherein the handover request communication indicates first machine learning inference information associated with a machine learning service and machine learning data associated with the UE; communicate, with a first inference host associated with the first network node, to determine that the first inference host is capable of supporting the machine learning service; and transmit, to the second network node or the core network node, a handover response communication indicating second machine learning inference information associated with the first inference host based at least in part on the first inference host being capable of supporting the machine learning service. Additionally, or alternatively, the communication manager 150 may perform one or more other operations described herein.

In some aspects, the core network node 160 may include a communication manager 170. As described in more detail elsewhere herein, the communication manager 170 may receive, from a first network node, a first handover request communication associated with a handover procedure for a UE, wherein the first handover request communication indicates at least one of first machine learning inference information associated with a machine learning service, machine learning data associated with the UE, or a first inference host that is associated with the first network node; transmit, to a second network node, a second handover request communication associated with the handover procedure for the UE, wherein the second network node is selected for the handover procedure based at least in part on the first machine learning inference information and a machine learning capability associated with the second network node; and receive, from the second network node, a first handover response communication, associated with the handover procedure, indicating second machine learning inference information associated with a second inference host that is associated with the second network node. Additionally, or alternatively, the communication manager 170 may perform one or more other operations described herein.

As indicated above, FIG. 1 is provided as an example. Other examples may differ from what is described with regard to FIG. 1.

Figure 2:
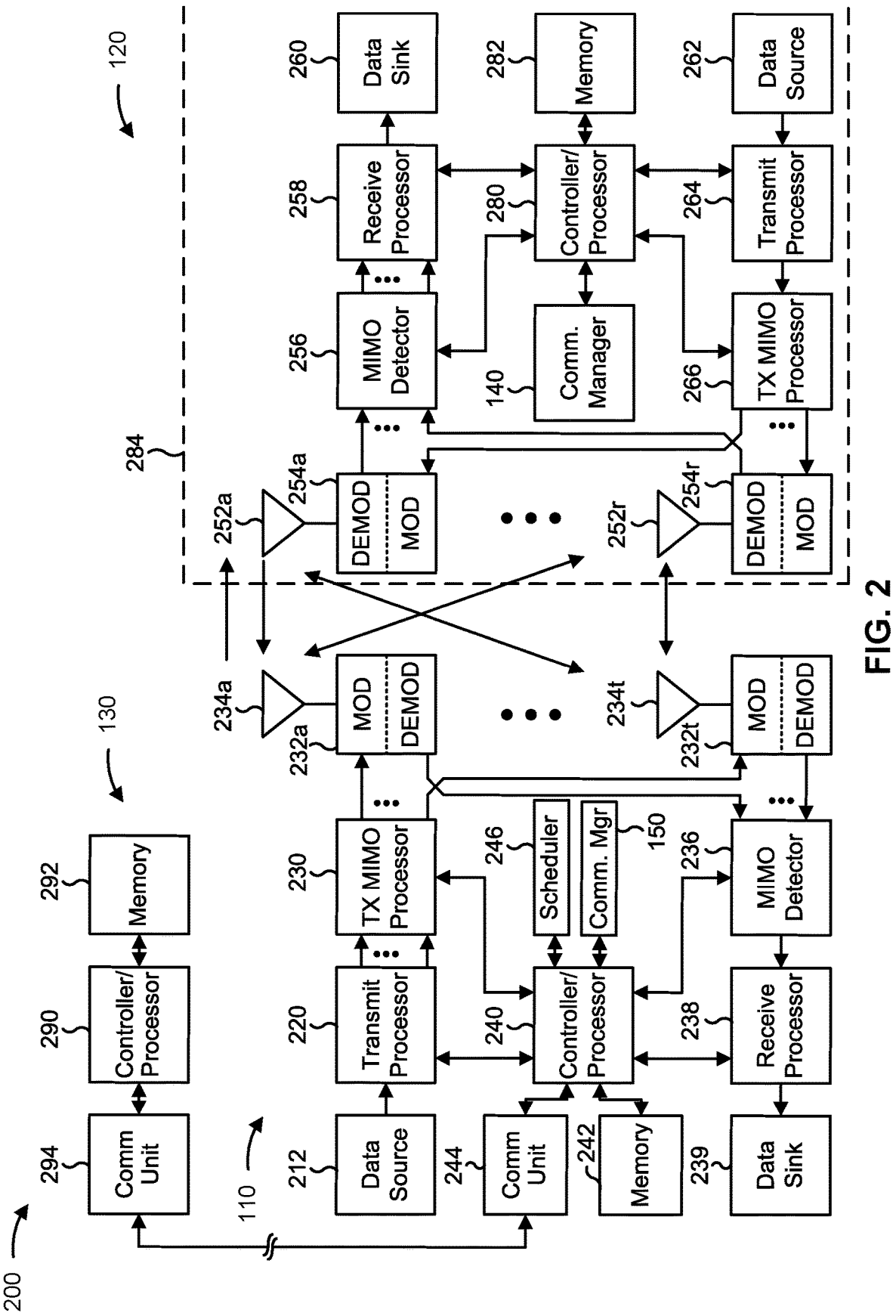
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the network node 110 and/or other network nodes 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 8, 9A, 9B, and 10-17).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 8, 9A, 9B, and 10-17).

The controller/processor 240 of the network node 110, the controller/processor 280 of the UE 120, and/or any other component(s) of FIG. 2 may perform one or more techniques associated with UE machine learning service continuity, as described in more detail elsewhere herein. For example, the controller/processor 240 of the network node 110, the controller/processor 280 of the UE 120, and/or any other component(s) of FIG. 2 may perform or direct operations of, for example, process 1100 of FIG. 11, process 1200 of FIG. 12, process 1300 of FIG. 13, process 1400 of FIG. 14, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 1100 of FIG. 11, process 1200 of FIG. 12, process 1300 of FIG. 13, process 1400 of FIG. 14, and/or other processes as described herein. In some examples, executing instructions may include running the instructions, converting the instructions, compiling the instructions, and/or interpreting the instructions, among other examples.

In some aspects, the UE 120 includes means for transmitting, to a first network node for use by a first inference host associated with a first network node, first machine learning data associated with a machine learning service; means for receiving, from the first network node, a handover command communication indicating that the UE is to perform a handover from the first network node to a second network node, wherein the handover command communication indicates machine learning inference information associated with a second inference host that is associated with the second network node; and/or means for transmitting, to the second network node for use by the second inference host associated with the second network node, second machine learning data associated with the machine learning service based at least in part on receiving the handover command communication. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a first network node 110 includes means for receiving, from a first inference host associated with the first network node, a first handover communication indicating first machine learning inference information associated with a machine learning service that is associated with machine learning data associated with a first UE; means for transmitting, to a second network node or a core network node, a handover request communication associated with a handover procedure for the first UE, wherein the second network node is selected by the first network node for the handover procedure based at least in part on the first machine learning inference information and a machine learning service associated with the second network node; and/or means for receiving, from the second network node or the core network node, a handover response communication, associated with the handover procedure, indicating second machine learning inference information associated with a second inference host that is associated with the second network node. In some aspects, the means for the first network node 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, a first network node 110 includes means for receiving, from a second network node or a core network node, a handover request communication associated with a handover procedure for a UE, wherein the handover request communication indicates first machine learning inference information associated with a machine learning service and machine learning data associated with the UE; means for communicating, with a first inference host associated with the first network node, to determine that the first inference host is capable of supporting the machine learning service; and/or means for transmitting, to the second network node or the core network node, a handover response communication indicating second machine learning inference information associated with the first inference host based at least in part on the first inference host being capable of supporting the machine learning service. In some aspects, the means for the first network node 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, the core network node 160 includes means for receiving, from a first network node, a first handover request communication associated with a handover procedure for a UE, wherein the first handover request communication indicates at least one of first machine learning inference information associated with a machine learning service, machine learning data associated with the UE, or a first inference host that is associated with the first network node; means for transmitting, to a second network node, a second handover request communication associated with the handover procedure for the UE, wherein the second network node is selected for the handover procedure based at least in part on the first machine learning inference information and a machine learning capability associated with the second network node; and/or means for receiving, from the second network node, a first handover response communication, associated with the handover procedure, indicating second machine learning inference information associated with a second inference host that is associated with the second network node. In some aspects, the means for the core network node to perform operations described herein may include, for example, one or more of communication manager 170, a transmit processor, a TX MIMO processor, a modem, an antenna, a MIMO detector, a receive processor, a controller/processor, a memory, or a scheduler.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
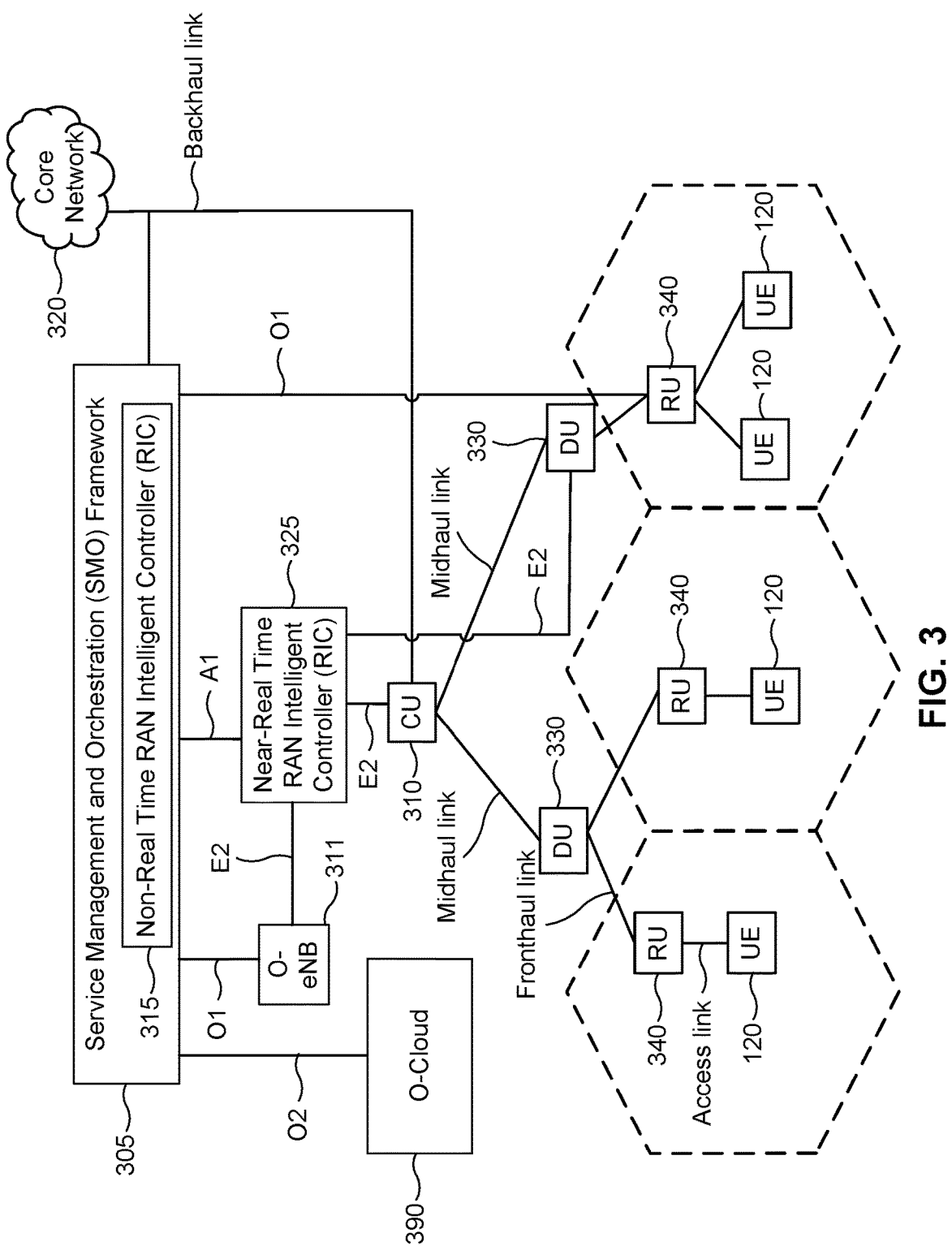
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-real time (RT) RAN intelligent controller (RIC) 325 via an E2 link, or a Non-real time (RT) RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit—User Plane (CU-UP) functionality), control plane functionality (for example, Central Unit—Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305. In some examples, SMO Framework 305 may be connected to an infrastructure management framework supporting virtual network functions (e.g., via an O1* interface).

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an AI interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325. In some examples, the near-RT RIC 325 may be a logical function that enables near-real-time control and optimization of O-RAN elements and resources via fine-grained data collection and actions over an E2 interface. The Near-RT RIC 325 may be collocated with the RAN or network entity to provide the real-time processing, such as online ML training or near real time ML inference. The non-RT RIC 315 may be a logical function that enables non-real-time control and optimization of RAN elements and resources, AI/ML workflow including model training and updates, and policy-based guidance of applications/features in near-RT RIC 325, as well as ML inference with less latency specification. The non-RT RIC 315 may be located further from the RAN or base station, such as on a cloud-based server or on an edge server.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

In some examples, an overall RIC architecture may consist of four functional software elements: a DU software function, a multi-RAT CU protocol stack, the near-RT RIC 325 itself, and the orchestration/network management system (NMS) layer with the non-RT RIC 315. The functional software elements may interact with RU hardware to make it run more efficiently and to be optimized real-time as a part of the RAN cluster to deliver a better network experience to end users.

In some examples, the functionality of the Non-RT RIC 315 may include configuration management, device management, fault management, performance management, and lifecycle management for all network elements in the network. The Non-RT RIC 315 may use data analytics and AI/ML training/inference to determine the RAN optimization actions for which it may leverage services of the SMO Framework 305 such as data collection and provisioning services of the network nodes. The Near-RT RIC 325 may use embedded intelligence for per-UE controlled load-balancing, resource block (RB) management, interference detection, and/or interference mitigation, among other examples. The Near-RT RIC 325 may also provide quality of service (QoS) management, connectivity management, and/or seamless handover control, among other examples. The near-RT RIC 325 may leverage the near real-time state of the underlying network and feed RAN data to train the AI/ML models, which may then feed to the near-RT RIC 325 to facilitate radio resource management for subscribers.

As indicated above, FIG. 3 is provided as an example. Other examples may differ from what is described with regard to FIG. 3.

Wireless networks may operate at higher frequency bands, such as within millimeter wave (mmW) bands (e.g., FR2 above 28 GHz, FR4 above 60 GHz, or THz band above 100 GHz, among other examples), to offer high data rates. For example, wireless devices, such as a network node and a UE, may communicate with each other through beamforming techniques to increase communication speed and reliability. The beamforming techniques may enable a wireless device to transmit a signal towards a particular direction instead of transmitting an omnidirectional signal in all directions. In some examples, the wireless device may transmit a signal from multiple antenna elements using a common wavelength and phase for the transmission from the multiple antenna elements, and the signal from the multiple antenna elements may be combined to create a combined signal with a longer range and a more directed beam. The beamwidth of the signal may vary based on the transmitting frequency. For example, the width of a beam may be inversely related to the frequency, where the beamwidth may decrease as the transmitting frequency increases because more radiating elements may be placed per given area at a transmitter due to smaller wavelength. As a result, higher frequency bands (e.g., THz or sub-THz frequency bands) may enable wireless devices to form much narrower beam structures (e.g., pencil beams, laser beams, or narrow beams, among other examples) compared to the beam structures under the FR2 or below because more radiating elements may be placed per given area at the antenna element due to smaller wavelength. The higher frequency bands may have short delay spread (e.g., few nanoseconds) and may be translated into coherence frequency bandwidth of tens (10s) of MHz. In addition, the higher frequency bands may provide a large available bandwidth, which may be occupied by larger bandwidth carriers, such as 1000 MHz per carrier or above. In some examples, the transmission path of a narrower beam may be more likely to be tailored to a receiver, such that the transmission may be more likely to meet a line-of-sight (LOS) condition as the narrower beam may be more likely to reach the receiver without being obstructed by obstacle(s). Also, as the transmission path may be narrow, reflection and/or refraction may be less likely to occur for the narrower beam.

While higher frequency bands may provide narrower beam structures and higher transmission rates, higher frequency bands may also encounter higher attenuation and diffraction losses, where a blockage of an LOS path may degrade a wireless link quality. For example, when two wireless devices are communicating with each other based on a LOS path at a higher frequency band and the LOS path is blocked by an obstacle, such as pedestrians, buildings, and/or vehicles, among other examples, the received power may drop significantly. As a result, wireless communications based on higher frequency bands may be more susceptible to environmental changes compared to lower frequency bands.

Aspects presented herein may improve the performance and reliability of wireless communications operating at higher frequency bands, such as millimeter wave bands. Aspects presented herein may enable wireless communications to be adaptive to a dynamic environment, where wireless devices may manage wireless communications, such as performing beam managements, based at least in part on environmental conditions. For example, in one aspect of the present disclosure, to overcome rapid variations of the link quality of wireless communication systems operating at higher frequency bands caused by an LOS path blockage, sensing information provided by a vehicle's onboard sensor(s) (e.g., camera(s), radar(s), and/or light detection and ranging (lidar) sensors) may be leveraged to provide information associated with communication environments as well as obstacles (e.g., moving objects) that may potentially block the LOS path and degrade the communication quality for a wireless device, such as a UE. The vehicle may include motor vehicles (e.g., motorcycles, cars, trucks, and/or buses), railed vehicles (trains, trams, and/or subway cars, among other examples), watercrafts (ships and/or boats), and/or aircrafts (e.g., airplanes, helicopters, aerostat, and/or drones), among other examples. In addition, in another aspect of the present disclosure, a vehicle may be configured to employ onboard computation resources and machine learning (ML) models to pre-process collected sensor data and feed inference data to an inference host collocated/associated with a network node for predicting/ estimating possible blockages (e.g., LOS path blockages) or best beam pairs so that the base station may proactively initiate beam management or hand-off procedures for a UE. For purposes of the present disclosure, an "inference" or an "ML inference" may refer to a process of running data points into an ML model (e.g., via an inference host) to calculate an output such as a single numerical score, e.g., to use a trained ML algorithm to make a prediction. An "inference host" or an "ML inference host" may refer to a network function which hosts the ML model during an inference mode. Additionally, or alternatively, in another aspect of the present disclosure, a vehicle (e.g., a vehicle UE) may be configured to employ onboard computation resources and ML models to pre-process collected sensor data and feed training data to an ML training host collocated/associated with a network node for offline and/or online training ML models for predicting/estimating possible blockages (e.g., LOS path blockages) or best beam pairs. For purposes of the present disclosure, a "training" or an "ML training" may refer to a process of running data points to train or teach an ML model (e.g., via a training host). A "training host" or an "ML training host" may refer to a network function which hosts the ML model during a training mode.

Figure 4:
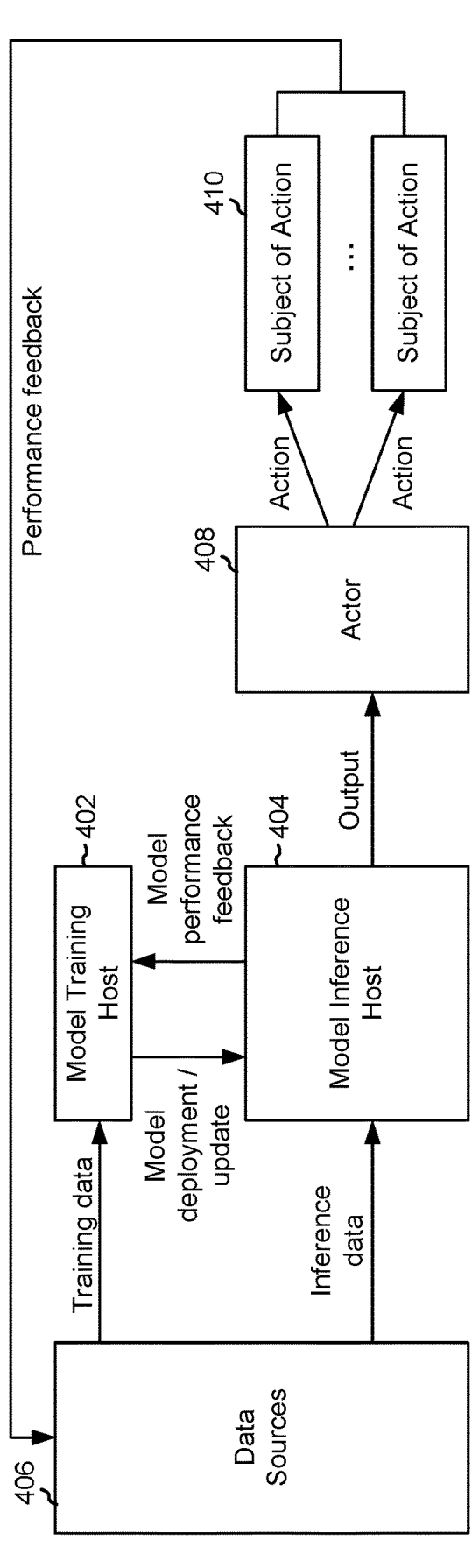
FIG. 4 is a diagram illustrating an example architecture of a functional framework for radio access network (RAN) intelligence enabled by data collection, in accordance with the present disclosure.

FIG. 4 is a diagram illustrating an example architecture 400 of a functional framework for RAN intelligence enabled by data collection, in accordance with the present disclosure. In some scenarios, the functional framework for RAN intelligence may be enabled by further enhancement of data collection through use cases and/or examples. For example, principles or algorithms for RAN intelligence enabled by AI/ML and the associated functional framework (e.g., the AI functionality and/or the input/output of the component for AI enabled optimization) have been utilized or studied to identify the benefits of AI enabled RAN through possible use cases (e.g., energy saving, load balancing, mobility management, and/or coverage optimization, among other examples). In one example, as shown by the architecture 400, a functional framework for RAN intelligence may include multiple logical entities, such as a model training host 402, a model inference host 404, data sources 406, and an actor 408.

The model inference host 404 may be configured to run an AI/ML model based on inference data provided by the data sources 406, and the model inference host 404 may produce an output (e.g., a prediction) with the inference data input to the actor 408. The actor 408 may be an element or an entity of a core network or a RAN. For example, the actor 408 may be a base station (e.g., a gNB), a CU, a DU, and/or an RU, among other examples. In addition, the actor 408 may also depend on the type of tasks performed by the model inference host 404, type of inference data provided to the model inference host 404, and/or type of output produced by the model inference host 404. For example, if the output from the model inference host 404 is associated with beam management, the actor 408 may be a DU or an RU; whereas if the output from the model inference host 404 is associated with Tx/Rx scheduling, the actor 408 may be a CU or a DU.

After the actor 408 receives an output from the model inference host 404, the actor 408 may determine whether to act based on the output. For example, if the actor 408 is a DU or an RU and the output from the model inference host 404 is associated with beam management, the actor 408 may determine whether to change/modify a Tx/Rx beam based on the output. If the actor 408 determines to act based on the output, the actor 408 may indicate the action to at least one subject of action 410. For example, if the actor 408 determines to change/modify a Tx/Rx beam for a communication between the actor 408 and the subject of action 410 (e.g., a UE 120), then the actor 408 may transmit a beam (re-) configuration or a beam switching indication to the subject of action 410. The actor 408 may modify its Tx/Rx beam based on the beam (re-)configuration, such as switching to a new Tx/Rx beam or applying different parameters for a Tx/Rx beam, among other examples.

The data sources 406 may also be configured for collecting data that is used as training data for training an ML model or as inference data for feeding an ML model inference operation. For example, the data sources 406 may collect data from one or more core network and/or RAN entities, which may include the subject of action 410, and provide the collected data to the model training host 402 for ML model training. For example, after a subject of action 410 (e.g., a UE 120) receives a beam configuration from the actor 408, the subject of action 410 may provide performance feedback associated with the beam configuration to the data sources 406, where the performance feedback may be used by the model training host 402 for monitoring or evaluating the ML model performance, such as whether the output (e.g., prediction) provided to the actor 408 is accurate. In some examples, if the output provided by the actor 408 is inaccurate (or the accuracy is below an accuracy threshold), then the model training host 402 may determine to modify or retrain the ML model used by the model inference host, such as via an ML model deployment/update.

As indicated above, FIG. 4 is provided as an example. Other examples may differ from what is described with regard to FIG. 4.

Figure 5:
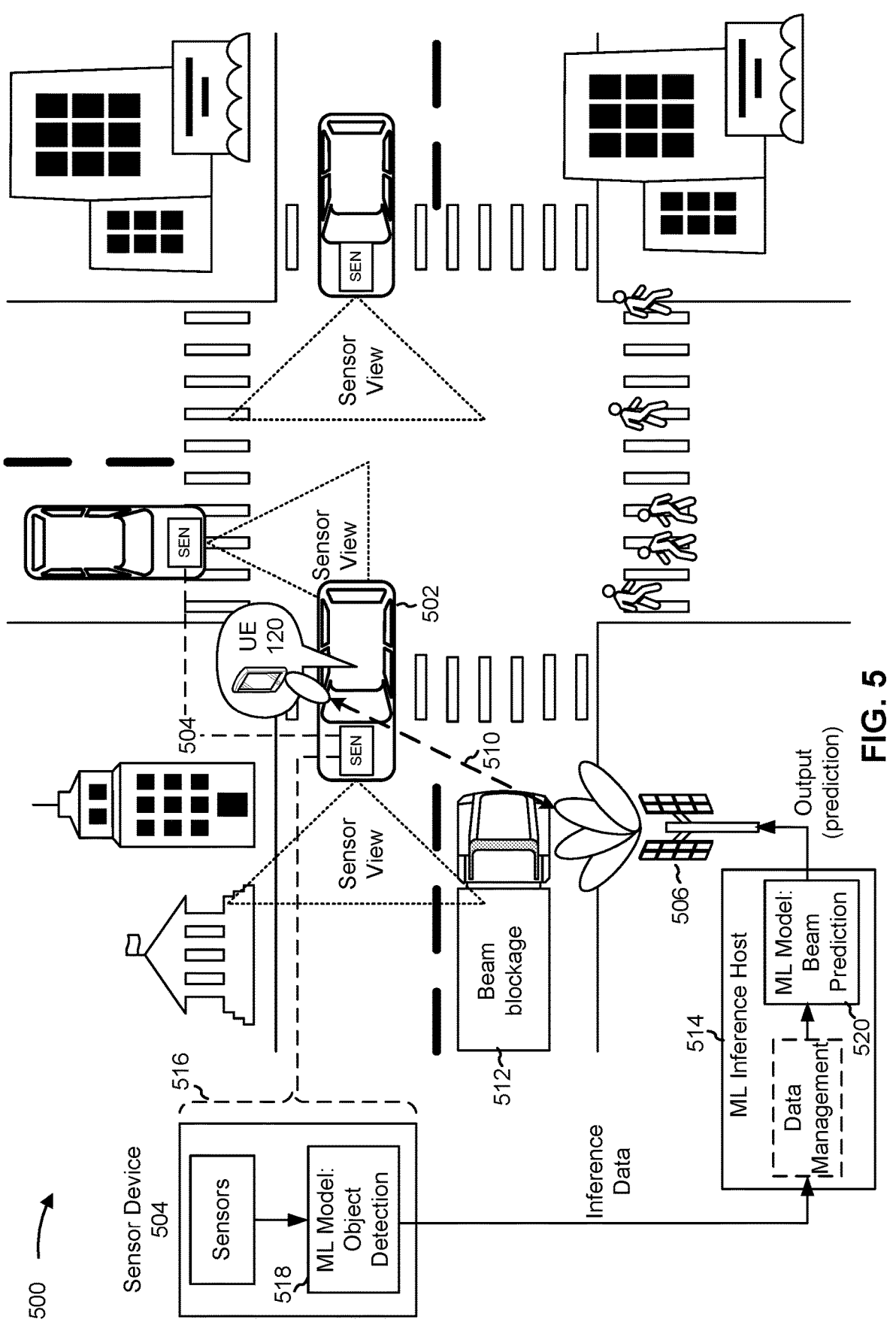
FIG. 5 is a diagram illustrating an example of leveraging data from a sensor of a vehicle to improve wireless communication, in accordance with the present disclosure.

FIG. 5 is a diagram illustrating an example 500 of leveraging data from a sensor of a vehicle to improve wireless communication, in accordance with the present disclosure. A vehicle 502 equipped with a sensor device 504 (which may be referred to as a "sensor data collector") may enter into a coverage area of a network node 506, where the coverage area of the network node 506 may include static objects (e.g., buildings) as well as non-static (e.g., moving) objects (e.g., cars, trucks, buses, and pedestrians). The sensor device 504 may be associated with or include one or more sensors, such as cameras, radars, ultra-sound sensors, and/or lidars, among other examples, which may collectively be referred to as "vehicle sensors." In addition, the sensor device 504 may be a UE or include UE functions (e.g., a vehicle UE (VUE)), such that the sensor device 504 may communicate with a network node or a network entity, such as via a Uu interface connection. As used herein, the vehicle having UE functions, such as the vehicle 502, may be referred to as a UE or a UE associated with a vehicle.

In some scenarios, the radio link quality between the network node 506 and a UE may be impacted by both the static and the non-static objects. For example, a UE 120 in the vehicle 502 may be communicating with the network node 506 based on an LOS path/link. As shown by reference number 510, at times, the communication (e.g., the LOS path/link) between the UE 120 and the network node 506 may be impacted by both moving and/or stationary objects. For example, a moving truck 512 may block the LOS path/link between the UE 120 and the network node 506, which may degrade the wireless link quality between the UE 120 and the network node 506. For purposes of the present disclosure, a wireless device or a UE used by a user in the vehicle 502 may be referred to as an "in-vehicle UE," an "end user UE," or simply an "end user." For a wireless device or a UE that is installed/mounted on a vehicle or associated with the vehicle may be referred to as a "vehicle UE." For example, an in-vehicle UE may include a mobile phone, a tablet computer, or a wearable device, whereas a vehicle UE may include a vehicle onboard computer system, a vehicle sensor device/controller, or a sensor data collector, among other examples.

In some examples, with sensing information provided by the sensor device 504 (e.g., the sensor data collector) of the vehicle 502, on-board computational resources of the vehicle 502, and/or an ML model used by the vehicle 502 for extracting features, the vehicle 502 may be configured to provide ML training data and/or ML inference data and information of the UE 120 (e.g., location, speed, and/or direction of travel, among other examples) to an ML training host (e.g., the Non-RT RIC 315, near-RT RIC 325, the model training host 402, among other examples) or an ML inference host 514 (e.g., the near-RT RIC 325, or the model inference host 404, among other examples) that may be collocated or associated with the network node 506 (or a component of the network node 506) for enhancing the communication between the UE 120 and the network node 506, such as improving the beam management for the UE 120. For example, as shown by reference number 516, the sensor device 504 may use sensors to capture images of the views surrounding the vehicle 502, and the captured images may be processed by the ML model 518 (e.g., an object detection model) that is associated with the sensor device 504 for feature extraction (e.g., for object detection).

For example, captured images or video may be processed by an AI/ML model associated with the sensor device to generate a category map (which may also be referred to as a "segmentation map") that identifies objects in the captured images. The category map may show that the captured images include multiple objects, such as clouds, trees, a human, an aircraft, and/or a building, among other examples. The category map may further be processed by an image signal processor (ISP) unit/hardware associated with the sensor device 504, where the ISP unit/hardware may adjust the color of different segments of the captured images based on the category map and offline tuning data to produce a processed image (e.g., an image with extracted features). In one example of the extracted features, a two-dimensional (2D) array of combined sensing data (e.g., detected points with (x, y) locations from radar or lidar sensors) as an example of point clouds (e.g., dynamic map) from the sensor device may be processed to derive arithmetic dynamic objects such as bounding boxes (e.g., using you only look once (YOLO)-based object detection and localization from radar point clouds).

After features for one or more objects in the area are extracted and processed by the sensor device 504 (e.g., the sensor data collector), the sensor device 504 may transmit the extracted features as inference data to an ML inference host 514 (e.g., the near-RT RIC 325 or the model inference host 404) that is associated with the network node 506. The ML inference host 514 may perform inference using the ML model 520 (e.g., a beam prediction model) based on the inference data and produce an output (e.g., a prediction) to the network node 506. The process of an ML inference host performing inference based on inference data may be referred to as providing an ML inference service or a ML service. Based at least in part on the output, the network node 506 may determine whether to perform an action. For example, the inference data from the sensor device 504 may indicate that there is a truck 512 between the UE 120 and the network node 506. Based on the inference data, the ML inference host 514 may estimate (e.g., predict) that the communication between the UE 120 and the network node 506 may be improved by using a different beam pair, and the ML inference host 514 may transmit such estimation as an output to the network node 506. For purposes of the present disclosure, a "beam pair" or a "beam pair link" may refer to a transmit beam at a transmitting device and a receive beam at a receiving device.

After receiving the output (e.g., the prediction) from the ML inference host 514, the network node 506 may determine whether to act based on the output. For example, if the network node 506 determines to act based on the output, then the network node 506 may generate and transmit a beam configuration to the UE 120. The beam configuration may indicate that the UE 120 is to reconfigure the active beams or beam pairs or candidate beam list and related parameters or transmit a beam switching indication to the UE 120, or to switch the current beam or beam pair between the UE 120 and the network node 506 to the beam or beam pair estimated/predicted by the ML inference host. Alternatively, if the network node 506 determines not to act based on the output, then the network node 506 may ignore the output and continue to communicate with the UE 120 based on the current beam or beam pair. As a result, the network node 506 may proactively manage beams or beam pairs with the UE 120 based on the beam prediction from the ML inference host 514. The beam pair link quality between the UE 120 and the network node 506 may be improved based on the sensing information received from the sensor device 504 of the vehicle 502. In some examples, the sensing information received from the sensor device 504 may be external data to a core network or an RAN (e.g., the sensor data may not be collected or derived within a communication network such as the core network or the RAN).

As indicated above, FIG. 5 is provided as an example. Other examples may differ from what is described with regard to FIG. 5.

Figure 6:
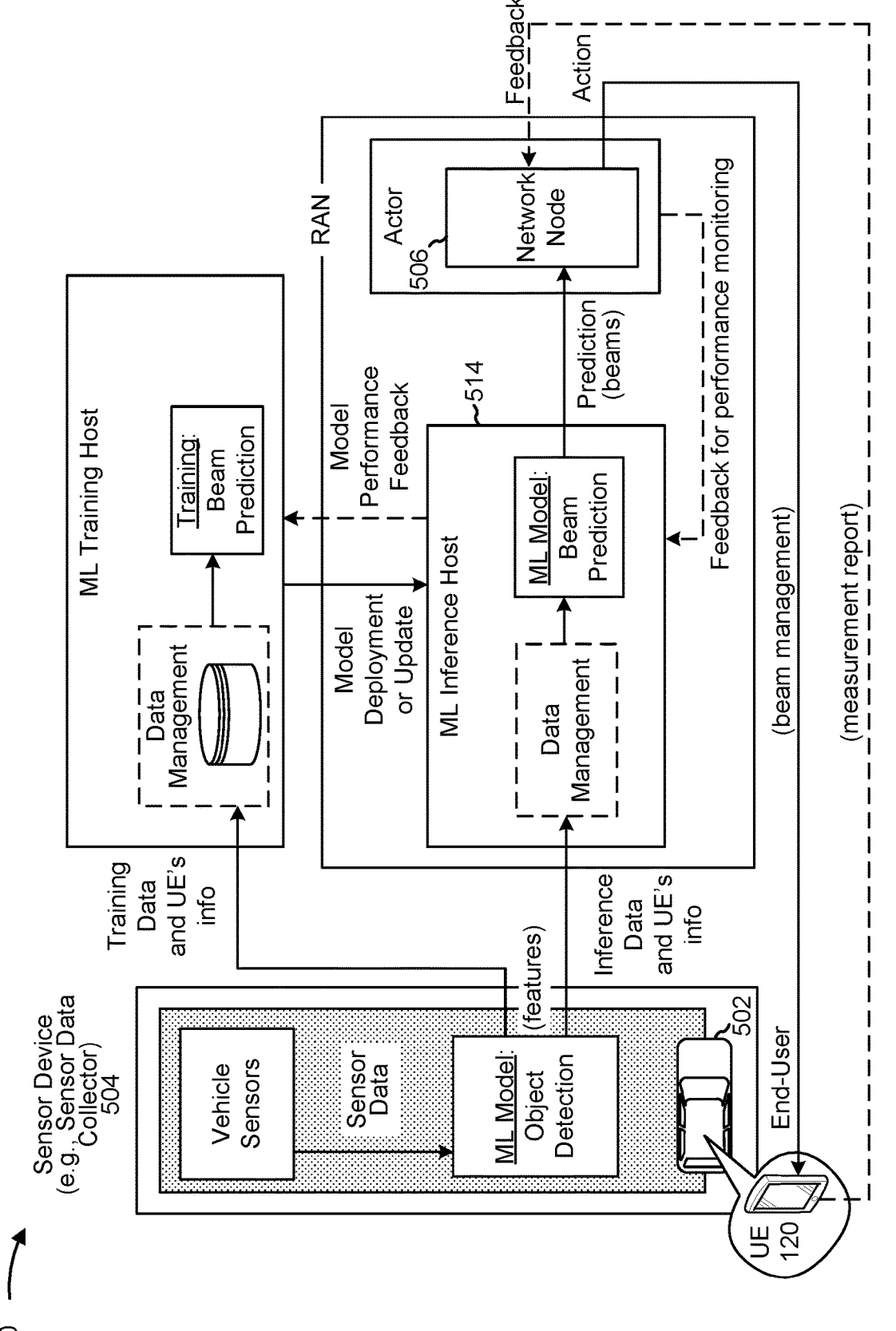
FIG. 6 is a diagram illustrating an example of system architecture for utilizing sensing information from a sensor device to improve wireless communication in accordance with various aspects of the present disclosure.

FIG. 6 is a diagram illustrating an example 600 of system architecture for utilizing sensing information from a sensor device to improve wireless communication in accordance with various aspects of the present disclosure. In one example, as described in connection with FIG. 5, the system architecture may include at least a sensor data collector (e.g., the sensor device 504) that is collocated with a vehicle (e.g., the vehicle 502), an ML inference host (e.g., the near-real time RIC 325, the model inference host 404, or the ML inference host 514), an actor (e.g., the actor 408 or the network node 506), an ML training host (e.g., the non-real time RIC 315, the near-real time RIC 325, or the model training host 402), and an end-user (e.g., an in-vehicle UE, or the UE 120).

In some examples, the sensor data collector may be a vehicle including one or more sensors (e.g., cameras, radars, ultra-sound sensors, and/or lidars) and an ML model for pre-processing the sensor data such as feature extraction (e.g., object detection). The sensor data collector may provide training data to the ML training host for non-real time or offline training (e.g., an ML training host at the non-real time RIC 315 or model training host 402) or for online training (e.g., an ML training host at the near-real time RIC 325 or model training host 402), and the sensor data collector may provide training data or inference data and information associated with the end-user (e.g., the in-vehicle UE), respectively, to the ML training host for offline or online training or to the ML inference host for near real time inference. The ML inference host may be collocated with the actor (e.g., a network node 506) and may make inference (e.g., predictions) based on the inference data and information associated with the end-user provided by the sensor data collector. The actor may receive inference output (e.g., predictions) produced by the ML inference host with ML inference model (e.g., a beam prediction), and the actor may determine whether to indicate at least one action (e.g., a beam indication) to the end-user. The end-user (e.g., the in-vehicle UE) may take actions indicated by the actor and report measurement accordingly to the actor. As used herein, an "ML training data service" may refer to a device (e.g., a sensor device) providing ML training data to an ML training host, and an "ML training service" may refer to an ML training host providing ML training to another ML function/ entity, such as an ML inference host. Similarly, an "ML inference data service" may refer to a device (e.g., a sensor device) providing ML inference data to an ML inference host, and an "ML inference service" may refer to an ML inference host providing ML inference to a base station or to one or more components, functionalities, or entities of the base station. In some examples, the "ML training data service," the "ML training service," the "ML inference data service," and/or the "ML inference service" may be collectively referred to as an "ML data service" or a "machine learning service."

As indicated above, FIG. 6 is provided as an example. Other examples may differ from what is described with regard to FIG. 6.

Figure 7:
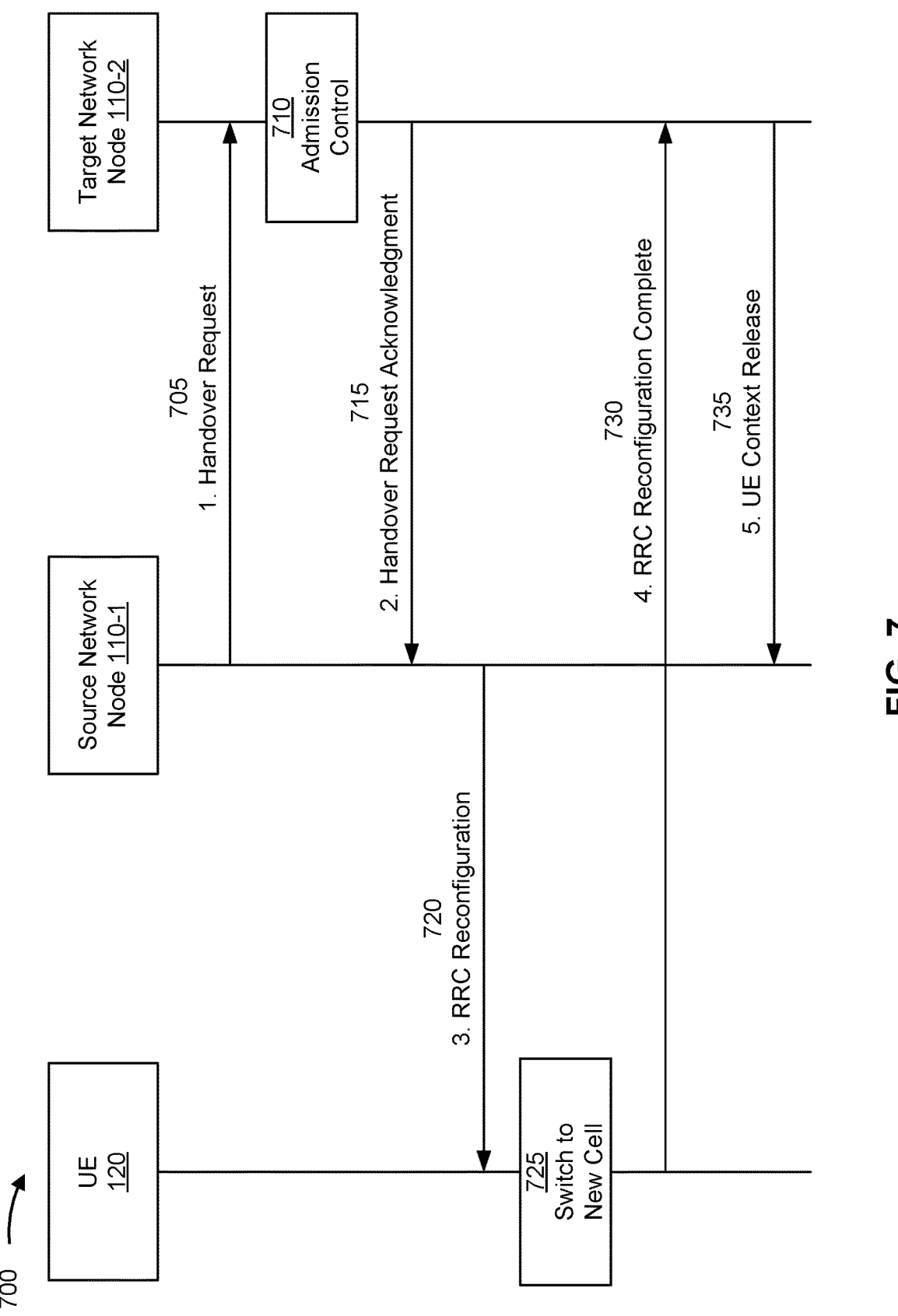
FIG. 7 is a diagram illustrating an example of a handover procedure, in accordance with the present disclosure.

FIG. 7 is a diagram illustrating an example of a handover procedure 700, in accordance with the present disclosure. The handover procedure 700 may be performed by a UE 120, a source network node 110-1, and a target network node 110-2. As used herein, a "source" network node may refer to a network node that a UE currently has an established connection with (e.g., an established RRC connection). A source network node may also be referred to as a serving network node. As used herein, a "target" network node may refer to a network node that has been selected (e.g., by a source network node or a core network node) as a new source network node for a UE as part of a handover procedure. A "candidate" network node may refer to a network node that is available to be selected as a target network node for the handover procedure. For example, the UE 120 may be configured (e.g., by the source network node 110-1) to perform measurements associated with one or more candidate network nodes. The UE 120 may transmit a measurement report indicating the measurements associated with the one or more candidate network nodes. In some examples, the source network node 110-1 may use the measurement reports to select the target network node 110-2 from the one or more candidate network nodes (e.g., the target network node 110-2 may be associated with a highest measurement value as indicated by the measurement report).

As shown in FIG. 7, and by reference number 705, the source network node 110-1 may initiate handover of the UE 120 to the target network node 110-2 by transmitting a handover request message to the target network node 110-2. The source network node 110-1 may transmit the handover request message to the target network node 110-2 over an Xn, X2, midhaul, backhaul, or a next generation application protocol (NGAP) interface, among other examples. As shown by reference number 710, the target network node 110-2 may perform admission control procedures associated with the handover based at least in part on receiving the handover request message. As shown by reference number 715, the target network node 110-2 may transmit a handover request acknowledgment message (e.g., handover response message) to the source network node 110-1 (e.g., if the admission control procedures indicate that the target network node 110-2 can accept the handover of the UE 120). The handover request acknowledgment message may include an RRC configuration for connection to the target network node 110-2.

As shown by reference number 720, the source network node 110-1 may transmit the RRC configuration message (e.g., in an RRC reconfiguration message) to the UE 120 by forwarding the RRC configuration of the handover request acknowledgment message to the UE 120 (e.g., handover command). As shown by reference number 725, the UE 120 may change an RRC connection from the source network node 110-1 to the target network node 110-2 based at least in part on the RRC configuration. As shown by reference number 730, the UE 120 may transmit an RRC reconfiguration complete message to the target network node 110-2. The RRC reconfiguration complete message may indicate that the UE 120 has changed the RRC connection from the source network node 110-1 to the target network node 110-2. As shown by reference number 735, the target network node 110-2 may transmit a UE context release message to the source network node 110-1. The UE context release message may indicate that the handover of the UE 120 to the target network node 110-2 was successful.

In some examples, the UE 120 may be unable to successfully connect with the target network node 110-2. For example, the UE 120 may attempt to connect with the target network node 110-2 (e.g., by performing a random access channel (RACH) procedure with the target network node 110-2), but the attempt to connect with the target network node 110-2 may fail. If the UE 120 is unable to successfully connect with the target network node 110-2, then the UE 120 may perform a connection re-establishment procedure to (re-)establish a connection with the source network node 110-1 or another network node 110. For example, the UE 120 may transmit an RRC re-establishment request message to the network (e.g., to the source network node 110-1 or another network entity). Additionally, the UE 120 may reset a medium access control (MAC) entity of the UE 120, release the RRC configuration for the handover procedure, suspend all radio bearers (except SRB0, in some examples), release a connection with any configured SCells, and/or release all other configurations stored by the UE 120, among other examples. Therefore, the UE 120 may (re-)establish an RRC connection (e.g., with the source network node 110-1 or another network node 110) in the event that the handover procedure with the target network node 110-2 fails.

The handover procedure 700 described above may ensure communication continuity for the UE 120. In other words, the handover procedure 700 may ensure that the UE 120 is enabled to continue to transmit and/or receive data as the UE 120 moves from one cell (e.g., associated with the source network node 110-1) to another cell (e.g., associated with the target network node 110-2) by handing over a communication connection (e.g., an RRC connection) from the source network node 110-1 to the target network node 110-2. For example, the UE 120 may be configured to switch from communicating using a beam (or beam pair) associated with the source network node 110-1 to using a beam (or beam pair) associated with the target network node 110-2 as part of the handover procedure 700.

As described in more detail elsewhere herein (such as in connection with FIGS. 4-6), the source network node 110-1 and/or other devices may be leveraging machine learning predictions and/or machine learning service to improve a communication performance for the UE 120 (e.g., to make improved beam selections and/or beam blockage predictions). For example, the UE 120 may be associated with a vehicle UE that is collecting sensor data and performing pre-processing of the sensor data to obtain machine learning data associated with objects detected in the vicinity of the vehicle UE. The vehicle UE may be providing the machine learning data to the source network node 110-1 and/or an inference host (e.g., a source inference host) associated with the source network node 110-1. The source network node 110-1 and/or the source inference host may be using the machine learning data (e.g., provided by the vehicle UE) to make predictions for the UE 120 using a machine learning model, such as beam selection predictions, beam blockage predictions, and/or other predictions.

However, when the UE 120 is handed over to the target network node 110-2 (e.g., as part of the handover procedure 700), the target network node 110-2 and/or an inference host associated with the target network node 110-2 may not have the benefit of the machine learning data and/or predictions. For example, in some cases, the target network node 110-2 may not be capable of performing such machine learning operations (e.g., the target network node 110-2 may not be associated with an inference host or the inference host associated with the target network node 110-2 may not be capable of performing the machine learning operations). As a result, communication performance of the UE 120 may be degraded because the target network node 110-2 may not be capable of performing the machine learning operations to predict beam blockages and/or select a best beam or beam pair to be used by the UE 120.

As another example, even if the target network node 110-2 and/or an inference host associated with the target network node 110-2 (e.g., a target inference host) are capable of performing the machine learning operations, the target network node 110-2 and/or the target inference host may have to establish a communication session with the UE 120 and with the vehicle UE (e.g., for the exchange of machine learning data from the vehicle UE with the target inference host). Additionally, it may take some time for the machine learning model executing on the target inference host to converge and provide meaningful and/or accurate predictions. Therefore, there may be some time after the UE 120 is handed over to the target network node 110-2 during which no machine learning predictions and/or inaccurate machine learning predictions are used to select communication parameters (e.g., a beam, or a beam pair, among other examples) for the UE 120. As a result, communication performance of the UE 120 may be degraded because of the delay associated with establishing a communication session for the exchange in machine learning data from the vehicle UE and/or in converging a machine learning model used by the target inference host.

Some techniques and apparatuses described herein enable UE machine learning service continuity. For example, some techniques and apparatuses described herein enable a machine learning service associated with a UE which is to be continued when the UE 120 is performing a handover procedure from a first network node to a second network node. In some aspects, handover procedure may include a handover from a source network node to a target network node and from a source inference host to a target inference host.

For example, in some aspects, a machine learning service for a UE 120 may have continued via a handover associated with an Xn interface, a midhaul interface, or a backhaul interface. For example, a first network node (e.g., a source network node) may transmit, to a second network node (e.g., a target network node), a handover request communication associated with a handover procedure for a UE 120, where the second network node is selected (e.g., by the source network node) for the handover procedure based at least in part on at least one of first machine learning service information associated with the UE 120 or a machine learning capability associated with the second network node. As another example, a machine learning service for a UE 120 may have continued via a handover associated with an N2 interface. For example, a core network node (e.g., an access and mobility function (AMF)) may transmit, to a second network node (e.g., a target network node), a handover request communication associated with a handover procedure for a UE 120, where the second network node is selected (e.g., by the AMF) for the handover procedure based at least in part on at least one of first machine learning service information associated with the UE 120 or a machine learning capability associated with the second network node.

The target network node and an inference host associated with the target network node may communicate with a UE (e.g., a vehicle UE), that is providing machine learning data associated with a machine learning service for an end user UE, to establish a communication session (e.g., a protocol data unit (PDU) session) for providing the machine learning data associated with the machine learning service for the end user UE. Additionally, the target inference host associated with the target network node may receive machine learning data and/or machine learning service information associated with the source inference host. The target inference host may make one or more predictions (e.g., a best beam or beam pair to be used for communications between the end user UE and the target network node) based on the machine learning data provided by the UE (e.g., the vehicle UE). The end user UE may be handed over to the target network node in accordance with the one or more predictions.

As a result, machine learning service continuity and machine learning data continuity may be maintained when an end user UE is handed over from a first network node to a second network node. This enables the target network node to perform the handover procedure using one or more machine learning predictions associated with the end user UE. Additionally, techniques and operations described herein may improve a likelihood that the end user UE to handed over to a network node that is capable of performing machine learning operations associated with the machine learning service. By ensuring machine learning service continuity and machine learning data continuity as part of a handover procedure, communication performance of the UE (e.g., an end user UE) may be improved (e.g., because the target network node may quickly utilize accurate machine learning predictions to select communications parameters associated with the UE).

As indicated above, FIG. 7 is provided as an example. Other examples may differ from what is described with respect to FIG. 7.

Figure 8:
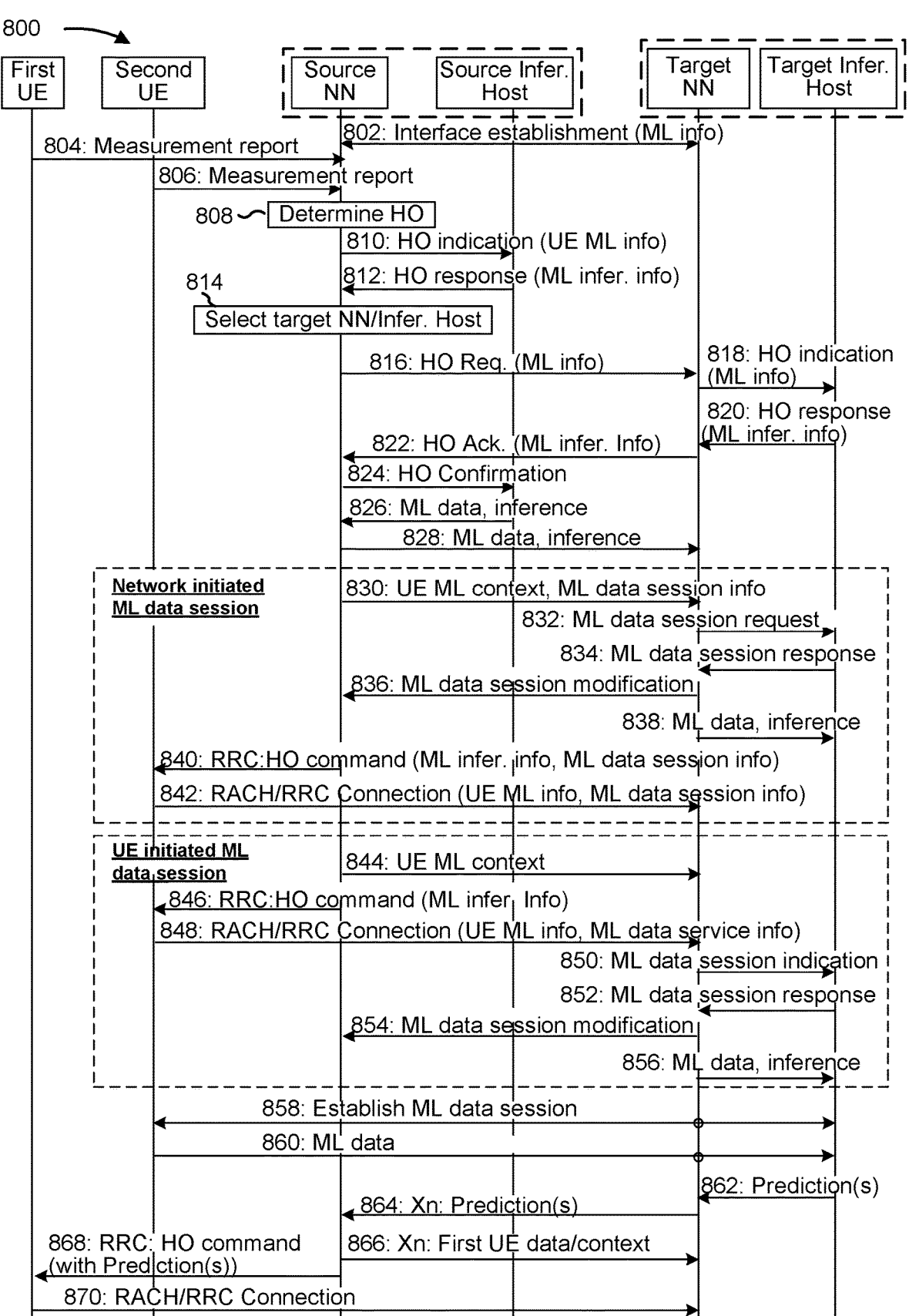
FIG. 8 is a diagram illustrating an example associated with UE machine learning service continuity, in accordance with the present disclosure.

FIG. 8 is a diagram illustrating an example 800 associated with UE machine learning service continuity, in accordance with the present disclosure. As shown in FIG. 8, example 800 includes communication between a first UE (e.g., a UE 120), a second UE (e.g., a UE 120), a source network node (e.g., a network node 110 or the network node 506, among other examples), a source inference host (e.g., a near-RT RIC 325, a non-RT RIC 315, a model inference host 404, or a ML inference host 514, among other examples), a target network node (e.g., a network node 110 or the network node 506, among other examples), and a target inference host (e.g., a near-RT RIC 325, a non-RT RIC 315, a model inference host 404, or a ML inference host 514, among other examples). In some aspects, the devices and/or nodes depicted in FIG. 8 may be included in a wireless network, such as the wireless network 100. In some aspects, the first UE and/or the second UE may have established a communication connection with the source network node prior to the operations depicted in FIG. 8.

As used herein, a network node "transmitting" a communication to a UE may refer to a direct transmission (for example, from the network node to the UE) or an indirect transmission via one or more other network nodes or devices. For example, if the network node is a DU, an indirect transmission to the UE may include the DU transmitting a communication to an RU and the RU transmitting the communication to the UE 120. Similarly, a UE "transmitting" a communication to a network node may refer to a direct transmission (for example, from the UE to the network node) or an indirect transmission via one or more other network nodes or devices. For example, if the network node is a DU, an indirect transmission to the network node may include the UE transmitting a communication to an RU and the RU transmitting the communication to the DU.

As used herein, a UE "transmitting" or "receiving" a signal or communication to or from an inference host may refer to the UE transmitting or receiving the signal or communication via a network node associated with the inference host. For example, a UE may communicate with an inference host via the network node associated with the inference host.

The source inference host may be associated with the source network node (e.g., may provide machine learning services associated with the source network node). Similarly, the target inference host may be associated with the target network node (e.g., may provide machine learning services associated with the target network node). In some aspects, the source inference host and the source network node may be co-located and/or the target inference host and the target network node may be co-located. In some aspects, the source inference host and the source network node may not be co-located and/or the target inference host and the target network node may not be co-located. In some aspects, the source inference host may be co-located or near (e.g., geographically) a CU of the source network node. Additionally, or alternatively, the target inference host may be co-located or near (e.g., geographically) a CU of the target network node. In some aspects, the source inference host may be co-located or near a DU or an RU of the source network node. Additionally, or alternatively, the target inference host may be co-located or near a DU or an RU of the target network node.

The first UE may be an end user UE. The second UE may be a vehicle UE (e.g., may be associated with, or included in, a vehicle). That is, the second UE may be associated with one or more sensor devices (e.g., in a similar manner as described in connection with FIGS. 5 and 6). Although the second UE is described herein as being associated with a vehicle, the second UE may be associated with other devices or machines (e.g., that are capable of obtaining sensor data in a similar manner as described herein). In some aspects, a UE 120 may be capable of obtaining sensor data in a similar manner as described herein. In such examples, the first UE and the second UE may be a single device (e.g., a single UE 120 may perform the operations that are described herein as being separately performed by the first UE and the second UE). In some aspects, the first UE and the second UE may communicate with one another, such as via sidelink communication, Bluetooth communication, Wi-Fi communication, and/or PC5 communication, among other examples.

Although some examples described herein are associated with an object detection machine learning data service associated with the second UE (e.g., a vehicle UE), the operations and techniques described herein may be similarly applied to any machine learning service. For example, the machine learning service may be any machine learning service associated with the first UE and/or the second UE that is continued (e.g., handed over) when the first UE and/or the second UE is handed over from the source network node to the target network node.

In some aspects, as shown by reference number 802, the source network node and the target network node may communicate to establish a communication connection via an interface. The interface may be a communication interface between RAN nodes in the wireless network, such as an Xn interface, an X2 interface, a backhaul interface, or a midhaul interface, among other examples. As part of establishing the communication connection, the source network node and the target network node may exchange ML information. The ML information may indicate one or more ML capabilities. For example, the source network node may transmit, and the target network node may receive, ML information that indicates whether the source network node is capable of performing one or more machine learning operations. Similarly, the target network node may transmit, and the source network node may receive, ML information that indicates whether the target network node is capable of performing one or more machine learning operations. In some aspects, the ML information exchanged between the source network and the target network may include one or more ML services such as ML training services and/or ML inference services. In some aspects, the ML information exchanged between the source network and the target network may include one or more ML training hosts and/or ML inference hosts, one or more ML models associated with an ML training host or an ML inference host. In some aspects, the ML information exchanged between the source network and the target network may include ML data information for ML training service and/or ML inference service, where the ML data information may include one or more ML data types or formats associated with an ML model.

In some aspects, the ML information may indicate whether a network node is associated with an inference host. For example, the source network node may transmit, and the target network node may receive, an indication that the source network node is associated with at least an inference host (e.g., the source inference host). Similarly, the target network node may transmit, and the source network node may receive, an indication that the target network node is associated with at least an inference host (e.g., the target inference host). In some aspects, the ML information may indicate additional information associated with ML capabilities of an inference host. For example, the ML information may indicate one or more machine learning models supported by an inference host (e.g., a beam prediction model, a handover prediction model, a scheduling model, and/or other machine learning models). In this way, the source network node may identify which candidate network nodes (e.g., the target network node) are capable of performing operations to support a machine learning service associated with the first UE and/or the second UE.

For example, the source network node and/or the source inference host may support a machine learning service for the first UE and/or the second UE (e.g., in a similar manner as described above in connection with FIGS. 4-6). For example, the second UE may obtain sensor data (such as one or more sensor measurements or sensor information) via one or more sensor devices. The second UE may (pre)process the sensor data via a machine learning model (e.g., an object detection model, in a similar manner as described above in connection with FIG. 5). The second UE may obtain an output of the machine learning model (e.g., which may be referred to herein as machine learning data) associated with object detections that are based at least in part on the sensor data. For example, the second UE may process the sensor data to identify one or more objects in the vicinity of the second UE and/or to identify information associated with the one or more objects (e.g., a geographic location, a speed, and/or a direction of travel, among other examples). The second UE may transmit (e.g., to the source network node and/or to the source inference host) the machine learning data associated with object detection predictions for a machine learning service. Additionally, the second UE may transmit (e.g., to the source network node and/or to the source inference host) UE information associated with the first UE or the second UE (e.g., a location, a speed, a direction of travel, an orientation, and/or beam information, among other examples) for a machine learning service. The source inference host may use the machine learning data and UE information as an input to a machine learning model executing on the source inference host. The machine learning model may output one or more predictions associated with the first UE and/or the second UE, such as a beam prediction or a beam blockage prediction for the first UE (e.g., in a similar manner as described above in connection with FIGS. 5 and 6). In this way, the source network node and/or the source inference host may support a machine learning service for an end user UE (e.g., the first UE) using machine learning data and UE information provided by the second UE. For example, a machine learning model associated with the source inference host may be trained and/or operational for the machine learning service associated with the first UE and/or the second UE prior to the operations depicted in FIG. 8.

As used herein, "machine learning data service" may refer to a machine learning operation performed by the second UE (e.g., to generate the machine learning data). "Machine learning inference service" may refer to a machine learning operation performing by an inference host, such as the source inference host or the target inference host.

As shown by reference number 804, the first UE may transmit a measurement report. Additionally, or alternatively, as shown by reference number 806, the second UE may transmit a measurement report. The source network node may receive a measurement report associated with the first UE and/or the second UE. A measurement report may indicate one or more measurements of candidate cells or candidate network nodes (e.g., including the target network node). For example, the first UE and/or the second UE may be configured (e.g., by the source network node or another network node) to perform (e.g., periodically or triggered by an event or condition, such as machine learning performance monitoring) measurements of a serving network node (e.g., the source network node) and/or one or more candidate network nodes (e.g., including the target network node). For example, the measurements may include RSRP measurements, RSSI measurements, signal strength measurements, signal quality measurements, and/or machine learning performance monitoring based measurements, among other examples.

As shown by reference number 808, the source network node may determine that a handover (HO) procedure should be initiated for the first UE and/or the second UE. For example, the source network node may determine to initiate the handover procedure based at least in part on a measurement value associated with the target network node and/or the source network node. For example, the source network node may determine that a measurement value associated with the source network node is less than or equal to a threshold. Additionally, or alternatively, the source network node may determine that a measurement value associated with the target network node and/or one or more other candidate network nodes is greater than a measurement value associated with the source network node (e.g., by a threshold amount), where the target network node may be associated with at least an inference host which may support the ML service to the first or second UE provided by the source inference host and the ML data service provided by the second UE. As a result, the source network node may initiate the handover procedure for the first UE and/or the second UE.

As shown by reference number 810, the source network node may transmit, and the source inference host may receive, a handover communication. In some aspects, the handover communication may be a handover indication communication. The handover communication may indicate information associated with the machine learning service for the first UE and/or the second UE. For example, the information associated with the machine learning service may include UE information or UE context, such as an identifier associated with the first UE and/or the second UE (e.g., UE identifiers), a geographic location associated with the first UE and/or second UE, a direction of travel associated with the first UE and/or second UE, a speed associated with the first UE and/or second UE, beam information associated with the first UE and/or second UE, an orientation of the first UE relative to the second UE, and/or a traveling direction, among other examples. Additionally, or alternatively, the information associated with machine learning service may include a machine learning capability of the second UE (e.g., one or more machine learning features supported by the second UE) and/or machine learning data service information provided by the second UE, among other examples. For example, the information associated with the machine learning service may include an indication of a machine learning model (e.g., a machine learning model type, name, identifier, and/or index associated with one or more functions and/or function structures with a set of parameters which may be preconfigured or configured or updated based on offline or online training or inference monitoring) executing on the second UE (e.g., for features extraction) that is associated with the machine learning service (e.g., a first machine learning service type, name, identifier, and/or index associated with a set of parameters including one or more QoS profiles or QoS flows) provided to the first UE and/or the second UE, and/or a machine learning data service (e.g., a second machine learning service type, name, identifier, and/or index with a set of parameters including one or more QoS profiles or QoS flows, ML data type(s) or format(s)) providing machine learning data (e.g., ML inference data) via features extraction (e.g., object detection) performed by the second UE for the machine learning service for the first UE and/or the second UE, among other examples. The information associated with the machine learning service provided by the second UE may be referred to herein as or "machine learning service information."

As shown by reference number 812, the source inference host may transmit, and source network node may receive, a handover communication indicating machine learning inference information associated with the machine learning service for the first UE and/or the second UE. As described elsewhere herein, "machine learning inference information" may refer to information associated with, or provided by, an inference host. "Machine learning service information" may refer to information associated with, or provided by, a UE. In some aspects, the handover communication may be a handover response communication. The handover response communication may be in response to the handover indication communication transmitted by the source network node (e.g., as described in connection with reference number 810). The machine learning inference information may include an indication of a machine learning model (e.g., a machine learning model type, name, identifier, and/or index associated with one or more functions and/or function structures with a set of parameters which may be preconfigured or configured or updated based on offline or online training or inference monitoring) executing on the source inference host that is associated with the machine learning service (e.g., the first machine learning service type, name, identifier, and/or index as described above in connection with reference number 810), a status of predictions associated with the machine learning service for the first UE and/or the second UE, machine learning inference data information (e.g., associated with the second machine learning service type, name, identifier, and/or index as described above in connection with reference number 810) provided by the second UE, among other examples.

For example, the handover indication communication may indicate to the source inference host that the first UE and/or the second UE are to be handed over to a different network node. The handover indication communication may identify the first UE and/or the second UE in addition to machine learning information associated with the first UE and/or the second UE to enable the source inference host to identify the machine learning inference information associated with the machine learning service for the first UE and/or the second UE and/or the machine learning information associated with the machine learning data service provided by the second UE. The handover response communication may provide information related to the machine learning operations performed by the source inference host in connection with the machine learning service and/or the machine learning data provided by the second UE for the machine learning operations performed by the source inference host. This may enable the source network node to make improved handover determinations for the first UE and/or the second UE (e.g., taking information associated with the machine learning service and machine learning data service into account to improve a likelihood of continuity associated with the machine learning service).

For example, as shown by reference number 814, the source network node may select the target network node and/or the target inference host for the handover procedure. The source network node may select the target network node and/or the target inference host based at least in part on the machine learning capability of the second UE, machine learning data service information (e.g., as described above in connection with reference number 810), machine learning inference information (e.g., received from the source inference host as described above in connection with reference number 812) and/or a machine learning capability associated with the target network node (e.g., received by the source network node as described above in connection with reference number 802), among other examples. In other words, the source network node may take information associated with the machine learning service into account when selecting the target network node associated with the target inference host for the handover procedure. For example, the source network node may select a target network node (and an associated target inference host) based at least in part on received machine learning information (e.g., the second UE's machine learning data service information and the source inference host's machine learning inference information).

For example, the source network node may identify a candidate network node that is associated with a best measurement value (e.g., as indicated by the first UE and/or the second UE). The source network node may determine whether the identified candidate network node is capable of performing machine learning operations and/or if the identified candidate network node is capable of performing the machine learning service associated with the first UE and/or the second UE. If the identified candidate network node is capable of performing machine learning operations and/or is capable of performing the machine learning service, then the source network node may select the candidate network node as a target network node for the handover procedure. However, if the identified candidate network node is not capable of performing machine learning operations and/or is not capable of performing the machine learning service, then the source network node may not select the candidate network node as a target network node for the handover procedure. For example, a candidate network node may be associated with a better or greater measurement value than the target network node (e.g., as indicated by a measurement report received by the source network node as described above in connection with reference number 804 and/or 806). However, the candidate network node may be unable to support the machine learning service associated with the first UE and/or the second UE. Therefore, the source network node may refrain from selecting the candidate network node as a target network node for the handover procedure. This may improve a likelihood that the machine learning service and/or the machine learning data service may be continued for the first UE and/or the second UE after the handover procedure is performed.

As shown by reference number 816, the source network node may transmit, and the target network node may receive, a handover request communication associated with the handover procedure for the first UE and/or the second UE. In some aspects, the handover request communication may be transmitted via an Xn interface. The handover request communication may indicate the machine learning information (e.g., the second UE's machine learning data service information and the source inference host's machine learning inference information) received by the source network node. For example, the handover request communication may indicate the ML inference information (e.g., received from the source inference host as described above in connection with reference number 812) and/or the ML data service information associated with the second UE, among other examples. This may enable the target network node to identify information associated with the machine learning service that is to be supported by the target inference host.

As shown by reference number 818, the target network node may transmit, and the target inference host may receive, a handover communication indicating some, or all, of the machine learning information indicated in the handover request communication received from the source network node. In some aspects, the handover communication may be a handover indication communication. In some aspects, the handover communication may indicate machine learning information associated with the first UE and/or the second UE. The handover communication to the target inference host may indicate the second UE's machine learning data service information and/or the machine learning inference information associated with the source inference host, among other examples.

As shown by reference number 820, the target inference host may transmit, and the target network node may receive, a handover communication indicating whether the target inference host is capable of supporting the machine learning service. In some aspects, the handover communication may be a handover response communication. For example, the target inference host may determine whether the target inference host is capable of supporting the machine learning service based at least in part on the machine learning information indicated in the handover indication communication received from the target network node. For example, the target inference host may determine whether the target inference host supports a machine learning model associated with the machine learning service. For example, if the machine learning service is associated with a beam prediction, then the target inference host may determine whether the target inference host supports a beam prediction machine learning model. For example, the target inference host may determine whether the target inference host supports a machine learning data service provided by the second UE. For example, if the machine learning data service is associated with extracted features (e.g., detected objects in a certain data type or format), then the target inference host may determine whether the target inference host supports the machine learning data service for its machine learning inference model.

If the target inference host cannot support the machine learning service and/or the machine learning data service, then the handover response communication may indicate that the handover procedure cannot be completed. Alternatively, if the target inference host does support the machine learning service with the machine learning data service provided by the second UE, then the handover response communication may indicate that the handover procedure may proceed. In this way, the target network node may communicate, with the target inference host, to determine that the target inference host is capable of supporting the machine learning service with the machine learning data service provided by the second UE.

If the target inference host determines that the machine learning service is supported, then the target inference host may include machine learning inference information associated with the target inference host. For example, the handover response communication transmitted to the target network node may include the target inference host identifier, a machine learning model or machine learning inference model (e.g., a machine learning model type, name, identifier, and/or index associated with one or more functions and/or function structures with a set of parameters which may be preconfigured or configured or updated based on offline or online training or inference monitoring) executing on the target inference host that is associated with the machine learning service or machine learning inference service (e.g., the first machine learning service type, name, identifier, and/or index as described above in connection with reference number 810), machine learning inference information or machine learning data (e.g., a machine learning data service type, name, identifier, and/or index with a set of parameters including one or more QoS profiles or QoS flows, ML data type(s) or format(s)), and/or other machine learning data associated with the machine learning service associated with the target inference host.

As shown by reference number 822, the target network node may transmit, and the source network node may receive, a handover acknowledgement communication. In some aspects, the handover acknowledgement communication may be transmitted via an Xn interface. The handover acknowledgement communication may indicate whether the handover is approved or accepted by the target network node. For example, if the target inference host indicates that the machine learning service is not supported (e.g., in the handover response communication received by the target network node as described above in connection with reference number 820), then the handover acknowledgement communication transmitted to the source network node may indicate that the handover procedure is rejected. Alternatively, if the target inference host indicates that the machine learning service is supported (e.g., in the handover response communication received by the target network node as described above in connection with reference number 820), then the handover acknowledgement communication transmitted to the source network node may indicate that the handover procedure is approved.

Additionally, the handover acknowledgement communication may indicate machine learning inference information associated with the target inference host. For example, the handover acknowledgement communication transmitted to the source network node may include an indication of a machine learning model executing on the target inference host that is associated with the machine learning service, a machine learning inference host identifier associated with the target inference host, and/or machine learning inference data information, among other examples.

As shown by reference number 824, the source network node may transmit, and the source inference host may receive, a handover confirmation communication based at least in part on the source network node receiving the handover acknowledgement communication from the target network node. For example, the source network node may indicate to the source inference host that the handover of the first UE and/or the second UE is confirmed and/or is proceeding.

As shown by reference number 826, the source inference host may transmit, and the source network node may receive, machine learning data (e.g., machine learning inference data provided by the second UE) and/or machine learning inference (e.g., prediction provided by the source inference host) for the machine learning inference service or machine learning service associated with the first UE and/or the second UE. For example, based at least in part on receiving the handover confirmation communication, the source inference host may provide the machine learning data or machine learning inference for the machine learning inference service or machine learning service associated with the first UE and/or the second UE to the source network node. As shown by reference number 828, the source network node may transmit, and the target network node may receive, the machine learning data and/or machine learning inference for the machine learning inference service or machine learning service associated with the first UE and/or the second UE. For example, the source network node may forward (e.g., to the target network node) the machine learning data or machine learning data from the second UE that is buffered at the source inference host and/or the machine learning inference (e.g., using the machine learning data from the second UE) that is generated at the source inference host.

In some aspects, the ML data session (e.g., associated with an ML model executing on the second UE) or the ML inference data session (e.g., associated with an ML model executing on an inference host) may be initiated by a network node (e.g., the target network node), as described in connection with reference numbers 830 through 842. Additionally, or alternatively, the ML data session or ML inference data session may be initiated by a UE (e.g., the second UE) when the UE makes connection with the target network node, as described in connection with reference numbers 844 through 856.

As shown by reference number 830, the source network node may transmit, and the target network node may receive, information associated with a machine learning context of the first UE and/or the second UE and machine learning data session information associated with the second UE. For example, the UE ML context may indicate UE information (e.g., the first UE identifier, the second UE identifier, and/or UE ML capability, among other examples) associated with the machine learning inference service or machine learning service that is to be maintained by the target network node associated with the first UE and/or the second UE and/or associated with the machine learning inference data service that is provided by the second UE. For example, the machine learning data session information associated with the second UE may indicate the configuration associated with the machine learning data session. The machine learning data session may include one or more radio bearers (e.g., signaling radio bearers (SRBs) and data radio bearers (DRBs) and/or one or more PDU sessions with associated parameters such as QoS profiles or QoS flows or 5G QoS Identifiers (5QIs). In some aspects, if an inference host is allocated, in a logical architecture, in a higher layer than the communication protocol stack of a network node (e.g., at the sublayer or adaptation layer for machine learning services), one or more radio bearers (e.g., DRBs with associated QoS flows) and/or PDCP entities and/or logical channels may be established by the network node for the network node user plane.

In such examples, the machine learning data session information may include the information associated with the radio bearers (e.g., radio bearer identifier, 5QIs, QoS flows, or QoS profiles with QoS parameters and QoS characteristics, etc.). In some aspects, if an inference host is anchored at a local user plane function (UPF) (e.g., which is co-located with a network node), one or more PDU sessions may be initiated by the network node. In this case, the machine learning data session information may include the information associated with the PDU sessions (e.g., PDU session identifier, PDU session type, service and session continuity mode, user plane security information, slice identifier for machine learning, and/or QoS flows based on 5QI or QoS profiles, among other examples).

In some aspects, the target network node and the target inference host may communicate to establish a machine learning data session (e.g., establishing a user plane for data traffic) to be used for exchanging machine learning data with the second UE, such as when the target inference host is co-located with the target network node. For example, the target network node may handle the PDU session establishment (e.g., when the PDU session is anchored at a local UPF connected to the target inference host). In some other aspects, a core network node may handle the PDU session establishment (e.g., a core network node may switch a PDU session associated with the second UE from being associated with the source inference host to being associated with the target inference host), such as when the target inference host is not co-located with the target network node. In such examples, the target network node or the source network node may transmit, and the core network node may receive, a request to switch a PDU session associated with the second UE from the source inference host to the target inference host.

As shown by reference number 832, the target network node may transmit, and the target inference host may receive, a first data session communication requesting one or more data sessions for the machine learning data service provided by the second UE for the machine learning service for the first UE and/or the second UE. For example, the first data session communication may be for radio bearers and/or PDCP entities establishment (mapped with the associated QoS flows) with the machine learning sublayer or adaptation layer where the target inference host is allocated for the machine learning services. For example, the first data session communication may be a PDU establishment or PDU request communication with a local UPF at which the target inference host is anchored. The first data session communication may indicate (e.g., based at least in part on the UE ML context and ML data session information as described above in connection with reference number 830) the second UE (e.g., an identifier of the second UE), the machine learning data service (e.g., e.g., a machine learning data service type, name, identifier, and/or index), one or more ML data session to be established with the associated ML data session information, among other examples.

As shown by reference number 834, the target inference host may transmit, and the target network node may receive, a second data session communication indicating one or more data sessions for the machine data learning service provided by the second UE associated with the machine learning service for the first UE and/or the second UE. For example, the second data session communication may be a response to radio bearer establishment, a PDU establishment, or PDU request communication (e.g., as described above in connection with reference number 832), where the response may confirm the data session establishment or reject the data session establishment. For confirming the data session establishment, the second data session communication may indicate one or more ML data session identifiers (e.g., radio bearer or PDU identifiers) and the associated ML data session types (e.g., PDU or non-PDU, IP or non-IP, structured or unstructured, among other examples) associated with the machine learning data service provided by the second UE, among other examples.

As shown by reference number 836, the target network node may transmit, and the source network node may receive, a third machine learning data session communication associated with the machine learning data service. For example, the third machine learning data session communication may indicate machine learning data session modification for the machine learning data service provided by the second UE for the machine learning service for the first UE and/or the second UE base at least in part on the second data session communication (e.g., the response to radio bearer establishment or PDU establishment or PDU request communication to confirm the data session establishment, as described above in connection with reference number 834). The machine learning data session modification may include the information related to the machine learning data session established as described above in connection with reference number 834. For example, the source network node may receive one or more ML data session identifiers and the associated ML data session types for the machine learning data service provided by the second UE, an identifier of the target inference host, an indication of resources (e.g., radio resources or other network resources) associated with the data session, and/or data session configuration parameters, among other examples. In some aspects, the source network node may trigger a release of the ML data session between the source inference host and the second UE for the machine learning data service provided to the source inference host.

As shown by reference number 838, the target network node may transmit, and the target inference host may receive, machine learning data and/or machine learning inference associated with the machine learning service. For example, the machine learning data and/or the machine learning inference associated with the machine learning service for the first UE and/or the second UE, forwarded by the source network node (e.g., the information described above in connection with the reference number 828), may be transmitted via a user plane established with the ML data session establishment (e.g., as described above in connection of the reference numbers 832 and 834). This may enable the target inference host to collect machine learning data and/or machine learning inference to be used to train and/or converge a machine learning model associated with the machine learning service for the first UE and/or the second UE. For example, the target inference host may use the machine learning data (e.g., machine learning data collected by the second UE) and/or the machine learning inference generated by the source inference host to train and/or converge a machine learning model that is to be used to support the machine learning service for the first UE and/or the second UE. This may reduce an amount of time and/or a processing overhead, among other examples, associated with training the machine learning model.

In some aspects, the second UE (e.g., the UE collecting and/or providing machine learning data) may be handed over to the target network node before the first UE (e.g., the end user UE). This may enable the second UE to provide machine learning data to the target inference host to enable the target inference host to make one or more predictions (e.g., beam or beam pair predictions) using the machine learning data for the handover of the first UE. For example, as shown by reference number 840, the source network node may transmit, and the second UE may receive, a handover command communication indicating that the second UE is to perform a handover with a target network node. The handover command communication may be an RRC communication. The handover command may indicate the target network node (e.g., an identifier associated with the target network node), the target inference host (e.g., an identifier associated with the target inference host), the machine learning data session information (e.g., one or more machine learning data session identifiers and related machine learning data session parameters, such as machine learning data session types), the machine learning data service information (e.g., the machine learning service type, name, identifier, and/or index as described above in connection with reference number 810), and/or other communication parameters that are to be used by the second UE to establish connection with the target network node and/or the target inference host.

The handover command communication may indicate machine learning inference information associated with the target inference host that is associated with the target network node. For example, the handover command communication may indicate a machine learning model executing on the target inference host that is associated with the machine learning service, a machine learning inference host identifier associated with the target inference host, and/or machine learning data session information, among other examples. This may enable the second UE to identify machine learning information associated with the target network node as part of the handover procedure. For example, the second UE may identify an identifier of the target inference host, a machine learning model associated with the target inference host, and/or machine learning data session information associated with the target inference host.

As shown by reference number 842, the second UE may transmit, and the target network node may receive, a communication to establish a communication connection (e.g., an RRC connection) with the target network node. For example, the second UE may transmit a RACH communication (e.g., a msgA or a msg1) or an RRC connect communication. The communication may indicate machine learning data session information associated with the machine learning data service provided by the second UE (e.g., data session identifier(s) and associated parameters of QoS), information associated with the machine learning data (e.g., types, formats, or structures), information associated with the machine learning data service (e.g., information associated with a machine learning model executing on the second UE that is associated with the machine learning service, an indication of one or more machine learning service types associated with QoS profiles or QoS flows or 5QI, one or more machine learning model identifiers associated with the machine learning service, and/or one or more machine learning inference host identifiers associated with the machine learning service), among other examples. For example, the communication may indicate machine learning data service information as part of establishing an RRC connection with the target network node.

In some aspects, the ML data session or ML inference data session may be initiated by a UE (e.g., the second UE) when the UE makes connection with the target network node. For example, as shown by reference number 844, the source network node may transmit, and the target network node may receive, information associated with a machine learning context of the first UE and/or the second UE and machine learning data service information associated with the second UE. For example, the UE ML context may indicate UE information (e.g., the first UE identifier and/or the second UE identifier, and/or UE ML capability, among other examples) associated with the machine learning inference service or machine learning service that is to be maintained by the target network node associated with the first UE and/or the second UE and/or associated with the machine learning inference data service that is provided by the second UE.

As shown by reference number 846, the source network node may transmit, and the second UE may receive, a handover command communication indicating that the second UE is to perform a handover with a target network node. The handover command communication may be an RRC communication. The handover command may indicate the target network node (e.g., an identifier associated with the target network node), the target inference host (e.g., an identifier associated with the target inference host), the machine learning data service information (e.g., the machine learning data service type, name, identifier, and/or index as described above in connection with reference number 810), and/or other communication parameters that are to be used by the second UE to establish connection with the target network node to continue providing machine learning data service to the target inference host for the machine learning service associated with the first UE and/or the second UE.

The handover command communication may indicate machine learning inference information associated with the target inference host that is associated with the target network node. For example, the handover command communication may indicate a machine learning model executing on the target inference host that is associated with the machine learning service, and/or a machine learning inference host identifier associated with the target inference host, machine learning data (e.g., data types, formats, or structures), among other examples. This may enable the second UE to indicate machine learning information associated with the target network node as part of the handover procedure. For example, the second UE may indicate an identifier of the target inference host, a machine learning model associated with the target inference host, and/or machine learning data for initiating ML data session establishment with the target inference host.

As shown by reference number 848, the second UE may transmit, and the target network node may receive, a communication to establish a communication connection (e.g., an RRC connection) with the target network node. For example, the second UE may transmit a RACH communication (e.g., a msgA or a msg1) or an RRC connect communication. The communication may include an identification associated with the machine learning data service (e.g., indicating a machine learning data service type, name, identifier, and/or index), UE machine learning capability, information associated with the machine learning data (e.g., types, formats, or structures), information associated with the machine learning data service (e.g., information associated with a machine learning model executing on the second UE that is associated with the machine learning service, an indication of one or more machine learning service types associated with QoS profiles or QoS flows, one or more machine learning model identifiers associated with the machine learning service, and/or one or more machine learning inference host identifiers associated with the machine learning service), among other examples. For example, the machine learning data service information may be used for the second UE to initiate the establishment of a machine learning data session with the target inference host (e.g., indicating ML data session establishment request to the target network node with machine learning data service information and/or machine learning inference information as described above in connection with reference number 846).

As shown by reference number 850, the target network node may transmit, and the target inference host may receive, a first data session communication indicating one or more data sessions for the machine learning data service provided by the second UE for the machine learning service for the first UE and/or the second UE, based on the ML data session establishment request received from the second UE. For example, the first data session communication may be for radio bearers and/or PDCP entities establishment (mapped with the associated QoS flows) with the machine learning sublayer or adaptation layer where the target inference host is allocated for the machine learning services. For example, the first data session communication may be a PDU establishment or PDU request communication with a local UPF at which the target inference host is anchored. The first data session communication may indicate (e.g., based at least in part on the UE ML context as described above in connection with reference number 844 and ML data service information and/or machine learning inference information as described above in connection with reference number 848) the second UE (e.g., an identifier of the second UE), the machine learning data service (e.g., e.g., a machine learning data service type, name, identifier, and/or index), one or more ML data sessions to be established with the ML data service information and/or machine learning inference information, among other examples.

As shown by reference number 852, the target inference host may transmit, and the target network node may receive a second data session communication confirming one or more data sessions for the machine data learning service provided by the second UE for the machine learning service for the first UE and/or the second UE. For example, the second data session communication may be a response to radio bearer establishment or PDU establishment or PDU request communication (e.g., as described above in connection with reference number 850), where the response may confirm the data session establishment or reject the data session establishment. For confirming the data session establishment, the second data session communication may indicate one or more ML data session identifiers (e.g., radio bearer or PDU identifiers) and the associated ML data session types (e.g., PDU or non-PDU, IP or non-IP, structured or unstructured, among other examples) associated with the machine learning data service provided by the second UE, among other examples.

As shown by reference number 854 the target network node may transmit, and the source network node may receive, a third machine learning data session communication associated with the machine learning data service. For example, the machine learning data session communication may indicate machine learning data session modification for the machine learning data service provided by the second UE for the machine learning service for the first UE and/or the second UE base at least in part on the second data session communication (e.g., the response to radio bearer establishment or PDU establishment or PDU request communication to confirm the data session establishment, as described above in connection with reference number 852). In some aspects, the source network node may trigger releasing the ML data session between the source inference host and the second UE for the machine learning data service provided to the source inference host.

As shown by reference number 856, the target network node may transmit, and the target inference host may receive, machine learning data and/or machine learning inference associated with the machine learning service. For example, the machine learning data and/or the machine learning inference associated with the machine learning service for the first UE and/or the second UE (e.g., forwarded by the source network node as described above in connection with the reference number 828) may be transmitted via the user plane established with the ML data session establishment (e.g., as described above in connection of the reference numbers 850 and 852). This may enable the target inference host to collect machine learning data and/or machine learning inference to be used to train and/or converge a machine learning model associated with the machine learning service for the first UE and/or the second UE. For example, the target inference host may use the machine learning data (e.g., machine learning data collected by the second UE) and/or the machine learning inference generated by the source inference host to train and/or converge a machine learning model that is to be used to support the machine learning service for the first UE and/or the second UE. This may reduce an amount of time and/or a processing overhead, among other examples, associated with training the machine learning model by the source inference host.

In some aspects, the second UE (e.g., the UE collecting and/or providing machine learning data) may be handed over to the target network node before the first UE (e.g., the end user UE). This may enable the second UE to provide machine learning data or machine learning inference data to the target inference host to enable the target inference host to make one or more predictions (e.g., beam or beam pair predictions) using the machine learning data for the handover of the first UE.

As a result, a ML data session (e.g., either initiated by the target network node as described above in connection with reference number 832 or initiated by the second UE as described above in connection with reference number 848) may be established between the second UE and the target inference host as shown with reference number 858. The second UE may use the ML data session to transmit machine learning data (e.g., generated by the second UE) to the target inference host. For example, as part of the handover procedure, a communication connection (e.g., an RRC connection) may be switched from the source network node to the target network node (e.g., as described above, such as in connection with reference numbers 846 and 848). Additionally, a machine learning data connection (e.g., a user plane connection) may be switched from the source inference host to the target inference host. This may enable the second UE to communicate with the target network node and to provide machine learning data to the target inference host.

For example, as shown by reference number 860, the second UE may transmit, and the target inference host may receive, second machine learning data for the machine learning service (e.g., based at least in part on receiving the handover command communication handing over the second UE to the target network node and/or based at least in part on establishing the ML data session). For example, the second UE may process, via a machine learning model executing on the second UE, one or more sensor measurements to obtain the second machine learning data associated with the machine learning service. The second UE may transmit, to the second network node or the second inference host and via the ML data session, the second machine learning data. This may enable the target inference host to collect machine learning data that can be used to perform machine learning operations associated with the second UE and/or the first UE (e.g., before the first UE is handed over to the target network node).

For example, the target inference host may process the machine learning data (e.g., received via the ML data session or received during the handover procedure, as described in more detail elsewhere herein) to train and/or converge a machine learning model executing on the target inference host. The target inference host may process machine learning data provided by the second UE to perform one or more machine learning operations associated with the first UE. For example, the target inference host may generate one or more inference or predictions associated with communication parameter(s) to be used by the first UE for communicating with the target network node. For example, the target inference host may use a machine learning model to determine a best beam, a best beam pair, a best time/frequency resource, a best transmit power, and/or a best MCS, among other examples, to be used by the first UE for communications with the target network node.

As shown by reference number 862, the target inference host may transmit, and the target network node may receive, one or more machine learning predictions associated with the first UE (e.g., where the one or more machine learning predictions are based at least in part on machine learning data generated by the second UE and provided to the target inference host). As shown by reference number 864, the target network node may transmit, and the source network node may receive, an indication of the one or more machine learning predictions associated with the first UE. For example, the target network node may transmit the indication of the one or more machine learning predictions via an Xn interface. The source network node and the target network node may proceed with performing a handover procedure for the first UE in accordance with the one or more predictions (e.g., by configuring the first UE to communicate with the target network node using one or more communication parameters or beams as indicated by the one or more predictions).

For example, as shown by reference number 866, the source network node may transmit, and the target network node may receive, UE context information and/or data associated with the first UE. For example, the UE context information may include an identifier associated with the first UE and/or other information associated with the first UE (e.g., machine learning capability or machine learning information) that is to be stored by the target network node.

As shown by reference number 868, the source network node may transmit, and the first UE may receive, a handover command communication. For example, the source network node may transmit an RRC configuration message (e.g., in an RRC reconfiguration message) to the first UE by forwarding an RRC configuration associated with the target network node to the first UE. For example, the target network node may indicate an RRC configuration to be used by the first UE in the handover acknowledgement communication (e.g., transmitted as described above in connection with reference number 822). For example, the RRC configuration indicated in the handover command communication may be based at least in part on the one or more predictions (e.g., transmitted as described above in connection with reference number 864) generated by the target inference host.

The first UE may change an RRC connection from the source network node to the target network node based at least in part on the handover command. As shown by reference number 870, the first UE may transmit a RACH or RRC connection message to the target network node based on the prediction indicated in the handover command from the source network node. The RRC connection message may indicate that the first UE has changed the RRC connection from the source network node to the target network node. In some aspects, the target network node may transmit a UE context release message to the source network node. The UE context release message may indicate that the handover of the first UE to the target network node was successful.

The first UE may communicate with the target network node based at least in part on performing the handover procedure. For example, the first UE may communicate with the target network node using one or more communication parameters or beams that are indicated by the one or more predictions generated by the target inference host. As a result, the machine learning service associated with the first UE may be immediately continued upon handover of the first UE to the target network node (e.g., without a delay associated with establishing an ML data session for the second UE to provide machine learning data to the target inference host or training a machine learning model executing on the target inference host).

As a result, machine learning service continuity and machine learning data continuity may be maintained when the first UE is handed over from the source network node to the target network node. This enables the target network node to perform the handover procedure using one or more machine learning predictions associated with the first UE. Additionally, the handover procedure described herein may improve a likelihood that the first UE to handed over to a network node that is capable of performing machine learning operations associated with the machine learning service. By ensuring machine learning service continuity and machine learning data continuity as part of a handover procedure, communication performance of the first UE (e.g., an end user UE) may be improved (e.g., because the target network node may quickly utilize accurate machine learning predictions to select communications parameters associated with the first UE).

As indicated above, FIG. 8 is provided as an example. Other examples may differ from what is described with respect to FIG. 8.

Figure 9A:
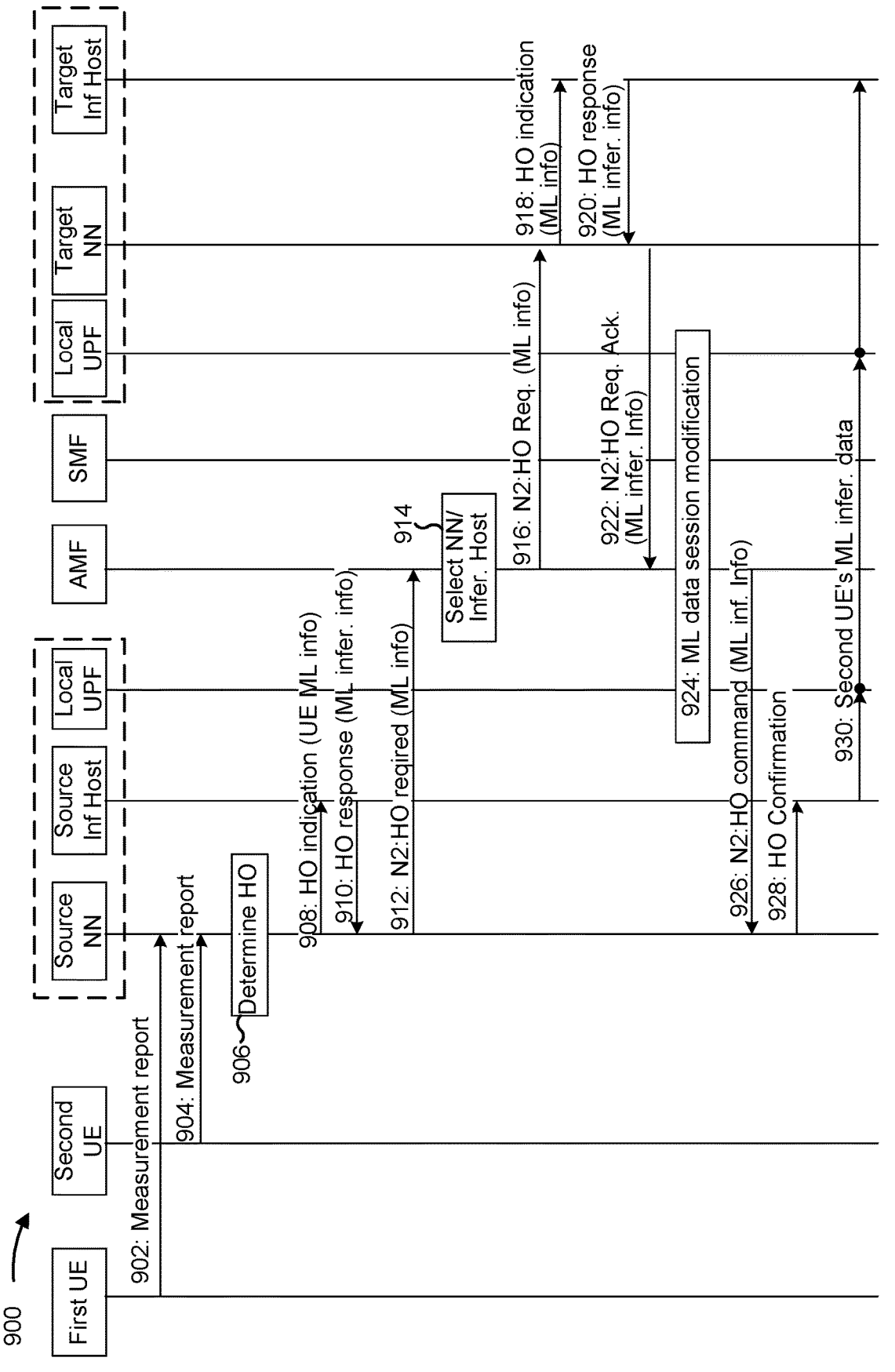
FIGS. 9A and 9B are diagrams illustrating an example associated with UE machine learning service continuity, in accordance with the present disclosure.
Figure 9B:
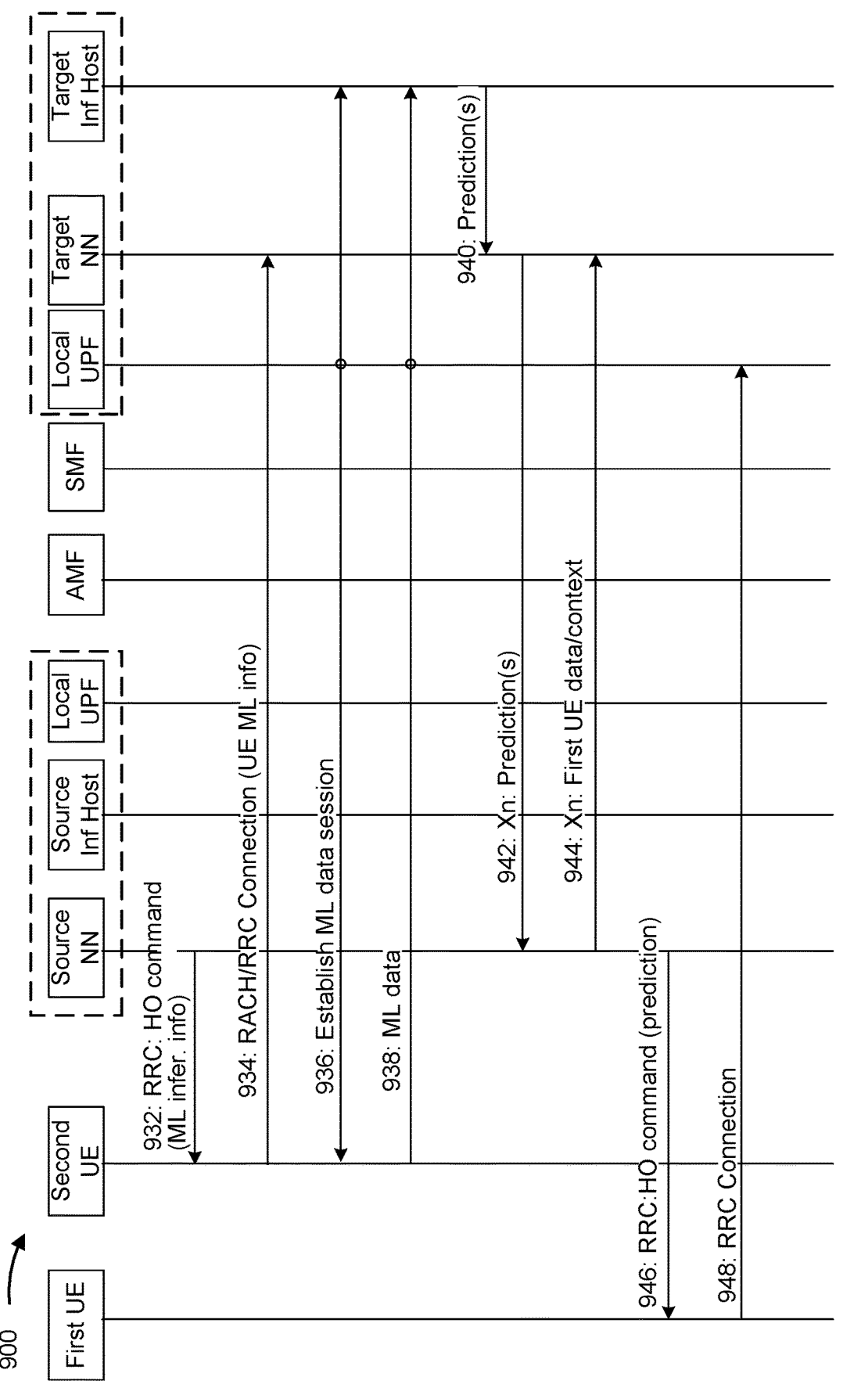

FIGS. 9A and 9B are diagrams illustrating an example 900 associated with UE machine learning service continuity, in accordance with the present disclosure. As shown in FIGS. 9A and 9B, example 900 includes communication between a first UE (e.g., a UE 120 or the first UE depicted in FIG. 8), a second UE (e.g., a UE 120 or the second UE depicted in FIG. 8), a source network node (e.g., a network node 110, a network node 506, or the source network node depicted in FIG. 8), a source inference host (e.g., a near-RT RIC 325, a non-RT RIC 315, a model inference host 404, an ML inference host 514, or the source inference host depicted in FIG. 8, among other examples), a target network node (e.g., a network node 110, a network node 506, or the target network node depicted in FIG. 8), a target inference host (e.g., a near-RT RIC 325, a non-RT RIC 315, a model inference host 404, an ML inference host 514, or the target inference host depicted in FIG. 8, among other examples), and one or more core network nodes (e.g., shown as an AMF and a session management function (SMF)).

As shown, the source network node and the target network node may be associated with user plane functions (UPFs). For example, the source network node may be associated with a local UPF (e.g., a UPF co-located with the source network node) and the target network node may be associated with a local UPF (e.g., a UPF co-located with the target network node). In some aspects, the devices and/or nodes depicted in FIGS. 9A and 9B may be included in a wireless network, such as the wireless network 100. In some aspects, the first UE and/or the second UE may have established a communication connection with the source network node prior to the operations depicted in FIG. 9A.

The source network node and/or source inference host may support a machine learning service for the first UE and/or the second UE in a similar manner as described in more detail elsewhere herein, such as in connection with FIGS. 4-6 and 8. While example 800 depicts an example of maintaining machine learning continuity during a handover procedure that is handled or controlled by network nodes, example 900 is associated with an example of maintaining machine learning continuity during a handover procedure that is handled or controlled by one or more core network nodes. For example, the one or more core network nodes may have an improved knowledge as to machine learning services or operations that are supported by various network nodes or inference hosts deployed in the wireless network. For example, the source network node may not receive an indication associated with machine learning services or operations that the target network node and/or the target inference host are capable of supporting. Therefore, the one or more core network nodes may select a target network node for a handover procedure associated with the first UE and/or the second UE to improve a likelihood that machine learning service continuity and/or machine learning data continuity may be maintained during and/or after the handover procedure.

In some aspects, a core network may include a functional architecture in which systems and/or methods described herein may be implemented. For example, the core network may include an example architecture of a 5G next generation (NG) core network included in a wireless telecommunications system. Although the example architecture of the core network described herein may be an example of a service-based architecture, in some aspects, the core network may be implemented as a reference-point architecture and/or a 4G core network, among other examples.

For example, the core network may include a number of functional elements. The functional elements may include, for example, a network slice selection function (NSSF), a network exposure function (NEF), an authentication server function (AUSF), a unified data management (UDM) component, a policy control function (PCF), an application function (AF), the AMF, the SMF, and/or a UPF, among other examples. These functional elements may be communicatively connected via a message bus. Each of the functional elements may be implemented on one or more devices associated with a wireless telecommunications system. In some implementations, one or more of the functional elements may be implemented on physical devices, such as an access point, a network node, a base station, and/or a gateway, among other examples. In some implementations, one or more of the functional elements may be implemented on a computing device of a cloud computing environment.

The NSSF may include one or more devices that select network slice instances for a UE. Network slicing is a network architecture model in which logically distinct network slices operate using common network infrastructure. The NSSF may determine a set of network slice policies to be applied at the network. For example, the NSSF may apply one or more UE route selection policy (URSP) rules. The NEF may include one or more devices that support exposure of capabilities and/or events (e.g., machine learning capability such as ML data collection, ML training, ML inference, among other examples) in the wireless telecommunications system to help other entities in the wireless telecommunications system discover network services. The AUSF may include one or more devices that act as an authentication server and support the process of authenticating a UE in the wireless telecommunications system (e.g., to authenticate the machine learning data service provided by the second UE or the machine learning service for the first UE and/or the second UE). The UDM may include one or more devices that store user data and profiles in the wireless telecommunications system. The PCF may include one or more devices that provide a policy framework that incorporates network slicing, roaming, packet processing, and/or mobility management, among other examples (e.g., the policy framework for machine learning data service or machine learning service). The AF may include one or more devices that support application influence on traffic routing, access to the NEF, and/or policy control, among other examples (e.g., interfacing machine learning applications or services).

The AMF may include one or more devices that act as a termination point for non-access stratum (NAS) signaling and/or mobility management, among other examples. In some aspects, the AMF may request the NSSF to select network slice instances for a UE, e.g., at least partially in response to a request for data service from the UE (e.g., machine learning data service from the second UE). The SMF may include one or more devices that support the establishment, modification, and release of communication sessions (e.g., the machine learning data session for the second UE) in the wireless telecommunications system. For example, the SMF may configure traffic steering policies at the UPF and/or enforce user equipment IP address allocation and policies, among other examples. In some aspects, the SMF may provision the network slice instances selected by the NSSF for a UE. The UPF may include one or more devices that serve as an anchor point for intra-RAT and/or inter-RAT mobility. In some aspects, the UPF may apply rules to packets, such as rules pertaining to packet routing, traffic reporting, and/or handling user plane QoS, among other examples.

As shown in FIG. 9A, and by reference number 902, the first UE may transmit a measurement report. Additionally, or alternatively, as shown by reference number 904, the second UE may transmit a measurement report. The source network node may receive a measurement report associated with the first UE and/or the second UE. A measurement report may indicate one or more measurements of candidate cells or candidate network nodes (e.g., including the target network node). For example, the first UE and/or the second UE may be configured (e.g., by the source network node or another network node) to perform (e.g., periodically or triggered by an event or condition, such as machine learning performance monitoring) measurements of a serving network node (e.g., the source network node) and/or one or more candidate network nodes (e.g., including the target network node). For example, the measurements may include RSRP measurements, RSSI measurements, signal strength measurements, signal quality measurements, and/or machine learning performance monitoring based measurements, among other examples.

As shown by reference number 906, the source network node may determine that a HO procedure should be initiated for the first UE and/or the second UE. For example, the source network node may determine to initiate the handover procedure based at least in part on a measurement value associated with the target network node and/or the source network node. For example, the source network node may determine that a measurement value associated with the source network node is less than or equal to a threshold. Additionally, or alternatively, the source network node may determine that a measurement value associated with the target network node and/or one or more other candidate network nodes is greater than a measurement value associated with the source network node (e.g., by a threshold amount), where the target network node may be associated with at least an inference host which may support the ML service to the first or second UE provided by the source inference host and the ML data service provided by the second UE. As a result, the source network node may initiate the handover procedure for the first UE and/or the second UE.

As shown by reference number 908, the source network node may transmit, and the source inference host may receive, a handover communication. In some aspects, the handover communication may be a handover indication communication. The handover communication may indicate information associated with the machine learning service for the first UE and/or the second UE. For example, the information associated with the machine learning service may include UE information or UE context such as an identifier associated with the first UE and/or the second UE (e.g., UE identifiers), a geographic location associated with the first UE and/or second UE, a direction of travel associated with the first UE and/or second UE, a speed associated with the first UE and/or second UE, beam information associated with the first UE and/or second UE, an orientation of the first UE relative to the second UE or traveling direction. Additionally, the information associated with machine learning service may include an indication of a machine learning capability of the second UE (e.g., one or more machine learning features supported by the second UE) or machine learning data service information provided by the second UE. For example, the information associated with the machine learning service may include an indication of a machine learning model (e.g., a first machine learning model type, name, identifier, and/or index associated with one or more functions and/or function structures with a set of parameters which may be preconfigured or configured or updated based on offline or online training or inference monitoring) executing on the second UE (e.g., for features extraction) that is associated with the machine learning service (e.g., a first machine learning service type, name, identifier, and/or index associated with a set of parameters including one or more QoS profiles or QoS flows) provided to the first UE and/or the second UE, and/or a machine learning data service (e.g., a second machine learning service type, name, identifier, and/or index with a set of parameters including one or more QoS profiles or QoS flows, ML data type(s) or format(s)) associated with providing machine learning data (e.g., ML inference data) via features extraction (e.g., object detection) performed by the second UE for the machine learning service for the first UE and/or the second UE, among other examples. The information associated with the machine learning service provided by the second UE may be referred to herein as "ML inference data service information" or "ML data service information".

As shown by reference number 910, the source inference host may transmit, and source network node may receive, a handover communication indicating machine learning inference information associated with the machine learning service for the first UE and/or the second UE. In some aspects, the handover communication may be a handover response communication. The handover response communication may be in response to the handover indication communication transmitted by the source network node (e.g., as described in connection with reference number 908). The machine learning inference information may include an indication of a machine learning model (e.g., a machine learning model type, name, identifier, and/or index associated with one or more functions and/or function structures with a set of parameters which may be preconfigured or configured or updated based on offline or online training or inference monitoring) executing on the source inference host that is associated with the machine learning service (e.g., the first machine learning service type, name, identifier, and/or index as described above in connection with reference number 908), a status of predictions associated with the machine learning service for the first UE and/or the second UE, machine learning inference data information (e.g., associated with the second machine learning service type, name, identifier, and/or index as described above in connection with reference number 908) provided by the second UE, among other examples.

For example, the handover indication communication may indicate to the source inference host that the first UE and/or the second UE are to be handed over to a different network node. The handover indication communication may identify the first UE and/or the second UE in addition to machine learning information associated with the first UE and/or the second UE to enable the source inference host to identify the machine learning inference information associated with the machine learning service for the first UE and/or the second UE and/or the machine learning information associated with the machine learning data service provided by the second UE. The handover response communication may provide information related to the machine learning operations performed by the source inference host in connection with the machine learning service and/or the machine learning data provided by the second UE for the machine learning operations performed by the source inference host. This may enable the source network node to make improved handover determinations for the first UE and/or the second UE (e.g., taking information associated with the machine learning service and machine learning data service into account to improve a likelihood of continuity associated with the machine learning service).

As shown by reference number 912, the source network node may transmit, and a core network node (e.g., the AMF) may receive, a handover required communication associated with a handover procedure for the first UE and/or the second UE. In some aspects, the handover required communication may be transmitted via an N2 interface. In some aspects, the handover required communication may indicate machine learning information (e.g., inference information associated with the machine learning service to the first UE and/or the second UE, machine learning data associated with the machine learning data service provided by the second UE), and/or an indication of the source inference host that is associated with the source network node. For example, the source network node may transmit, to the AMF, machine learning information associated with the machine learning inference information (e.g., as described above in connection with reference number 910) and machine learning information associated with UE machine learning information (e.g., as described above in connection with reference number 908) as part of request a handover procedure to be initiated for the first UE and/or the second UE. Additionally, the handover required communication may indicate measurement values associated with one or more candidate network nodes (e.g., including the target network node). This may enable the AMF to make improved handover determinations for the first UE and/or the second UE (e.g., taking information associated with the machine learning service and machine learning data service into account to improve a likelihood of continuity associated with the machine learning service).

For example, as shown by reference number 914, the core network node (e.g., the AMF) may select the target network node and/or the target inference host for the handover procedure. The core network node may select the target network node and/or the target inference host based at least in part on the machine learning capability of the second UE or machine learning data service information (e.g., as described above in connection with reference number 908) and/or the machine learning inference information (e.g., received from the source inference host as described above in connection with reference number 910) and/or a machine learning capability associated with the target network node (e.g., candidate target network nodes managed by AMF), among other examples. In other words, the core network node may take information associated with the machine learning service into account when selecting the target network node for the handover procedure. For example, the core network node may select a target network node (and an associated target inference host) based at least in part on received machine learning information (e.g., the second UE's machine learning data service information and the source inference host's machine learning inference information).

For example, the core network node may identify a candidate network node that is associated with a best measurement value (e.g., as indicated by the first UE and/or the second UE). The core network node may determine whether the identified candidate network node is capable of performing machine learning operations and/or if the identified candidate network node is capable of performing the machine learning service associated with the first UE and/or the second UE. If the identified candidate network node is capable of performing machine learning operations and/or is capable of performing the machine learning service, then the core network node may select the candidate network node as a target network node for the handover procedure. However, if the identified candidate network node is not capable of performing machine learning operations and/or is not capable of performing the machine learning service, then the core network node may not select the candidate network node as a target network node for the handover procedure (e.g., in a similar manner as described in more detail elsewhere herein).

As shown by reference number 916, the core network node may transmit, and the target network node may receive, a handover request communication associated with the handover procedure for the first UE and/or the second UE. In some aspects, the handover request communication may be transmitted via an N2 interface. The handover request communication may indicate the machine learning information (e.g., the second UE's machine learning data service information and the source inference host's machine learning inference service information) received by the core network node. For example, the handover request communication may indicate the machine learning inference information (e.g., received from the source inference host as described above in connection with reference number 912) and/or the machine learning data service information associated with the second UE, among other examples. This may enable the target network node to identify information associated with the machine learning service that is to be supported by the target inference host.

As shown by reference number 918, the target network node may transmit, and the target inference host may receive, a handover communication indicating some, or all, of the machine learning information indicated in the handover request communication received from the source network node. In some aspects, the handover communication may be a handover indication communication. In some aspects, the handover communication may indicate machine learning information associated with the first UE and/or the second UE. The handover communication to the target inference host may indicate the second UE's machine learning data service information and/or the source inference host's machine learning inference information, among other examples.

As shown by reference number 920, the target inference host may transmit, and the target network node may receive, a handover communication indicating whether the target inference host is capable of supporting the machine learning service. In some aspects, the handover communication may be a handover response communication. For example, the target inference host may determine whether the target inference host is capable of supporting the machine learning service based at least in part on the machine learning information indicated in the handover indication communication received from the target network node. For example, the target inference host may determine whether the target inference host supports a machine learning model associated with the machine learning service. For example, if the machine learning service is associated with a beam prediction, then the target inference host may determine whether the target inference host supports a beam prediction machine learning model. For example, the target inference host may determine whether the target inference host supports a machine learning data service provided by the second UE. For example, if the machine learning data service is associated with extracted features (e.g., detected objects in a certain data type or format), then the target inference host may determine whether the target inference host supports the machine learning data service for its machine learning inference model.

If the target inference host cannot support the machine learning service and/or the machine learning data service, then the handover response communication may indicate that the handover procedure cannot be completed. Alternatively, if the target inference host does support the machine learning service with the machine learning data service provided by the second UE, then the handover response communication may indicate that the handover procedure may proceed. In this way, the target network node may communicate, with the target inference host, to determine that the target inference host is capable of supporting the machine learning service with the machine learning data service provided by the second UE.

If the target inference host determines that the machine learning service is supported, then the target inference host may include machine learning inference information associated with the target inference host. For example, the handover response communication transmitted to the target network node may include the target inference host identifier, a machine learning model or machine learning inference model (e.g., a machine learning model type, name, identifier, and/or index associated with one or more functions and/or function structures with a set of parameters which may be preconfigured or configured or updated based on offline or online training or inference monitoring) executing on the target inference host that is associated with the machine learning service or machine learning inference service (e.g., the first machine learning service type, name, identifier, and/or index as described above in connection with reference number 908), machine learning inference data information or machine learning data (e.g., a machine learning data service type, name, identifier, and/or index with a set of parameters including one or more QoS profiles or QoS flows, ML data type(s) or format(s)), and/or other machine learning data associated with the machine learning service associated with the target inference host.

In some aspects, the core network node(s) may communicate to the local UPF associated with the target network node and/or the target inference host for handover preparation. For example, the AMF may transmit PDU session update request (e.g., including PDU session identifier(s) associated with the machine learning data service, indication of source network node and/or source inference host and associated local UPF, an indication of target network node identifier and/or target inference host identifier and associated local UPF, UE ML context, among other examples) to SMF based at least in part on the handover required message received from the source network node (e.g., as described above in connection with reference number 912) and target network node selection and/or target inference host selection (e.g., as described above in connection with reference number 914). Based at least in part on the received PDU session update request message, the SMF may send PDU session modification request to the local UPF associated with the source network node and/or the source inference host, and the SMF may further send PDU session establishment request to the local UPF associated with the target network node and/or the target inference host. The SMF may respond AMF with PDU session update request response message after receiving PDU session modification response from the local UPF associated with the source network node and/or source inference host and PDU session establishment response from the local UPF associated with the target network node and/or the target inference host.

As shown by reference number 922, the target network node may transmit, and the core network node (e.g., the AMF) may receive, a handover acknowledgement (ACK) communication. In some aspects, the handover acknowledgement communication may be transmitted via an N2 interface. The handover acknowledgement communication may indicate whether the handover is approved or accepted by the target network node. For example, if the target inference host indicates that the machine learning service is not supported (e.g., in the handover response communication received by the target network node as described above in connection with reference number 920), then the handover acknowledgement communication transmitted to the source network node may indicate that the handover procedure is rejected. Alternatively, if the target inference host indicates that the machine learning service is supported (e.g., in the handover response communication received by the target network node as described above in connection with reference number 920), then the handover acknowledgement communication transmitted to the source network node may indicate that the handover procedure is approved.

Additionally, the handover acknowledgement communication may indicate machine learning inference information associated with the target inference host. For example, the handover acknowledgement communication transmitted to the source network node may include an indication of a machine learning model executing on the target inference host that is associated with the machine learning service, a machine learning inference host identifier associated with the target inference host, and/or machine learning inference data information, among other examples.

As shown by reference number 924, the core network node(s) may modify an ML data session associated with the second UE (e.g., a PDU session associated with the second UE transmitting machine learning data to the source inference host). For example, the core network node(s) may modify an ML data session associated with the local UPF of the source network node and/or the source inference host. For example, the core network node(s) (e.g., AMF and/or SMF) may modify a data path associated with the ML data session from the source network node and/or the source inference host (e.g., the ML data PDU session established with the local UPF associated with the source network node and/or source inference host) to the target network node and/or the target inference host (e.g., the ML data PDU session to be established with the local UPF associated with the target network node and/or target inference host). In some aspects, the core network node(s) may transmit, to the local UPF associated with the source network node and/or the source inference host, an indication of the modification to the ML data PDU session. Additionally, or alternatively, the core network node(s) may transmit, to the local UPF associated with the target network node and/or the target inference host, an indication of the establishment to the ML data PDU session. For example, the AMF may transmit PDU session update request (e.g., including PDU session identifier(s) associated with the machine learning data service, indication of source network node and/or source inference host and associated local UPF, indication of target network node identifier and/or target inference host identifier and associated local UPF, UE ML context, among other examples) to the SMF based at least in part on the handover required message received from the source network node (e.g., as described above in connection with reference number 912) and target network node selection and/or target inference host selection (e.g., as described above in connection with reference number 914). Based at least in part on the received PDU session update request message, the SMF may send PDU session modification request to the local UPF associated with the source network node and/or the source inference host, and SMF may send PDU session modification request to the local UPF associated with the target network node and/or the target inference host. The SMF may respond to the AMF with a PDU session update request response communication after receiving the PDU session modification response from the local UPF associated with the source network node and/or source inference host and PDU session modification response from the local UPF associated with the target network node and/or the target inference host.

As shown by reference number 926, the core network node (e.g., the AMF) may transmit, and the source network node may receive, a handover command communication. In some aspects, the handover command communication may be transmitted via an N2 interface. The handover command communication may indicate whether a handover procedure has been accepted by the target network node. Additionally, the handover command communication may indicate an identifier associated with the target network node, an identifier associated with the target inference host), and/or the machine learning data session information (e.g., one or more machine learning data session identifiers and related machine learning data session parameters such as machine learning data session types). Additionally, the handover command communication received by the source network node (e.g., from the core network node) may indicate machine learning inference information associated with the target inference host. For example, the handover command communication transmitted to the source network node may include an indication of a machine learning model executing on the target inference host that is associated with the machine learning service, and/or machine learning data (e.g., the machine learning data service type, name, identifier, and/or index), among other examples.

As shown by reference number 928, the source network node may transmit, and the source inference host may receive, a handover confirmation communication based at least in part on the source network node receiving the handover command communication from the core network node. For example, the source network node may indicate to the source inference host that the handover of the first UE and/or the second UE is confirmed and/or is proceeding.

In some aspects, as shown by reference number 932, the source inference host may transmit, and the target inference host may receive, machine learning data and/or machine learning inference associated with the machine learning service for first UE and/or the second UE (e.g., via the local UPFs). For example, the source inference host may transmit the machine learning data (e.g., provided by the second UE) and/or machine learning inference (e.g., produced by the source inference host) to the local UPF associated with the source network node and/or the source inference host. The local UPF associated with the source network node and/or the source inference host may transmit the machine learning data and/or machine learning inference to the local UPF associated with the target network node and/or the target inference host. The local UPF associated with the target network node and/or the source inference host may transmit the machine learning data and/or machine learning inference to the target inference host.

For example, based at least in part on receiving the handover confirmation communication from the source network node, the source inference host may transmit the machine learning data and/or machine learning inference associated with the machine learning service for the first UE and/or the second UE. The machine learning data may be buffered by the source inference host (e.g., machine learning data provided by the second UE). The machine learning inference may be generated by the source inference host (e.g., using machine learning data provided by the second UE). This may enable the target inference host to collect machine learning data to be used to train and/or converge a machine learning model associated with the target inference host. For example, the target inference host may use the machine learning data provided by the second UE and/or the machine learning inference generated by the source inference host to train and/or converge a machine learning model that is to be used to support the machine learning service for the first and/or the second UE. This may reduce an amount of time and/or a processing overhead, among other examples, associated with training the machine learning model.

In some aspects, the second UE (e.g., the UE collecting and/or providing machine learning data) may be handed over to the target network node before the first UE (e.g., the end user UE). This may enable the second UE to provide machine learning data to the target inference host to enable the target inference host to make one or more predictions (e.g., beam or beam pair predictions among other examples) using the machine learning data for the handover of the first UE. For example, as shown in FIG. 9B, and by reference number 932, the source network node may transmit, and the second UE may receive, a handover command communication indicating that the second UE is to perform a handover with a target network node. The handover command communication may be an RRC communication. The handover command may indicate the target network node (e.g., an identifier associated with the target network node), the target inference host (e.g., an identifier associated with the target inference host), the machine learning data session information (e.g., one or more machine learning data session identifiers and related machine learning data session parameters such as machine learning data session types), the machine learning data service information (e.g., the machine learning service type, name, identifier, and/or index as described above in connection with reference number 908), and/or other communication parameters that are to be used by the second UE to establish connection with the target network node and/or the target inference host.

The handover command communication may indicate machine learning inference information associated with the target inference host that is associated with the target network node. For example, the handover command communication may indicate a machine learning model executing on the target inference host that is associated with the machine learning service, a machine learning inference host identifier associated with the target inference host, and/or machine learning data session information, among other examples. This may enable the second UE to identify machine learning information associated with the target network node as part of the handover procedure. For example, the second UE may identify an identifier of the target inference host, a machine learning model associated with the target inference host, and/or machine learning data session information associated with the target inference host.

As shown by reference number 934, the second UE may transmit, and the target network node may receive, a communication to establish a communication connection (e.g., an RRC connection) with the target network node. For example, the second UE may transmit a RACH communication (e.g., a msgA or a msg1) or an RRC connect communication. The communication may indicate machine learning data session information associated with the machine learning data service provided by the second UE (e.g., data session identifier(s) and associated parameters of QoS)), information associated with the machine learning data (e.g., types or formats or structures), information associated with the machine learning data service (e.g., information associated with a machine learning model executing on the second UE that is associated with the machine learning service, an indication of one or more machine learning service types associated with QoS profiles or QoS flows or 5QI, one or more machine learning model identifiers associated with the machine learning service, and/or one or more machine learning inference host identifiers associated with the machine learning service, among other examples. For example, the communication may indicate machine learning data service information as part of establishing an RRC connection with the target network node. In a similar manner as described in connection with reference number 858, the ML data session (e.g., one or more PDU sessions) may be established between the second UE and the target inference host.

As shown by reference number 938, the second UE may transmit, and the target inference host may receive, second machine learning data for the machine learning service (e.g., based at least in part on receiving the handover command communication handing over the second UE to the target network node and/or based at least in part on the ML data session being established). For example, the second UE may process, via a machine learning model executing on the second UE, one or more sensor measurements to obtain the second machine learning data associated with the machine learning service. The second UE may transmit, to the second network node or the second inference host and via the ML data session, the second machine learning data. This may enable the target inference host to collect machine learning data that can be used to perform machine learning operations associated with the second UE and/or the first UE (e.g., before the first UE is handed over to the target network node).

For example, the target inference host may process the machine learning data (e.g., received via the ML data session or received during the handover procedure, as described in more detail elsewhere herein) to train and/or converge a machine learning model executing on the target inference host. The target inference host may process machine learning data provided by the second UE to perform one or more machine learning operations associated with the first UE. For example, the target inference host may generate one or more inferences or predictions associated with communication parameter(s) to be used by the first UE for communicating with the target network node. For example, the target inference host may use a machine learning model to determine a best beam, a best beam pair, a best time/frequency resource, a best transmit power, and/or a best MCS, among other examples, to be used by the first UE for communications with the target network node.

As shown by reference number 940, the target inference host may transmit, and the target network node may receive, one or more machine learning predictions associated with the first UE (e.g., where the one or more machine learning predictions are based at least in part on machine learning data generated by the second UE and provided to the target inference host). As shown by reference number 942, the target network node may transmit, and the source network node may receive, an indication of the one or more machine learning predictions associated with the first UE. For example, the target network node may transmit the indication of the one or more machine learning predictions via an Xn interface. The source network node and the target network node may proceed with performing a handover procedure for the first UE in accordance with the one or more predictions (e.g., by configuring the first UE to communicate with the target network node using one or more communication parameters or beams as indicated by the one or more predictions).

In some aspects, as shown by reference number 944, the source network node may transmit, and the target network node may receive, UE context information and/or data associated with the first UE. For example, the UE context information may include an identifier associated with the first UE and/or other information associated with the first UE (e.g., machine learning capability or machine learning information) that is to be stored by the target network node.

As shown by reference number 946, the source network node may transmit, and the first UE may receive, a handover command communication. For example, the source network node may transmit an RRC configuration message (e.g., in an RRC reconfiguration message) to the first UE by forwarding an RRC configuration associated with the target network node to the first UE. For example, the target network node may indicate an RRC configuration to be used by the first UE in the handover command communication (e.g., transmitted as described above in connection with reference number 926). For example, the RRC configuration indicated in the handover command communication may be based at least in part on the one or more predictions (e.g., transmitted as described above in connection with reference number 942) generated by the target inference host.

The first UE may change an RRC connection from the source network node to the target network node based at least in part on the handover command. As shown by reference number 948, the first UE may transmit a RACH or RRC connection message to the target network node. The RRC connection message may indicate that the first UE has changed the RRC connection from the source network node to the target network node. In some aspects, the target network node may transmit a UE context release message to the source network node. The UE context release message may indicate that the handover of the first UE to the target network node was successful.

The first UE may communicate with the target network node based at least in part on performing the handover procedure. For example, the first UE may communicate with the target network node using one or more communication parameters or beams that are indicated by the one or more predictions generated by the target inference host. As a result, the machine learning service associated with the first UE may be immediately continued upon handover of the first UE to the target network node (e.g., without a delay associated with establishing an ML data session for the second UE to provide machine learning data to the target inference host ort training a machine learning model executing on the target inference host).

As a result, machine learning service continuity and machine learning data continuity may be maintained when the first UE is handed over from the source network node to the target network node. This enables the target network node to perform the handover procedure using one or more machine learning predictions associated with the first UE. Additionally, the handover procedure described herein may improve a likelihood that the first UE to handed over to a network node that is capable of performing machine learning operations associated with the machine learning service. By ensuring machine learning service continuity and machine learning data continuity as part of a handover procedure, communication performance of the first UE (e.g., an end user UE) may be improved (e.g., because the target network node may quickly utilize accurate machine learning predictions to select communications parameters associated with the first UE).

As indicated above, FIGS. 9A and 9B are provided as examples. Other examples may differ from what is described with respect to FIGS. 9A and 9B.

Figure 10:
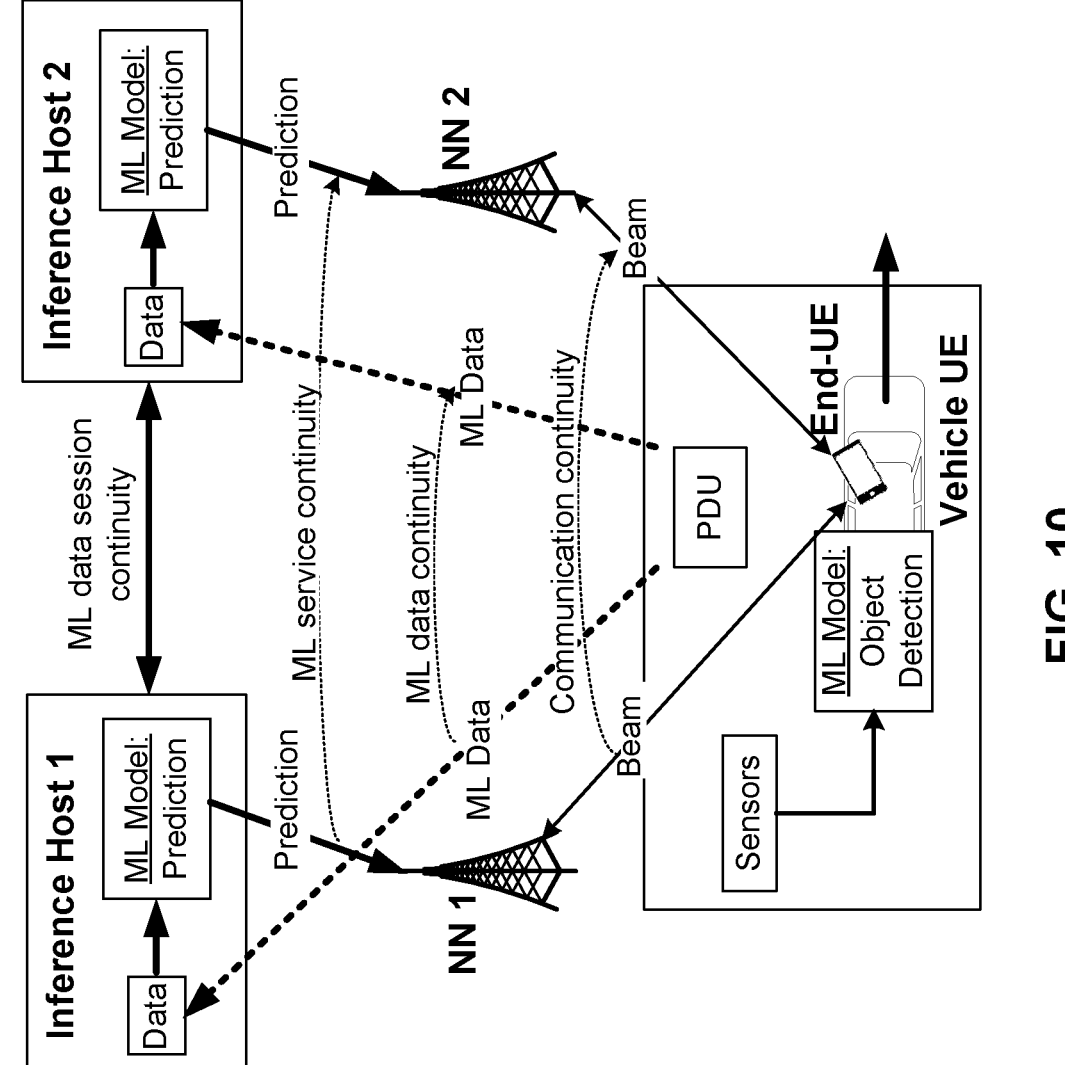
FIG. 10 is a diagram illustrating an example associated with UE machine learning service continuity, in accordance with the present disclosure.

FIG. 10 is a diagram illustrating an example 1000 associated with UE machine learning service continuity, in accordance with the present disclosure. As shown in FIG. 10, example 1000 includes communication between an end-UE (e.g., a UE 120 or the first UE depicted in FIGS. 8, 9A, and 9B), a vehicle UE (e.g., a UE 120 or the second UE depicted in FIGS. 8, 9A, and 9B), a first network node (NN 1) (e.g., a network node 110 or the source network node depicted in FIGS. 8, 9A, and 9B), a first inference host (e.g., a near-RT RIC 325, a non-RT RIC 315, a model inference host 404, an ML inference host 514, or the source inference host depicted in FIGS. 8, 9A, and 9B, among other examples), a second network node (NN 2) (e.g., a network node 110 or the target network node depicted in FIGS. 8, 9A, and 9B), a second inference host (e.g., a near-RT RIC 325, a non-RT RIC 315, a model inference host 404, an ML inference host 514, or the target inference host depicted in FIGS. 8, 9A, and 9B, among other examples).

As shown in FIG. 10, a handover procedure for the end-UE may involve a communication handover (e.g., an RRC connection), a machine learning data handover (e.g., to enable the vehicle UE to provide machine learning data to the second inference host), and/or a machine learning service handover (e.g., to enable the second inference host to provide a machine learning service associated with the end-UE). For example, machine learning data continuity may be achieved by performing a handover procedure associated with switching the vehicle UE from the first network node to the second network node. Additionally, an ML data session (e.g., PDU session) may be switch to, or established with, the second inference host (e.g., as described in more detail elsewhere herein, such as in connection with FIGS. 8, 9A, and 9B). Therefore, the vehicle UE may be enabled to communicate with the second network node and provide machine learning data (e.g., obtained from sensor measurements or sensor data) to the second inference host.

Additionally, machine learning service continuity may be achieved by providing machine learning information and/or data associated with the machine learning service to the second inference host (e.g., as described in more detail elsewhere herein, such as in connection with FIGS. 8, 9A, and 9B). For example, the second inference host may receive machine learning data, machine learning context, and/or other information to enable the second inference host to quickly train or converge a machine learning model associated with the machine learning service. This may enable the second inference host to perform machine learning operations and/or to provide predictions associated with the end-UE (e.g., using machine learning data provided by the vehicle UE). Communication continuity may be maintained by performing a handover procedure associated with the end-UE from the first network node to the second network node. Because the machine learning data continuity and/or the machine learning service continuity for the end-UE has been maintained, communications associated with the second network node (e.g., after the handover procedure is completed) may be improved. For example, the end-UE may be indicated to use one or more communication parameters or beams that are selected based at least in part on a prediction obtained by, or machine learning operation performed by, the second inference host.

As indicated above, FIG. 10 is provided as an example. Other examples may differ from what is described with respect to FIG. 10.

FIG. 11 is a diagram illustrating an example process 1100 performed, for example, by a UE, in accordance with the present disclosure. Example process 1100 is an example where the UE (e.g., a UE 120, a vehicle UE, or the second UE depicted and described above in connection with FIGS. 8, 9A, and 9B) performs operations associated with UE machine learning service continuity.

As shown in FIG. 11, in some aspects, process 1100 may include transmitting, to a first network node for use by a first inference host associated with a first network node, first machine learning data associated with a machine learning service (block 1110). For example, the UE (e.g., using communication manager 140 and/or transmission component 1504, depicted in FIG. 15) may transmit, to a first network node for use by a first inference host associated with a first network node, first machine learning data associated with a machine learning service, as described above.

As further shown in FIG. 11, in some aspects, process 1100 may include receiving, from the first network node, a handover command communication indicating that the UE is to perform a handover from the first network node to a second network node, wherein the handover command communication indicates machine learning inference information associated with a second inference host that is associated with the second network node (block 1120). For example, the UE (e.g., using communication manager 140 and/or reception component 1502, depicted in FIG. 15) may receive, from the first network node, a handover command communication indicating that the UE is to perform a handover from the first network node to a second network node, wherein the handover command communication indicates machine learning inference information associated with a second inference host that is associated with the second network node, as described above.

As further shown in FIG. 11, in some aspects, process 1100 may include transmitting, to the second network node for use by the second inference host associated with the second network node, second machine learning data associated with the machine learning service based at least in part on receiving the handover command communication (block 1130). For example, the UE (e.g., using communication manager 140 and/or transmission component 1504, depicted in FIG. 15) may transmit, to the second network node for use by the second inference host associated with the second network node, second machine learning data associated with the machine learning service based at least in part on receiving the handover command communication, as described above.

Process 1100 may include additional aspects, such as any single aspect or any combination of aspects described below and/or in connection with one or more other processes described elsewhere herein.

In a first aspect, the UE is associated with a vehicle.

In a second aspect, alone or in combination with the first aspect, process 1100 includes obtaining, via one or more sensors, one or more sensor measurements associated with one or more objects, and processing, via a machine learning model executing on the UE, the one or more sensor measurements to obtain the machine learning data associated with the machine learning service.

In a third aspect, alone or in combination with one or more of the first and second aspects, at least one of the first machine learning data or the second machine learning data includes at least one of a geographic location of the UE, a direction of travel of the UE, a speed of the UE, beam information associated with another UE (e.g., an end user UE) that is co-located with the UE, or data extracted from one or more sensor measurements.

In a fourth aspect, alone or in combination with one or more of the first through third aspects, process 1100 includes transmitting, to the second network node, a RACH connect communication or an RRC connect communication indicating at least one of information associated with the machine learning data, information associated with one or more machine learning models used for generating the machine learning data, information associated with the machine learning service, an indication of one or more machine learning types associated with the machine learning service, one or more machine learning model identifiers associated with the machine learning service, or one or more machine learning inference host identifiers associated with the machine learning service.

In a fifth aspect, alone or in combination with one or more of the first through fourth aspects, process 1100 includes receiving, from the second network node, a first PDU session communication indicating PDU information associated with the machine learning service, and transmitting, to the second network node, a second PDU session communication in response to the first PDU session communication to establish the PDU session with the second inference host.

In a sixth aspect, alone or in combination with one or more of the first through fifth aspects, transmitting the second machine learning data includes processing, via a machine learning model executing on the UE, one or more sensor measurements to obtain the second machine learning data associated with the machine learning service, and transmitting, to the second network node or the second inference host and via a PDU session, the second machine learning data.

In a seventh aspect, alone or in combination with one or more of the first through sixth aspects, the UE is associated with another UE, and wherein the machine learning data associated with the machine learning service is associated with the other UE.

In an eighth aspect, alone or in combination with one or more of the first through seventh aspects, the machine learning service includes at least one of a beam prediction, a handover prediction, or a beam blockage prediction.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

FIG. 12 is a diagram illustrating an example process 1200 performed, for example, by a first network node, in accordance with the present disclosure. Example process 1200 is an example where the first network node (e.g., a network node 110 or a source network node) performs operations associated with UE machine learning service continuity.

As shown in FIG. 12, in some aspects, process 1200 may include receiving, from a first inference host associated with the first network node, a first handover communication indicating first machine learning inference information associated with a machine learning service that is associated with machine learning data associated with a first UE (block 1210). For example, the first network node (e.g., using communication manager 150 and/or reception component 1602, depicted in FIG. 16) may receive, from a first inference host associated with the first network node, a first handover communication indicating first machine learning inference information associated with a machine learning service that is associated with machine learning data associated with a first UE, as described above.

As further shown in FIG. 12, in some aspects, process 1200 may include transmitting, to a second network node or a core network node, a handover request communication associated with a handover procedure for the first UE, wherein the second network node is selected by the first network node for the handover procedure based at least in part on the first machine learning inference information and a machine learning service associated with the second network node (block 1220). For example, the first network node (e.g., using communication manager 150 and/or transmission component 1604, depicted in FIG. 16) may transmit, to a second network node or a core network node, a handover request communication associated with a handover procedure for the first UE, wherein the second network node is selected by the first network node for the handover procedure based at least in part on the first machine learning inference information and a machine learning service associated with the second network node, as described above.

As further shown in FIG. 12, in some aspects, process 1200 may include receiving, from the second network node or the core network node, a handover response communication, associated with the handover procedure, indicating second machine learning inference information associated with a second inference host that is associated with the second network node (block 1230). For example, the first network node (e.g., using communication manager 150 and/or reception component 1602, depicted in FIG. 16) may receive, from the second network node or the core network node, a handover response communication, associated with the handover procedure, indicating second machine learning inference information associated with a second inference host that is associated with the second network node, as described above.

Process 1200 may include additional aspects, such as any single aspect or any combination of aspects described below and/or in connection with one or more other processes described elsewhere herein.

In a first aspect, process 1200 includes receiving, from the first UE or a second UE, a measurement report indicating one or more measurements associated with one or more candidate network nodes that include the second network node, and determining to handover at least one of the first UE or the second UE to the second network node based at least in part on the measurement report, the first machine learning inference information, and the machine learning service associated with the second network node.

In a second aspect, alone or in combination with the first aspect, process 1200 includes transmitting, to the first inference host, a second handover communication indicating at least one of machine learning service information or machine learning data, wherein the first handover communication is in response to the second handover communication.

In a third aspect, alone or in combination with one or more of the first and second aspects, the machine learning data includes at least one of an identification of a machine learning data service provided by the first UE, an identifier associated with the first UE, an indication of one or more machine learning models executing on the first UE that is associated with the machine learning data service, or an indication of one or more machine learning data types associated with one or more machine learning operations performed by the first UE for the machine learning data service.

In a fourth aspect, alone or in combination with one or more of the first through third aspects, the first machine learning inference information indicates at least one of one or more machine learning models executing on the first inference host that are associated with the machine learning service, or information associated with or a status of the machine learning data associated with the machine learning service.

In a fifth aspect, alone or in combination with one or more of the first through fourth aspects, the handover request communication indicates the first machine learning inference information received from the first inference host.

In a sixth aspect, alone or in combination with one or more of the first through fifth aspects, the handover request communication is transmitted via an Xn interface.

In a seventh aspect, alone or in combination with one or more of the first through sixth aspects, process 1200 includes transmitting, to the first inference host, a third handover communication based at least in part on receiving the handover response communication indicating that a handover of at least one of the first UE or a second UE to the second network node is confirmed.

In an eighth aspect, alone or in combination with one or more of the first through seventh aspects, process 1200 includes transmitting, to the first UE, an RRC communication indicating a handover command for the first UE, wherein the RRC communication indicates the second machine learning inference information associated with the second inference host.

In a ninth aspect, alone or in combination with one or more of the first through eighth aspects, process 1200 includes receiving, from the first inference host after transmitting the handover request communication, machine learning data associated with the first UE for the machine learning service, transmitting, to the second network node or the core network node, the machine learning data associated with the first UE for the machine learning service, and transmitting, to the second network node or the core network node, context information, associated with the first UE, including at least one of machine learning service information or machine learning data.

In a tenth aspect, alone or in combination with one or more of the first through ninth aspects, process 1200 includes transmitting, to the second network node, UE context information and data associated with the second UE that is co-located with the first UE, receiving, from the second network node, one or more machine learning predictions associated with a second UE, wherein the one or more machine learning predictions are based at least in part on machine learning data generated by the first UE, and transmitting, to the second UE, an RRC communication indicating a handover command, wherein the RRC communication indicates that the second UE is to connect with the second network node in accordance with the one or more machine learning predictions.

In an eleventh aspect, alone or in combination with one or more of the first through tenth aspects, the core network node is associated with an AMF.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

FIG. 13 is a diagram illustrating an example process 1300 performed, for example, by a first network node, in accordance with the present disclosure. Example process 1300 is an example where the first network node (e.g., a network node 110 and/or a target network node) performs operations associated with UE machine learning service continuity.

As shown in FIG. 13, in some aspects, process 1300 may include receiving, from a second network node or a core network node, a handover request communication associated with a handover procedure for a UE, wherein the handover request communication indicates first machine learning inference information associated with a machine learning service and machine learning data associated with the UE (block 1310). For example, the first network node (e.g., using communication manager 150 and/or reception component 1602, depicted in FIG. 16) may receive, from a second network node or a core network node, a handover request communication associated with a handover procedure for a UE, wherein the handover request communication indicates first machine learning inference information associated with a machine learning service and machine learning data associated with the UE, as described above.

As further shown in FIG. 13, in some aspects, process 1300 may include communicating, with a first inference host associated with the first network node, to determine that the first inference host is capable of supporting the machine learning service (block 1320). For example, the first network node (e.g., using communication manager 150, transmission component 1604, and/or reception component 1602, depicted in FIG. 16) may communicate, with a first inference host associated with the first network node, to determine that the first inference host is capable of supporting the machine learning service, as described above.

As further shown in FIG. 13, in some aspects, process 1300 may include transmitting, to the second network node or the core network node, a handover response communication indicating second machine learning inference information associated with the first inference host based at least in part on the first inference host being capable of supporting the machine learning service (block 1330). For example, the first network node (e.g., using communication manager 150 and/or transmission component 1604, depicted in FIG. 16) may transmit, to the second network node or the core network node, a handover response communication indicating second machine learning inference information associated with the first inference host based at least in part on the first inference host being capable of supporting the machine learning service, as described above.

Process 1300 may include additional aspects, such as any single aspect or any combination of aspects described below and/or in connection with one or more other processes described elsewhere herein.

In a first aspect, communicating to determine that the first inference host is capable of supporting the machine learning service includes transmitting, to the first inference host, a first handover communication indicating at least one of the first machine learning inference information or the machine learning data, and receiving, from the first inference host, a second handover communication indicating whether the first inference host is capable of supporting the machine learning service, wherein the second handover communication indicates the second machine learning inference information associated with the first inference host.

In a second aspect, alone or in combination with the first aspect, the first machine learning inference information indicates at least one of an identifier of a second inference host that is associated with the machine learning service and the second network node, a machine learning model executing on the second inference host, or other machine learning data associated with the machine learning service associated with the second inference host.

In a third aspect, alone or in combination with one or more of the first and second aspects, the second machine learning inference information indicates at least one of an identifier of the first inference host, a machine learning model executing on the first inference host, or the machine learning data associated with the machine learning service associated with the first inference host.

In a fourth aspect, alone or in combination with one or more of the first through third aspects, process 1300 includes receiving, from the UE, a RACH connect communication or an RRC connect communication indicating machine learning service information associated with the UE, the machine learning service information indicating at least one of machine learning data associated with the machine learning service, a machine learning type or service information associated with the machine learning service, or information associated with a machine learning model executing on the UE that is associated with the machine learning service.

In a fifth aspect, alone or in combination with one or more of the first through fourth aspects, process 1300 includes receiving, from the second network node or the core network node, UE context information including at least one of the machine learning service information or the machine learning data.

In a sixth aspect, alone or in combination with one or more of the first through fifth aspects, process 1300 includes transmitting, to the first inference host, a first PDU communication indicating the first machine learning inference information associated with the machine learning service for the UE, and receiving, from the first inference host, a second PDU communication indicating PDU session information for a PDU session associated with the machine learning service.

In a seventh aspect, alone or in combination with one or more of the first through sixth aspects, process 1300 includes transmitting, to the UE, an indication of the PDU session information for the PDU session associated with the machine learning service.

In an eighth aspect, alone or in combination with one or more of the first through seventh aspects, process 1300 includes transmitting, to the core network node, a PDU establishment communication indicating the first machine learning inference information associated with the machine learning service for the UE to cause a PDU session associated with the machine learning service to be associated with the first inference host.

In a ninth aspect, alone or in combination with one or more of the first through eighth aspects, process 1300 includes receiving, from the second network node after transmitting the handover response communication, machine learning data associated with the UE for the machine learning service, and transmitting, to the first inference host, the machine learning data.

In a tenth aspect, alone or in combination with one or more of the first through ninth aspects, process 1300 includes receiving, from the first inference host, one or more machine learning predictions associated with another UE that are based at least in part on machine learning data provided by the UE, and transmitting, to the second network node, an indication of the one or more machine learning predictions to facilitate a handover of the other UE to the first network node in accordance with the one or more machine learning predictions.

In an eleventh aspect, alone or in combination with one or more of the first through tenth aspects, process 1300 includes receiving, from the other UE, an RRC connection request communication in accordance with the one or more machine learning predictions.

In a twelfth aspect, alone or in combination with one or more of the first through eleventh aspects, the one or more machine learning predictions include a beam or beam pair to be used by the other UE to establish a connection with the first network node.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

FIG. 14 is a diagram illustrating an example process 1400 performed, for example, by a core network node, in accordance with the present disclosure. Example process 1400 is an example where the core network node (e.g., a core network node 160, an AMF, an SMF, and/or a UPF, among other examples) performs operations associated with UE machine learning service continuity.

As shown in FIG. 14, in some aspects, process 1400 may include receiving, from a first network node, a first handover request communication associated with a handover procedure for a UE, wherein the first handover request communication indicates at least one of first machine learning inference information associated with a machine learning service, machine learning data associated with the UE, or a first inference host that is associated with the first network node (block 1410). For example, the core network node (e.g., using communication manager 170 and/or reception component 1702, depicted in FIG. 17) may receive, from a first network node, a first handover request communication associated with a handover procedure for a UE, wherein the first handover request communication indicates at least one of first machine learning inference information associated with a machine learning service, machine learning data associated with the UE, or a first inference host that is associated with the first network node, as described above.

As further shown in FIG. 14, in some aspects, process 1400 may include transmitting, to a second network node, a second handover request communication associated with the handover procedure for the UE, wherein the second network node is selected (e.g., by the core network node) for the handover procedure based at least in part on the first machine learning inference information and a machine learning capability associated with the second network node (block 1420). For example, the core network node (e.g., using communication manager 170 and/or transmission component 1704, depicted in FIG. 17) may transmit, to a second network node, a second handover request communication associated with the handover procedure for the UE, wherein the second network node is selected for the handover procedure based at least in part on the first machine learning inference information and a machine learning capability associated with the second network node, as described above.

As further shown in FIG. 14, in some aspects, process 1400 may include receiving, from the second network node, a first handover response communication, associated with the handover procedure, indicating second machine learning inference information associated with a second inference host that is associated with the second network node (block 1430). For example, the core network node (e.g., using communication manager 170 and/or reception component 1702, depicted in FIG. 17) may receive, from the second network node, a first handover response communication, associated with the handover procedure, indicating second machine learning inference information associated with a second inference host that is associated with the second network node, as described above.

Process 1400 may include additional aspects, such as any single aspect or any combination of aspects described below and/or in connection with one or more other processes described elsewhere herein.

In a first aspect, process 1400 includes selecting the second network node for the handover procedure based at least in part on at least one of the first machine learning inference information, the machine learning capability associated with the second network node, or a capability associated with the second inference host.

In a second aspect, alone or in combination with the first aspect, process 1400 includes transmitting, to the first network node, a second handover response communication, associated with the handover procedure, indicating the second machine learning inference information.

In a third aspect, alone or in combination with one or more of the first and second aspects, the first machine learning inference information includes at least one of an identifier of the first inference host, an indication of a machine learning model executing on the first inference host that is associated with the machine learning service, or machine learning data associated with the machine learning service.

In a fourth aspect, alone or in combination with one or more of the first through third aspects, the machine learning data indicates at least one of an identifier of a machine learning data service that is associated with the UE, a machine learning model executing on the UE that is associated with the machine learning service, or a machine learning data type or format that is associated with the machine learning service.

In a fifth aspect, alone or in combination with one or more of the first through fourth aspects, the second machine learning inference information indicates at least one of an identifier of the second inference host, a machine learning model executing on the second inference host that is associated with the machine learning service, or machine learning data associated with the machine learning service.

In a sixth aspect, alone or in combination with one or more of the first through fifth aspects, the first handover request communication is received via an N2 interface.

In a seventh aspect, alone or in combination with one or more of the first through sixth aspects, the core network node is associated with an AMF.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
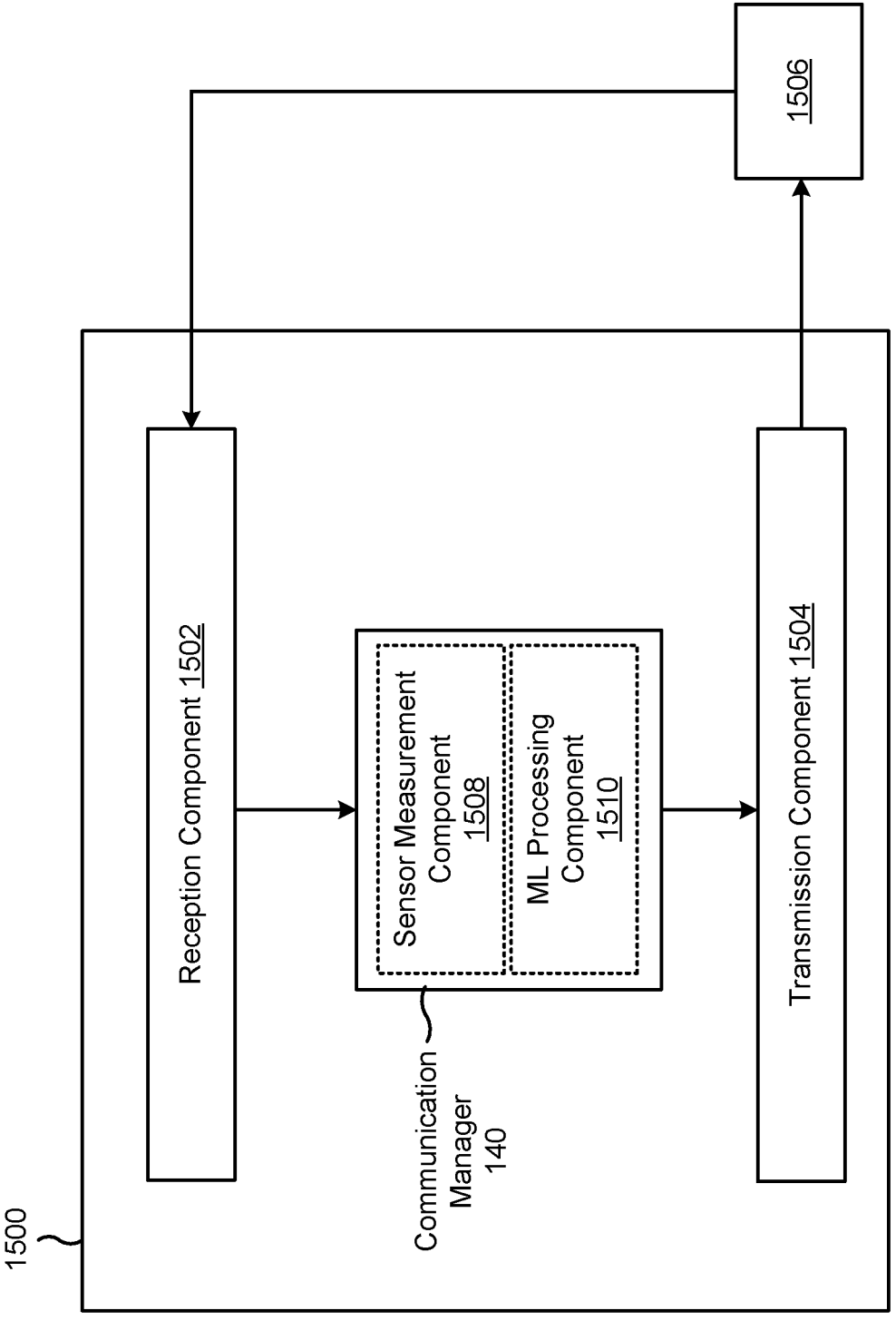
FIGS. 15-17 are diagrams of example apparatuses for wireless communication, in accordance with the present disclosure.

FIG. 15 is a diagram of an example apparatus 1500 for wireless communication. The apparatus 1500 may be a UE, or a UE may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, a network node, a network entity, a core network node or another wireless communication device) using the reception component 1502 and the transmission component 1504. As further shown, the apparatus 1500 may include the communication manager 140. The communication manager 140 may include one or more of a sensor measurement component 1508, and/or an ML processing component 1510, among other examples.

In some aspects, the apparatus 1500 may be configured to perform one or more operations described herein in connection with FIGS. 8, 9A, 9B, and 10. Additionally, or alternatively, the apparatus 1500 may be configured to perform one or more processes described herein, such as process 1100 of FIG. 11, or a combination thereof. In some aspects, the apparatus 1500 and/or one or more components shown in FIG. 15 may include one or more components of the UE described in connection with FIG. 2. Additionally, or alternatively, one or more components shown in FIG. 15 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1500. In some aspects, the reception component 1502 may include one or more antennas, a modem, a demodulator, a MIMO detector, a receive processor, a controller/processor, a memory, or a combination thereof, of the UE described in connection with FIG. 2.

The transmission component 1504 may transmit communications, such as reference signals, control information, data communications, or a combination thereof, to the apparatus 1506. In some aspects, one or more other components of the apparatus 1500 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modem, a modulator, a transmit MIMO processor, a transmit processor, a controller/processor, a memory, or a combination thereof, of the UE described in connection with FIG. 2. In some aspects, the transmission component 1504 may be co-located with the reception component 1502 in a transceiver.

The transmission component 1504 may transmit, to a first inference host associated with a first network node, first machine learning data for a machine learning service. The reception component 1502 may receive, from the first network node, a handover command communication indicating that the UE is to perform a handover with a second network node, wherein the handover command communication indicates machine learning information associated with a second inference host that is associated with the second network node. The transmission component 1504 may transmit, to the second inference host associated with the second network node, second machine learning data for the machine learning service based at least in part on receiving the handover command communication.

The sensor measurement component 1508 may obtain, via one or more sensors, one or more sensor measurements associated with one or more objects. The ML processing component 1510 may process, via a machine learning model executing on the UE, the one or more sensor measurements to obtain the machine learning data associated with the machine learning service.

The transmission component 1504 may transmit, to the second network node, a RACH connect communication or an RRC connect communication indicating at least one of information associated with the machine learning data, information associated with one or more machine learning models used for generating the machine learning data, information associated with the machine learning service, an indication of one or more machine learning types associated with the machine learning service, one or more machine learning model identifiers associated with the machine learning service, or one or more machine learning inference host identifiers associated with the machine learning service.

The reception component 1502 may receive, from the second network node, a first PDU session communication indicating PDU information associated with the machine learning service. The transmission component 1504 may transmit, to the second network node, a second PDU session communication in response to the first PDU session communication to establish the PDU session with the second inference host.

The quantity and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

Figure 16:
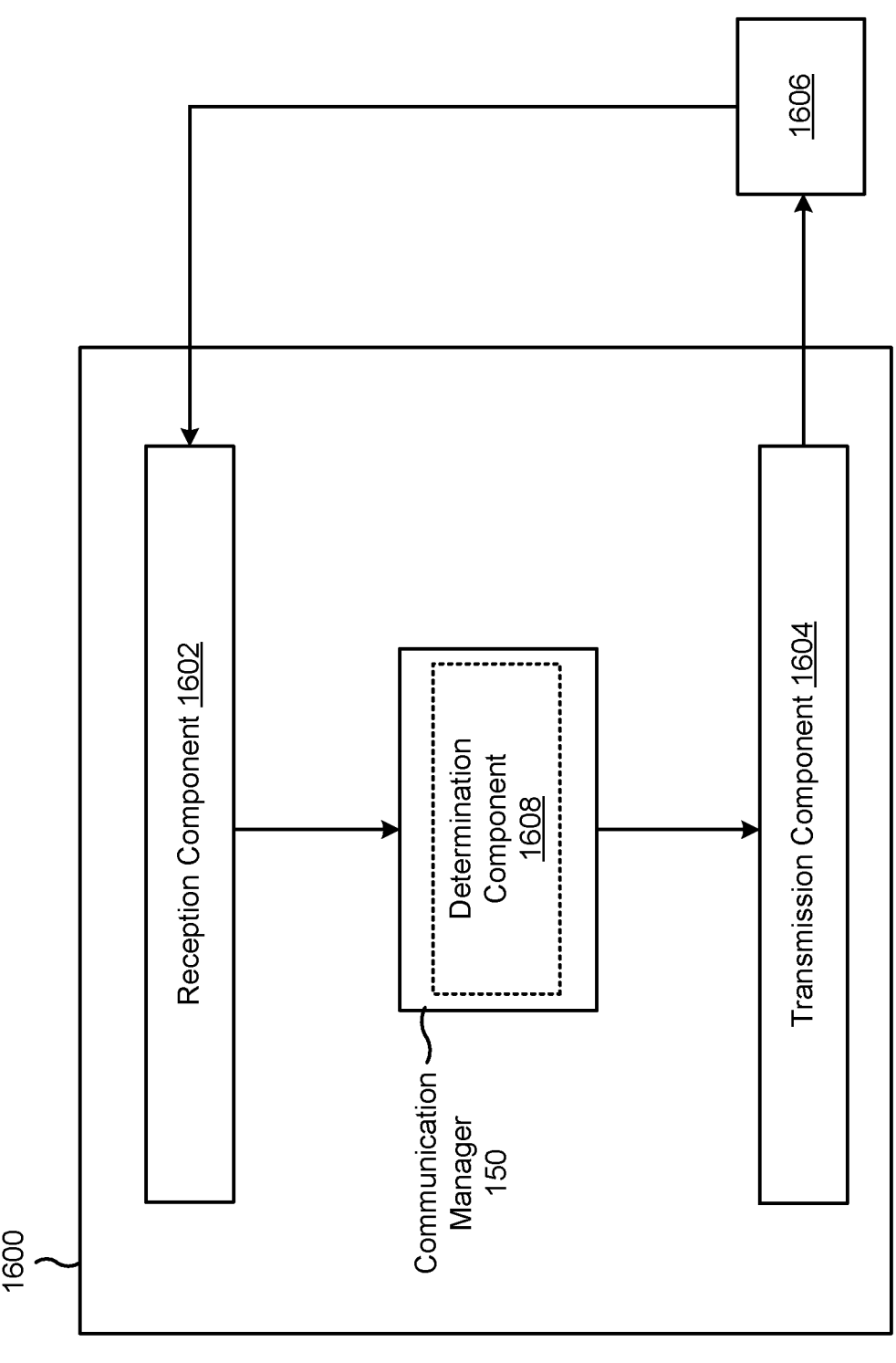

FIG. 16 is a diagram of an example apparatus 1600 for wireless communication. The apparatus 1600 may be a network node, or a network node may include the apparatus 1600. In some aspects, the apparatus 1600 includes a reception component 1602 and a transmission component 1604, which may be in communication with one another (for example, via one or more buses and/or one or more other components). As shown, the apparatus 1600 may communicate with another apparatus 1606 (such as a UE, a base station, a network node, a network entity, a core network node, or another wireless communication device) using the reception component 1602 and the transmission component 1604. As further shown, the apparatus 1600 may include the communication manager 150. The communication manager 150 may include a determination component 1608, among other examples.

In some aspects, the apparatus 1600 may be configured to perform one or more operations described herein in connection with FIGS. 8, 9A, 9B, and 10. Additionally, or alternatively, the apparatus 1600 may be configured to perform one or more processes described herein, such as process 1200 of FIG. 12, process 1300 of FIG. 13, or a combination thereof. In some aspects, the apparatus 1600 and/or one or more components shown in FIG. 16 may include one or more components of the network node described in connection with FIG. 2. Additionally, or alternatively, one or more components shown in FIG. 16 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive communications, such as reference signals, control information, data communications, or a combination thereof, from the apparatus 1606. The reception component 1602 may provide received communications to one or more other components of the apparatus 1600. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1600. In some aspects, the reception component 1602 may include one or more antennas, a modem, a demodulator, a MIMO detector, a receive processor, a controller/processor, a memory, or a combination thereof, of the network node described in connection with FIG. 2.

The transmission component 1604 may transmit communications, such as reference signals, control information, data communications, or a combination thereof, to the apparatus 1606. In some aspects, one or more other components of the apparatus 1600 may generate communications and may provide the generated communications to the transmission component 1604 for transmission to the apparatus 1606. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1606. In some aspects, the transmission component 1604 may include one or more antennas, a modem, a modulator, a transmit MIMO processor, a transmit processor, a controller/processor, a memory, or a combination thereof, of the network node described in connection with FIG. 2. In some aspects, the transmission component 1604 may be co-located with the reception component 1602 in a transceiver.

The reception component 1602 may receive, from a first inference host associated with the first network node, a first handover communication indicating first machine learning inference information associated with a machine learning service using machine learning data associated with a first UE. The transmission component 1604 may transmit, to a second network node or a core network node, a first handover request communication associated with a handover procedure for the first UE, wherein the second network node is selected for the handover procedure based at least in part on at least one of the first machine learning inference information or a machine learning service associated with the second network node. The reception component 1602 may receive, from the second network node or the core network node, a handover response communication, associated with the handover procedure, indicating second machine learning inference information associated with a second inference host that is associated with the second network node.

The reception component 1602 may receive, from the first UE or a second UE, a measurement report indicating one or more measurements associated with one or more candidate network nodes that include the second network node.

The determination component 1608 may determine to handover at least one of the first UE or the second UE to the second network node based at least in part on the measurement report, the first machine learning inference information, and the machine learning service associated with the second network node.

The transmission component 1604 may transmit, to the first inference host, a second handover communication indicating at least one of machine learning service information or the machine learning data, wherein the first handover communication is in response to the second handover communication.

The transmission component 1604 may transmit, to the first inference host, a third handover communication based at least in part on receiving the handover response communication indicating that a handover of at least one of the first UE or a second UE to the second network node is confirmed.

The transmission component 1604 may transmit, to the first UE, an RRC communication indicating a handover command for the first UE, wherein the RRC communication indicates the second machine learning inference information associated with the second inference host.

The reception component 1602 may receive, from the first inference host after transmitting the handover request communication, machine learning data associated with the first UE for the machine learning service.

The transmission component 1604 may transmit, to the second network node or the core network node, the machine learning data associated with the first UE for the machine learning service.

The transmission component 1604 may transmit, to the second network node or the core network node, context information, associated with the first UE, including at least one of machine learning service information or machine learning data.

The transmission component 1604 may transmit, to the second network node, UE context information and data associated with the second UE.

The reception component 1602 may receive, from the second network node, one or more machine learning predictions associated with a second UE, wherein the one or more machine learning predictions are based at least in part on machine learning data generated by the first UE. The transmission component 1604 may transmit, to the second UE, an RRC communication indicating a handover command, wherein the RRC communication indicates that the second UE is to connect with the second network node in accordance with the one or more machine learning predictions.

The reception component 1602 may receive, from a second network node or a core network node, a handover request communication associated with a handover procedure for a UE, wherein the handover request communication indicates at least one of first machine learning inference information associated with a machine learning service or machine learning data associated with the UE. The reception component 1602 and/or the transmission component 1608 may communicate, with a first inference host associated with the first network node, to determine that the first inference host is capable of supporting the machine learning service. The transmission component 1604 may transmit, to the second network node or the core network node, a handover response communication indicating second machine learning inference information associated with the first inference host based at least in part on the first inference host being capable of supporting the machine learning service.

The reception component 1602 may receive, from the UE, a RACH connect communication or an RRC connect communication indicating machine learning service information associated with the UE, the machine learning service information indicating at least one of machine learning data associated with the machine learning service, a machine learning type or service information associated with the machine learning service, or information associated with a machine learning model executing on the UE that is associated with the machine learning service.

The reception component 1602 may receive, from the second network node or the core network node, UE context information including at least one of the machine learning service information or the machine learning data.

The transmission component 1604 may transmit, to the first inference host, a first PDU communication indicating the first machine learning inference information associated with the machine learning service for the UE. The reception component 1602 may receive, from the first inference host, a second PDU communication indicating PDU session information for a PDU session associated with the machine learning service.

The transmission component 1604 may transmit, to the UE, an indication of the PDU session information for the PDU session associated with the machine learning service. The transmission component 1604 may transmit, to the core network node, a PDU establishment communication indicating the first machine learning inference information associated with the machine learning service for the UE to cause a PDU session associated with the machine learning service to be associated with the first inference host.

The reception component 1602 may receive, from the second network node after transmitting the handover response communication, machine learning data associated with the UE for the machine learning service.

The transmission component 1604 may transmit, to the first inference host, the machine learning data. The reception component 1602 may receive, from the first inference host, one or more machine learning predictions associated with another UE that are based at least in part on machine learning data provided by the UE.

The transmission component 1604 may transmit, to the second network node, an indication of the one or more machine learning predictions to facilitate a handover of the other UE to the first network node in accordance with the one or more machine learning predictions.

The reception component 1602 may receive, from the other UE, an RRC connection request communication in accordance with the one or more machine learning predictions.

The quantity and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally, or alternatively, a set of (one or more) components shown in FIG. 16 may perform one or more functions described as being performed by another set of components shown in FIG. 16.

Figure 17:
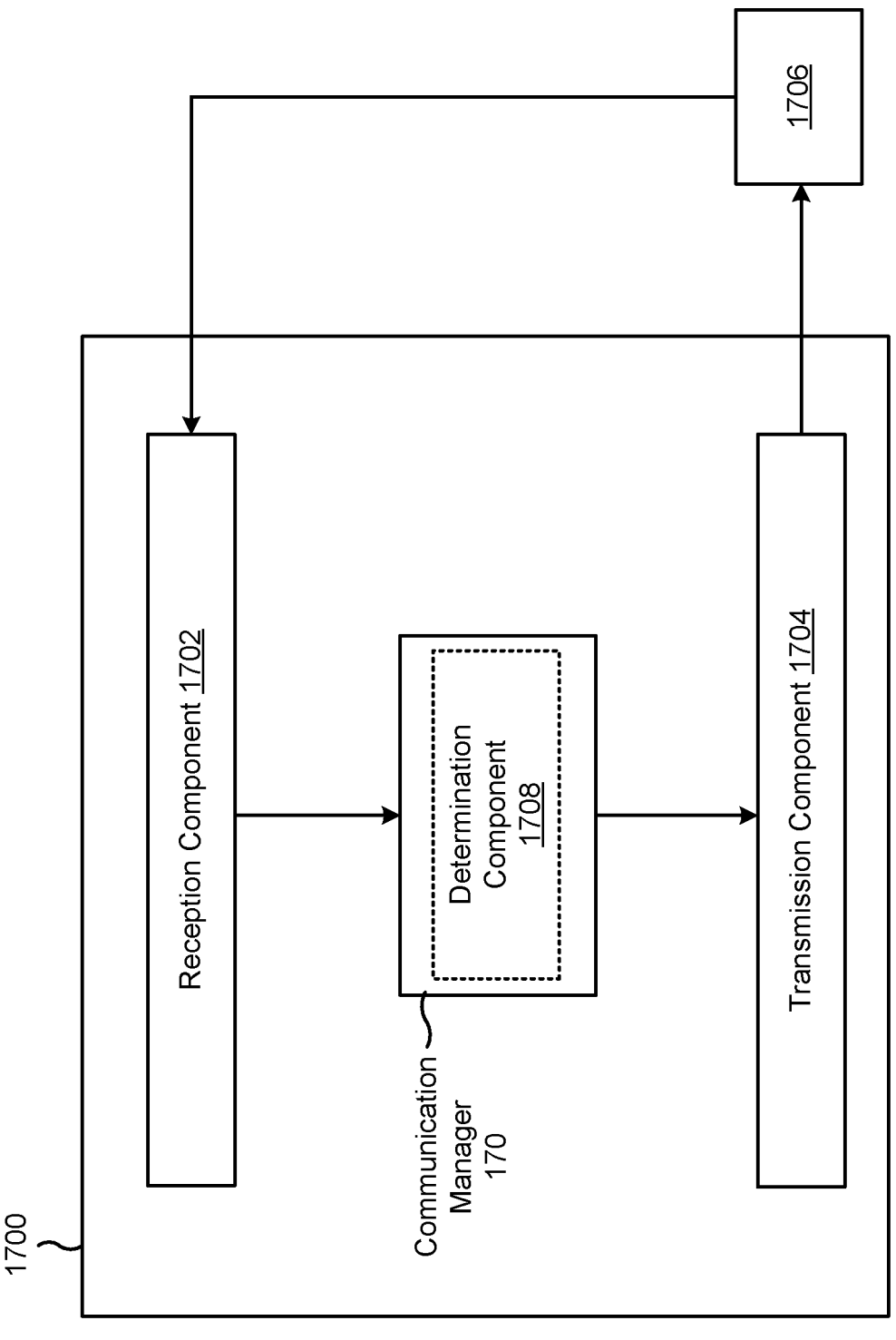

FIG. 17 is a diagram of an example apparatus 1700 for wireless communication. The apparatus 1700 may be a core network node, or a core network node may include the apparatus 1700. In some aspects, the apparatus 1700 includes a reception component 1702 and a transmission component 1704, which may be in communication with one another (for example, via one or more buses and/or one or more other components). As shown, the apparatus 1700 may communicate with another apparatus 1706 (such as a UE, a base station, a network node, a network entity, a core network node, or another wireless communication device) using the reception component 1702 and the transmission component 1704. As further shown, the apparatus 1700 may include the communication manager 170. The communication manager 170 may include a determination component 1708, among other examples.

In some aspects, the apparatus 1700 may be configured to perform one or more operations described herein in connection with FIGS. 8, 9A, 9B, and 10. Additionally, or alternatively, the apparatus 1700 may be configured to perform one or more processes described herein, such as process 1400 of FIG. 14, or a combination thereof. In some aspects, the apparatus 1700 and/or one or more components shown in FIG. 17 may include one or more components of the core network node described in connection with FIG. 2. Additionally, or alternatively, one or more components shown in FIG. 17 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1702 may receive communications, such as reference signals, control information, data communications, or a combination thereof, from the apparatus 1706. The reception component 1702 may provide received communications to one or more other components of the apparatus 1700. In some aspects, the reception component 1702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1700. In some aspects, the reception component 1702 may include one or more antennas, a modem, a demodulator, a MIMO detector, a receive processor, a controller/processor, a memory, or a combination thereof, of the core network node described in connection with FIG. 1.

The transmission component 1704 may transmit communications, such as reference signals, control information, data communications, or a combination thereof, to the apparatus 1706. In some aspects, one or more other components of the apparatus 1700 may generate communications and may provide the generated communications to the transmission component 1704 for transmission to the apparatus 1706. In some aspects, the transmission component 1704 may perform signal processing on the generated communications (such as filtering, amplification, modulation, digital-to-analog conversion, multiplexing, interleaving, mapping, or encoding, among other examples), and may transmit the processed signals to the apparatus 1706. In some aspects, the transmission component 1704 may include one or more antennas, a modem, a modulator, a transmit MIMO processor, a transmit processor, a controller/processor, a memory, or a combination thereof, of the core network node described in connection with FIG. 1. In some aspects, the transmission component 1704 may be co-located with the reception component 1702 in a transceiver.

The reception component 1702 may receive, from a first network node, a first handover request communication associated with a handover procedure for a UE, wherein the first handover request communication indicates at least one of first machine learning inference information associated with a machine learning service, machine learning data associated with the UE, or a first inference host that is associated with the first network node. The transmission component 1704 may transmit, to a second network node, a second handover request communication associated with the handover procedure for the UE, wherein the second network node is selected for the handover procedure based at least in part on at least one of the first machine learning inference information or a machine learning capability associated with the second network node. The reception component 1702 may receive, from the second network node, a first handover response communication, associated with the handover procedure, indicating second machine learning inference information associated with a second inference host that is associated with the second network node.

The determination component 1708 may select the second network node for the handover procedure based at least in part on at least one of the first machine learning inference information, the machine learning capability associated with the second network node, or a capability associated with the second inference host.

The transmission component 1704 may transmit, to the first network node, a second handover response communication, associated with the handover procedure, indicating the second machine learning inference information.

The quantity and arrangement of components shown in FIG. 17 are provided as an example. In practice, there may be additional components, fewer components, different components, or differently arranged components than those shown in FIG. 17. Furthermore, two or more components shown in FIG. 17 may be implemented within a single component, or a single component shown in FIG. 17 may be implemented as multiple, distributed components. Additionally, or alternatively, a set of (one or more) components shown in FIG. 17 may perform one or more functions described as being performed by another set of components shown in FIG. 17.

The following provides an overview of some Aspects of the present disclosure:

Aspect 1: A method of wireless communication performed by a user equipment (UE), comprising: transmitting, to a first network node for use by a first inference host associated with a first network node, first machine learning data associated with a machine learning service; receiving, from the first network node, a handover command communication indicating that the UE is to perform a handover from the first network node to a second network node, wherein the handover command communication indicates machine learning inference information associated with a second inference host that is associated with the second network node; and transmitting, to the second network node for use by the second inference host associated with the second network node, second machine learning data associated with the machine learning service based at least in part on receiving the handover command communication.

Aspect 2: The method of Aspect 1, wherein the UE is associated with a vehicle.

Aspect 3: The method of any of Aspects 1-2, further comprises: obtaining, via one or more sensors, one or more sensor measurements associated with one or more objects; and processing, via a machine learning model executing on the UE, the one or more sensor measurements to obtain the machine learning data associated with the machine learning service.

Aspect 4: The method of any of Aspects 1-3, wherein at least one of the first machine learning data or the second machine learning data includes at least one of: a geographic location of the UE, a direction of travel of the UE, a speed of the UE, beam information associated with another UE that is co-located with the UE, or data extracted from one or more sensor measurements.

Aspect 5: The method of any of Aspects 1-4, further comprising: transmitting, to the second network node, a random access channel (RACH) connect communication or a radio resource control (RRC) connect communication indicating at least one of: information associated with the first machine learning data, information associated with one or more machine learning models used for generating the first machine learning data, information associated with the machine learning service, an indication of one or more machine learning service types associated with the machine learning service, one or more machine learning model identifiers associated with the machine learning service, or one or more machine learning inference host identifiers associated with the machine learning service.

Aspect 6: The method of any of Aspects 1-5, further comprising: receiving, from the second network node, a first protocol data unit (PDU) session communication indicating PDU information associated with the machine learning service; and transmitting, to the second network node, a second PDU session communication in response to the first PDU session communication to establish a PDU session with the second inference host.

Aspect 7: The method of any of Aspects 1-6, wherein transmitting the second machine learning data comprises: processing, via a machine learning model executing on the UE, one or more sensor measurements to obtain the second machine learning data associated with the machine learning service; and transmitting, to the second network node or the second inference host and via a protocol data unit (PDU) session, the second machine learning data.

Aspect 8: The method of any of Aspects 1-7, wherein the UE is co-located with another UE, and wherein the machine learning data associated with the machine learning service is associated with the other UE.

Aspect 9: The method of any of Aspects 1-8, wherein the machine learning service includes at least one of: a beam prediction, a handover prediction, or a beam blockage prediction.

Aspect 10: A method of wireless communication performed by a first network node, comprising: receiving, from a first inference host associated with the first network node, a first handover communication indicating first machine learning inference information associated with a machine learning service that is associated with machine learning data associated with a first user equipment (UE); transmitting, to a second network node or a core network node, a handover request communication associated with a handover procedure for the first UE, wherein the second network node is selected by the first network node for the handover procedure based at least in part on the first machine learning inference information and a machine learning service associated with the second network node; and receiving, from the second network node or the core network node, a handover response communication, associated with the handover procedure, indicating second machine learning inference information associated with a second inference host that is associated with the second network node.

Aspect 11: The method of Aspect 10, further comprising: receiving, from the first UE or a second UE, a measurement report indicating one or more measurements associated with one or more candidate network nodes that include the second network node; and determining to handover at least one of the first UE or the second UE to the second network node based at least in part on the measurement report, the first machine learning inference information, and the machine learning service associated with the second network node.

Aspect 12: The method of any of Aspects 10-11, further comprising: transmitting, to the first inference host, a second handover communication indicating at least one of machine learning service information or machine learning data, wherein the first handover communication is in response to the second handover communication.

Aspect 13: The method of Aspect 12, wherein the machine learning data includes at least one of: an identification of a machine learning data service provided by the first UE, an identifier associated with the first UE, an indication of one or more machine learning models executing on the first UE that is associated with the machine learning data service, or an indication of one or more machine learning data types associated with one or more machine learning operations performed by the first UE for the machine learning data service.

Aspect 14: The method of any of Aspects 10-13, wherein the first machine learning inference information indicates at least one of: one or more machine learning models executing on the first inference host that are associated with the machine learning service, or information associated with or a status of the machine learning data associated with the machine learning service.

Aspect 15: The method of any of Aspects 10-14, wherein the handover request communication indicates the first machine learning inference information received from the first inference host.

Aspect 16: The method of any of Aspects 10-15, wherein the handover request communication is transmitted via an Xn interface.

Aspect 17: The method of any of Aspects 10-16, further comprising: transmitting, to the first inference host, a third handover communication based at least in part on receiving the handover response communication indicating that a handover of at least one of the first UE or a second UE to the second network node is confirmed.

Aspect 18: The method of any of Aspects 10-17, further comprising: transmitting, to the first UE, a radio resource control (RRC) communication indicating a handover command for the first UE, wherein the RRC communication indicates the second machine learning inference information associated with the second inference host.

Aspect 19: The method of any of Aspects 10-18, further comprising: receiving, from the first inference host after transmitting the handover request communication, machine learning data associated with the first UE for the machine learning service; transmitting, to the second network node or the core network node, the machine learning data associated with the first UE for the machine learning service; and transmitting, to the second network node or the core network node, context information, associated with the first UE, including at least one of machine learning service information or machine learning data.

Aspect 20: The method of any of Aspects 10-19, further comprising: transmitting, to the second network node, UE context information and data associated with a second UE that is co-located with the first UE; receiving, from the second network node, one or more machine learning predictions associated with the second UE, wherein the one or more machine learning predictions are based at least in part on machine learning data generated by the first UE; and transmitting, to the second UE, a radio resource control (RRC) communication indicating a handover command, wherein the RRC communication indicates that the second UE is to connect with the second network node in accordance with the one or more machine learning predictions.

Aspect 21: The method of any of Aspects 10-20, wherein the core network node is associated with an access and mobility function (AMF).

Aspect 22: A method of wireless communication performed by a first network node, comprising: receiving, from a second network node or a core network node, a handover request communication associated with a handover procedure for a user equipment (UE), wherein the handover request communication indicates first machine learning inference information associated with a machine learning service and machine learning data associated with the UE; communicating, with a first inference host associated with the first network node, to determine that the first inference host is capable of supporting the machine learning service; and transmitting, to the second network node or the core network node, a handover response communication indicating second machine learning inference information associated with the first inference host based at least in part on the first inference host being capable of supporting the machine learning service.

Aspect 23: The method of Aspect 22, wherein communicating to determine that the first inference host is capable of supporting the machine learning service comprises: transmitting, to the first inference host, a first handover communication indicating at least one of the first machine learning inference information or the machine learning data; and receiving, from the first inference host, a second handover communication indicating whether the first inference host is capable of supporting the machine learning service, wherein the second handover communication indicates the second machine learning inference information associated with the first inference host.

Aspect 24: The method of any of Aspects 22-23, wherein the first machine learning inference information indicates at least one of: an identifier of a second inference host that is associated with the machine learning service and the second network node, a machine learning model executing on the second inference host, or other machine learning data associated with the machine learning service associated with the second inference host.

Aspect 25: The method of any of Aspects 22-24, wherein the second machine learning inference information indicates at least one of: an identifier of the first inference host, a machine learning model executing on the first inference host, or the machine learning data associated with the machine learning service associated with the first inference host.

Aspect 26: The method of any of Aspects 22-25, further comprising: receiving, from the UE, a random access channel (RACH) connect communication or a radio resource control (RRC) connect communication indicating machine learning service information associated with the UE, the machine learning service information indicating at least one of: machine learning data associated with the machine learning service, a machine learning type or service information associated with the machine learning service, or information associated with a machine learning model executing on the UE that is associated with the machine learning service.

Aspect 27: The method of any of Aspects 22-26, further comprising: receiving, from the second network node or the core network node, UE context information including at least one of the machine learning service information or the machine learning data.

Aspect 28: The method of any of Aspects 22-27, further comprising: transmitting, to the first inference host, a first protocol data unit (PDU) communication indicating the first machine learning inference information associated with the machine learning service for the UE; and receiving, from the first inference host, a second PDU communication indicating PDU session information for a PDU session associated with the machine learning service.

Aspect 29: The method of Aspect 28, further comprising: transmitting, to the UE, an indication of the PDU session information for the PDU session associated with the machine learning service.

Aspect 30: The method of any of Aspects 22-29, further comprising: transmitting, to the core network node, a protocol data unit (PDU) establishment communication indicating the first machine learning inference information associated with the machine learning service for the UE to cause a PDU session associated with the machine learning service to be associated with the first inference host.

Aspect 31: The method of any of Aspects 22-30, further comprising: receiving, from the second network node after transmitting the handover response communication, machine learning data associated with the UE for the machine learning service; and transmitting, to the first inference host, the machine learning data.

Aspect 32: The method of any of Aspects 22-31, further comprising: receiving, from the first inference host, one or more machine learning predictions associated with another UE that are based at least in part on machine learning data provided by the UE; and transmitting, to the second network node, an indication of the one or more machine learning predictions to facilitate a handover of the other UE to the first network node in accordance with the one or more machine learning predictions.

Aspect 33: The method of Aspect 32, further comprising: receiving, from the other UE, a radio resource control (RRC) connection request communication in accordance with the one or more machine learning predictions.

Aspect 34: The method of any of Aspects 32-33, wherein the one or more machine learning predictions include a beam or beam pair to be used by the other UE to establish a connection with the first network node.

Aspect 35: A method of wireless communication performed by a core network node, comprising: receiving, from a first network node, a first handover request communication associated with a handover procedure for a user equipment (UE), wherein the first handover request communication indicates at least one of first machine learning inference information associated with a machine learning service, machine learning data associated with the UE, or a first inference host that is associated with the first network node; transmitting, to a second network node, a second handover request communication associated with the handover procedure for the UE, wherein the second network node is selected for the handover procedure based at least in part on the first machine learning inference information and a machine learning capability associated with the second network node; and receiving, from the second network node, a first handover response communication, associated with the handover procedure, indicating second machine learning inference information associated with a second inference host that is associated with the second network node.

Aspect 36: The method of Aspect 35, further comprising: selecting the second network node for the handover procedure based at least in part on at least one of the first machine learning inference information, the machine learning capability associated with the second network node, or a capability associated with the second inference host.

Aspect 37: The method of any of Aspects 35-36, further comprising: transmitting, to the first network node, a second handover response communication, associated with the handover procedure, indicating the second machine learning inference information.

Aspect 38: The method of any of Aspects 35-37, wherein the first machine learning inference information includes at least one of: an identifier of the first inference host, an indication of a machine learning model executing on the first inference host that is associated with the machine learning service, or machine learning data associated with the machine learning service.

Aspect 39: The method of any of Aspects 35-38, wherein the machine learning data indicates at least one of: an identifier of a machine learning data service that is associated with the UE, a machine learning model executing on the UE that is associated with the machine learning service, or a machine learning data type or format that is associated with the machine learning service.

Aspect 40: The method of any of Aspects 35-39, wherein the second machine learning inference information indicates at least one of: an identifier of the second inference host, a machine learning model executing on the second inference host that is associated with the machine learning service, or machine learning data associated with the machine learning service.

Aspect 41: The method of any of Aspects 35-40, wherein the first handover request communication is received via an N2 interface.

Aspect 42: The method of any of Aspects 35-41, wherein the core network node is associated with an access and mobility function (AMF).

Aspect 43: An apparatus for wireless communication at a device, comprising a processor; memory coupled with the processor; and instructions stored in the memory and executable by the processor to cause the apparatus to perform the method of one or more of Aspects 1-9.

Aspect 44: A device for wireless communication, comprising a memory and one or more processors coupled to the memory, the one or more processors configured to perform the method of one or more of Aspects 1-9.

Aspect 45: An apparatus for wireless communication, comprising at least one means for performing the method of one or more of Aspects 1-9.

Aspect 46: A non-transitory computer-readable medium storing code for wireless communication, the code comprising instructions executable by a processor to perform the method of one or more of Aspects 1-9.

Aspect 47: A non-transitory computer-readable medium storing a set of instructions for wireless communication, the set of instructions comprising one or more instructions that, when executed by one or more processors of a device, cause the device to perform the method of one or more of Aspects 1-9.

Aspect 48: An apparatus for wireless communication at a device, comprising a processor; memory coupled with the processor; and instructions stored in the memory and executable by the processor to cause the apparatus to perform the method of one or more of Aspects 10-22 and/or 23-34.

Aspect 49: A device for wireless communication, comprising a memory and one or more processors coupled to the memory, the one or more processors configured to perform the method of one or more of Aspects 10-22 and/or 23-34.

Aspect 50: An apparatus for wireless communication, comprising at least one means for performing the method of one or more of Aspects 10-22 and/or 23-34.

Aspect 51: A non-transitory computer-readable medium storing code for wireless communication, the code comprising instructions executable by a processor to perform the method of one or more of Aspects 10-22 and/or 23-34.

Aspect 52: A non-transitory computer-readable medium storing a set of instructions for wireless communication, the set of instructions comprising one or more instructions that, when executed by one or more processors of a device, cause the device to perform the method of one or more of Aspects 10-22 and/or 23-34.

Aspect 53: An apparatus for wireless communication at a device, comprising a processor; memory coupled with the processor; and instructions stored in the memory and executable by the processor to cause the apparatus to perform the method of one or more of Aspects 35-42.

Aspect 54: A device for wireless communication, comprising a memory and one or more processors coupled to the memory, the one or more processors configured to perform the method of one or more of Aspects 35-42.

Aspect 55: An apparatus for wireless communication, comprising at least one means for performing the method of one or more of Aspects 35-42.

Aspect 56: A non-transitory computer-readable medium storing code for wireless communication, the code comprising instructions executable by a processor to perform the method of one or more of Aspects 35-42.

Aspect 57: A non-transitory computer-readable medium storing a set of instructions for wireless communication, the set of instructions comprising one or more instructions that, when executed by one or more processors of a device, cause the device to perform the method of one or more of Aspects 35-42.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:

one or more memories; and one or more processors, coupled to the one or more memories, configured to:

transmit, to a first network node for use by a first inference host associated with the first network node, first machine learning data associated with a machine learning service;

receive, from the first network node, a handover command communication indicating that the UE is to perform a handover from the first network node to a second network node, wherein the handover command communication indicates machine learning inference information associated with a second inference host that is associated with the second network node, wherein the machine learning inference information indicates machine learning data session information indicating one or more machine learning data session identifiers and one or more machine learning data session types associated with a machine learning data session, the machine learning data session including one or more radio bearers; and transmit, to the second network node for use by the second inference host associated with the second network node, a communication to establish a communication connection with the second network node, wherein the communication indicates the machine learning data session information and second machine learning data associated with the machine learning service based at least in part on receiving the handover command communication.

2. The UE of claim 1, wherein at least one of the first machine learning data or the second machine learning data includes at least one of:

a geographic location of the UE, a direction of travel of the UE, a speed of the UE, beam information associated with another UE that is co-located with the UE, or data extracted from one or more sensor measurements.

3. The UE of claim 1, wherein the one or more processors are further configured to:

transmit, to the second network node, a random access channel (RACH) connect communication or a radio resource control (RRC) connect communication indicating at least one of:

information associated with the first machine learning data, information associated with one or more machine learning models used for generating the first machine learning data, information associated with the machine learning service, an indication of one or more machine learning service types associated with the machine learning service, one or more machine learning model identifiers associated with the machine learning service, or one or more machine learning inference host identifiers associated with the machine learning service.

4. The UE of claim 1, wherein the one or more processors are further configured to:

receive, from the second network node, a first protocol data unit (PDU) session communication indicating PDU information associated with the machine learning service; and transmit, to the second network node, a second PDU session communication in response to the first PDU session communication to establish a PDU session with the second inference host.

5. The UE of claim 1, wherein the one or more processors, to transmit the second machine learning data, are configured to:

process, via a machine learning model executing on the UE, one or more sensor measurements to obtain the second machine learning data associated with the machine learning service; and transmit, to the second network node or the second inference host and via a protocol data unit (PDU) session, the second machine learning data.

6. The UE of claim 1, wherein the UE is co-located with another UE, and wherein the first machine learning data associated with the machine learning service is associated with the other UE.

7. A first network node for wireless communication, comprising:

one or more memories; and one or more processors, coupled to the one or more memories, configured to:

receive, from a first inference host associated with the first network node, a first handover communication indicating first machine learning inference information associated with a machine learning service that is associated with machine learning data associated with a first user equipment (UE);

transmit, from the first network node to a second network node or a core network node via an interface established between the first network node and the second network node or the core network node, a handover request communication associated with a handover procedure for the first UE, wherein the second network node is selected by the first network node for the handover procedure based at least in part on the first machine learning inference information and a machine learning service associated with the second network node and wherein the handover request communication indicates the first machine learning inference information;

receive, from the second network node or the core network node, a handover response communication, associated with the handover procedure, indicating second machine learning inference information associated with a second inference host that is associated with the second network node; and transmit, to the second network node, machine learning data session information associated with the first UE, the machine learning data session information indicating one or more machine learning data session identifiers and one or more machine learning data session types associated with a machine learning data session.

8. The first network node of claim 7, wherein the one or more processors are further configured to:

receive, from the first UE or a second UE, a measurement report indicating one or more measurements associated with one or more candidate network nodes that include the second network node; and determine to handover at least one of the first UE or the second UE to the second network node based at least in part on the measurement report, the first machine learning inference information, and the machine learning service associated with the second network node.

9. The first network node of claim 7, wherein the one or more processors are further configured to:

transmit, to the first inference host, a second handover communication indicating at least one of machine learning service information or machine learning data, wherein the first handover communication is in response to the second handover communication.

10. The first network node of claim 9, wherein the machine learning data includes at least one of:

an identification of a machine learning data service provided by the first UE, an identifier associated with the first UE, an indication of one or more machine learning models executing on the first UE that is associated with the machine learning data service, or an indication of one or more machine learning data types associated with one or more machine learning operations performed by the first UE for the machine learning data service.

11. The first network node of claim 7, wherein the first machine learning inference information indicates at least one of:

one or more machine learning models executing on the first inference host that are associated with the machine learning service, or information associated with or a status of the machine learning data associated with the machine learning service.

12. The first network node of claim 7, wherein the one or more processors are further configured to:

transmit, to the first inference host, a third handover communication based at least in part on receiving the handover response communication indicating that a handover of at least one of the first UE or a second UE to the second network node is confirmed.

13. The first network node of claim 7, wherein the one or more processors are further configured to:

transmit, to the first UE, a radio resource control (RRC) communication indicating a handover command for the first UE, wherein the RRC communication indicates the second machine learning inference information associated with the second inference host.

14. The first network node of claim 7, wherein the one or more processors are further configured to:

receive, from the first inference host after transmitting the handover request communication, machine learning data associated with the first UE for the machine learning service;

transmit, to the second network node or the core network node, the machine learning data associated with the first UE for the machine learning service; and transmit, to the second network node or the core network node, context information, associated with the first UE, including at least one of machine learning service information or machine learning data.

15. The first network node of claim 7, wherein the one or more processors are further configured to:

transmit, to the second network node, UE context information and data associated with a second UE that is co-located with the first UE;

receive, from the second network node, one or more machine learning predictions associated with the second UE, wherein the one or more machine learning predictions are based at least in part on machine learning data generated by the first UE; and transmit, to the second UE, a radio resource control (RRC) communication indicating a handover command, wherein the RRC communication indicates that the second UE is to connect with the second network node in accordance with the one or more machine learning predictions.

16. A first network node for wireless communication, comprising:

one or more memories; and one or more processors, coupled to the one or more memories, configured to:

receive, from a second network node or a core network node, a handover request communication associated with a handover procedure for a user equipment (UE), wherein the second network node or the core network node transmits the handover request communication to the first network node via an interface established between the first network node and the second network node or the core network node, wherein the handover request communication indicates first machine learning inference information associated with a machine learning service and machine learning data associated with the UE;

communicate, with a first inference host associated with the first network node, to determine that the first inference host is capable of supporting the machine learning service;

transmit, to the second network node or the core network node, a handover response communication indicating second machine learning inference information associated with the first inference host based at least in part on the first inference host being capable of supporting the machine learning service; and receive, from the second network node, machine learning data session information associated with the UE, the machine learning data session information indicating one or more machine learning data session identifiers and one or more machine learning data session types associated with a machine learning data session, the machine learning data session including one or more radio bearers.

17. The first network node of claim 16, wherein the one or more processors, to communicate to determine that the first inference host is capable of supporting the machine learning service, are configured to:

transmit, to the first inference host, a first handover communication indicating at least one of the first machine learning inference information or the machine learning data; and receive, from the first inference host, a second handover communication indicating whether the first inference host is capable of supporting the machine learning service, wherein the second handover communication indicates the second machine learning inference information associated with the first inference host.

18. The first network node of claim 16, wherein the first machine learning inference information indicates at least one of:

an identifier of a second inference host that is associated with the machine learning service and the second network node, a machine learning model executing on the second inference host, or other machine learning data associated with the machine learning service associated with the second inference host.

19. The first network node of claim 16, wherein the one or more processors are further configured to:

receive, from the UE, a random access channel (RACH) connect communication or a radio resource control (RRC) connect communication indicating machine learning service information associated with the UE, the machine learning service information indicating at least one of:

machine learning data associated with the machine learning service, a machine learning type or service information associated with the machine learning service, or information associated with a machine learning model executing on the UE that is associated with the machine learning service.

20. The first network node of claim 16, wherein the one or more processors are further configured to:

receive, from the second network node or the core network node, UE context information including at least one of machine learning service information or the machine learning data.

21. The first network node of claim 16, wherein the one or more processors are further configured to:

transmit, to the first inference host, a first protocol data unit (PDU) communication indicating the first machine learning inference information associated with the machine learning service for the UE; and receive, from the first inference host, a second PDU communication indicating PDU session information for a PDU session associated with the machine learning service.

22. The first network node of claim 21, wherein the one or more processors are further configured to:

transmit, to the UE, an indication of the PDU session information for the PDU session associated with the machine learning service.

23. The first network node of claim 16, wherein the one or more processors are further configured to:

transmit, to the core network node, a protocol data unit (PDU) establishment communication indicating the first machine learning inference information associated with the machine learning service for the UE to cause a PDU session associated with the machine learning service to be associated with the first inference host.

24. The first network node of claim 16, wherein the one or more processors are further configured to:

receive, from the second network node after transmitting the handover response communication, machine learning data associated with the UE for the machine learning service; and transmit, to the first inference host, the machine learning data.

25. The first network node of claim 16, wherein the one or more processors are further configured to:

receive, from the first inference host, one or more machine learning predictions associated with another UE that are based at least in part on machine learning data provided by the UE; and transmit, to the second network node, an indication of the one or more machine learning predictions to facilitate a handover of the other UE to the first network node in accordance with the one or more machine learning predictions.

26. The first network node of claim 25, wherein the one or more processors are further configured to:

receive, from the other UE, a radio resource control (RRC) connection request communication in accordance with the one or more machine learning predictions.

27. The first network node of claim 25, wherein the one or more machine learning predictions include a beam or beam pair to be used by the other UE to establish a connection with the first network node.

28. A core network node for wireless communication, comprising:

one or more memories; and one or more processors, coupled to the one or more memories, configured to:

receive, from a first network node, a first handover request communication associated with a handover procedure for a user equipment (UE), wherein the first network node transmits the handover request communication to the core network node via an interface established between the first network node and the core network node, wherein the first handover request communication indicates at least one of first machine learning inference information associated with a machine learning service, machine learning data associated with the UE, or a first inference host that is associated with the first network node;

transmit, to a second network node, a second handover request communication associated with the handover procedure for the UE, wherein the second network node is selected for the handover procedure based at least in part on the first machine learning inference information and a machine learning capability associated with the second network node;

receive, from the second network node, a first handover response communication, associated with the handover procedure, indicating second machine learning inference information associated with a second inference host that is associated with the second network node; and transmit, to the first network node, a handover command communication indicating machine learning data session information indicating one or more machine learning data session identifiers and one or more machine learning data session types associated with a machine learning data session.

29. The core network node of claim 28, wherein the one or more processors are further configured to:

select the second network node for the handover procedure based at least in part on at least one of the first machine learning inference information, the machine learning capability associated with the second network node, or a capability associated with the second inference host.

30. The core network node of claim 28, wherein the one or more processors are further configured to:

transmit, to the first network node, a second handover response communication, associated with the handover procedure, indicating the second machine learning inference information.

\* \* \* \* \*